US012561758B2

(12) United States Patent
Vitorino et al.

(10) Patent No.: US 12,561,758 B2
(45) Date of Patent: Feb. 24, 2026

(54) TONE MAPPING FOR SPHERICAL IMAGES

(71) Applicant: GoPro, Inc., San Mateo, CA (US)

(72) Inventors: Sandra Vitorino, Antony (FR);
Violaine Marie Mong-Ian Sudret,
Paris (FR); Andrea Eric Petreto,
Saint-Germain-en-Laye (FR); **Thibaut
Paul Joseph Tortosa,** Marseilles (FR)

(73) Assignee: GoPro, Inc., San Mateo, CA (US)

( * ) Notice: Subject to any disclaimer, the term of this
patent is extended or adjusted under 35
U.S.C. 154(b) by 253 days.

(21) Appl. No.: 18/538,619

(22) Filed: Dec. 13, 2023

(65) Prior Publication Data

US 2025/0200708 A1      Jun. 19, 2025

(51) Int. Cl.
| | |
|---|---|
| *G06K 9/00* | (2022.01) |
| *G06T 5/40* | (2006.01) |
| *G06V 10/25* | (2022.01) |
| *G06V 10/50* | (2022.01) |
| *G06V 10/60* | (2022.01) |

(52) U.S. Cl.
CPC ................. *G06T 5/40* (2013.01); *G06V 10/25*
(2022.01); *G06V 10/507* (2022.01); *G06V
10/60* (2022.01); *G06T 2207/10024* (2013.01)

(58) Field of Classification Search
CPC ....... G06T 3/4038; G06T 15/04; G06T 17/20;
G06T 19/006; G06T 2207/10021; G06T
2207/20072; G06T 2207/30204; G06T
7/579; G06T 7/593; G06T 2207/10024;
G06T 7/90; G06T 11/60; G06T
2207/10016; G06T 2207/20208; G06T
3/04; G06T 3/12; G06T 3/40; G06T 5/50;
G06T 5/70; G06T 5/73; G06T 5/92;
G06T 5/94; G06T 9/00; G06T
2207/20092; G06T 7/70; G06T 19/00;
G06T 2207/10004; G06T 2219/028;
G06T 15/10; G06T 15/20; G06T
2219/004; G06T 3/16; G06T 5/40; G06T
7/80
See application file for complete search history.

(56) References Cited

U.S. PATENT DOCUMENTS

| | | | | |
|---|---|---|---|---|
| 2018/0075635 A1* | 3/2018 | Choi | ..................... | H04N 13/156 |
| 2018/0329927 A1* | 11/2018 | Garg | ......................... | G06T 3/04 |
| 2018/0374192 A1* | 12/2018 | Kunkel | .................. | H04N 23/58 |
| 2023/0407386 A1* | 12/2023 | Hong | ..................... | G16B 40/10 |

* cited by examiner

*Primary Examiner* — Alex Kok S Liew
(74) *Attorney, Agent, or Firm* — Young Basile Hanlon &
MacFarlane, P.C.

(57) ABSTRACT

Obtaining a processed spherical image includes obtaining a
first luminance thumbnail image for a first hemispherical
input image, obtaining a second luminance thumbnail image
for a second hemispherical input image, obtaining a first
distortion correcting weight map, obtaining a second distor-
tion correcting weight map, obtaining, as an aggregate
weighted mean value for the input spherical image, an
aggregate of a first normalized weighted mean value for the
first luminance thumbnail image and a second normalized
weighted mean value for the second luminance thumbnail
image, obtaining at least one of a target exposure value, a
target aggregate gain value, or a region of interest ratio value
in accordance with the aggregate weighted mean value, and
obtaining the processed spherical image from the input
spherical image in accordance with at least one of the target
exposure value, the target aggregate gain value, or the region
of interest ratio value.

20 Claims, 14 Drawing Sheets

TONE MAPPING FOR SPHERICAL IMAGES

TECHNICAL FIELD

This disclosure relates to adaptive acquisition control, including exposure and tone control, for image and video acquisition and processing.

BACKGROUND

Images and video may be acquired, or captured, and processed, such as by an image capture apparatus, such as a camera. Light may be received and focused via a lens and may be converted to an electronic image signal by an image sensor. The image signal may be processed by an image signal processor to form a processed, or output, image, which may be stored and/or encoded.

SUMMARY

Disclosed herein are implementations of tone mapping for spherical images for image and video acquisition and processing.

An aspect of the disclosure is a method of tone mapping for spherical images for image and video acquisition and processing. Tone mapping for spherical images for image and video acquisition and processing may include obtaining an input spherical image having a spherical field of view. Obtaining the input spherical image may include obtaining a first input image having a first hemispherical field of view and obtaining a second input image having a second hemispherical field of view, such that a combination of the first hemispherical field of view and the second hemispherical field of view forms the spherical field of view. Tone mapping for spherical images for image and video acquisition and processing may include obtaining a processed spherical image from the input spherical image. Obtaining the processed spherical image may include obtaining a first luminance thumbnail image for the first input image, obtaining a second luminance thumbnail image for the second input image, obtaining a first distortion correcting weight map for the first input image, obtaining a second distortion correcting weight map for the second input image, obtaining, as an aggregate weighted mean value for the input spherical image, an aggregate of a first normalized weighted mean value for the first luminance thumbnail image and a second normalized weighted mean value for the second luminance thumbnail image, and obtaining at least one of a target exposure value, a target aggregate gain value, or a region of interest ratio value in accordance with the aggregate weighted mean value. Tone mapping for spherical images for image and video acquisition and processing may include obtaining the processed spherical image from the input spherical image in accordance with at least one of the target exposure value, the target aggregate gain value, or the region of interest ratio value and outputting the processed spherical image.

Another aspect of the disclosure is an image capture apparatus that implements tone mapping for spherical images for image and video acquisition and processing. The image capture apparatus includes an image sensor and an image processing pipeline. The image processing pipeline may be configured to obtain an input spherical image having a spherical field of view. To obtain the input spherical image the image processing pipeline may be configured to obtain a first input image having a first hemispherical field of view and obtain a second input image having a second hemispherical field of view, such that a combination of the first hemispherical field of view and the second hemispherical field of view forms the spherical field of view. The image processing pipeline may be configured to obtain a processed spherical image from the input spherical image. To obtain the processed spherical image the image processing pipeline may be configured to obtain a first luminance thumbnail image for the first input image, obtain a second luminance thumbnail image for the second input image, obtain a first distortion correcting weight map for the first input image, obtain a second distortion correcting weight map for the second input image, obtain, as an aggregate weighted mean value for the input spherical image, an aggregate of a first normalized weighted mean value for the first luminance thumbnail image and a second normalized weighted mean value for the second luminance thumbnail image, and obtain at least one of a target exposure value, a target aggregate gain value, or a region of interest ratio value in accordance with the aggregate weighted mean value. The image processing pipeline may be configured to obtain the processed spherical image from the input spherical image in accordance with at least one of the target exposure value, the target aggregate gain value, or the region of interest ratio value and output the processed spherical image.

Another aspect of the disclosure is a method of tone mapping for spherical images for image and video acquisition and processing. Tone mapping for spherical images for image and video acquisition and processing may include obtaining an input spherical image having a spherical field of view. Obtaining the input spherical image may include obtaining a first input image having a first hemispherical field of view and obtaining a second input image having a second hemispherical field of view, such that a combination of the first hemispherical field of view and the second hemispherical field of view forms the spherical field of view. Tone mapping for spherical images for image and video acquisition and processing may include obtaining a processed spherical image from the input spherical image. Obtaining the processed spherical image may include obtaining a first luminance thumbnail image for the first input image, obtaining a second luminance thumbnail image for the second input image, obtaining a first distortion correcting weight map for the first input image, obtaining a second distortion correcting weight map for the second input image, obtaining, as an aggregate gradient histogram for the input spherical image, a sum of a first gradient histogram for the first luminance thumbnail image generated in accordance with the first distortion correcting weight map and a second gradient histogram for the second luminance thumbnail image generated in accordance with the second distortion correcting weight map, obtaining uniformity score for the input spherical image in accordance with the aggregate gradient histogram, and obtaining the processed spherical image from the input spherical image in accordance with the uniformity score. Tone mapping for spherical images for image and video acquisition and processing may include outputting the processed spherical image.

Another aspect of the disclosure is an image capture apparatus that implements tone mapping for spherical images for image and video acquisition and processing. The image capture apparatus includes an image sensor and an image processing pipeline. The image processing pipeline may be configured to obtain an input spherical image having a spherical field of view. To obtain the input spherical image the image processing pipeline may be configured to obtain a first input image having a first hemispherical field of view and obtain a second input image having a second hemispherical field of view, such that a combination of the first hemispherical field of view and the second hemispherical field of view forms the spherical field of view. The image processing pipeline may be configured to obtain a processed spherical image from the input spherical image. To obtain the processed spherical image the image processing pipeline may be configured to obtain a first luminance thumbnail image for the first input image, obtain a second luminance thumbnail image for the second input image, obtain a first distortion correcting weight map for the first input image, obtain a second distortion correcting weight map for the second input image, obtain, as an aggregate gradient histogram for the input spherical image, a sum of a first gradient histogram for the first luminance thumbnail image generated in accordance with the first distortion correcting weight map and a second gradient histogram for the second luminance thumbnail image generated in accordance with the second distortion correcting weight map, obtain a uniformity score for the input spherical image in accordance with the aggregate gradient histogram, and obtain the processed spherical image from the input spherical image in accordance with at the uniformity score. The image processing pipeline may be configured to output the processed spherical image.

In the aspects described herein, obtaining the aggregate weighted mean value may include obtaining, as the first normalized weighted mean value, a sum of first weighted pixel values, wherein a first weighted pixel value from the first weighted pixel values is a result of multiplying a pixel value from the first luminance thumbnail image by a respective spatially corresponding distortion correcting weight value from the first distortion correcting weight map, normalized by a sum of the distortion correcting weight values from the first distortion correcting weight map. Obtaining the aggregate weighted mean value may include obtaining, as the second normalized weighted mean value, a sum of second weighted pixel values, wherein a second weighted pixel value from the second weighted pixel values is a result of multiplying a pixel value from the second luminance thumbnail image by a respective spatially corresponding distortion correcting weight value from the second distortion correcting weight map, normalized by a sum of the distortion correcting weight values from the second distortion correcting weight map. Obtaining the aggregate weighted mean value may include obtaining, as the aggregate weighted mean value, an average of the first normalized weighted mean value and the second normalized weighted mean value.

In the aspects described herein, obtaining the target exposure value may include obtaining a scene luminance value for the input spherical image in accordance with a result of dividing the aggregate weighted mean value by a result of multiplying a target gain value for the input spherical image by a target exposure duration value for the input spherical image. Obtaining the target exposure value may include obtaining the target exposure value in accordance with the scene luminance value.

In the aspects described herein, obtaining the target aggregate gain value may include obtaining, as the target aggregate gain value, a product of multiplying an exposure duration value used to capture the input spherical image, a sensor gain value of the input spherical image as captured, and a remaining gain for the input spherical image.

In the aspects described herein, obtaining the target aggregate gain value may include obtaining the remaining gain in accordance with the target exposure value and the aggregate weighted mean value.

In the aspects described herein, obtaining the region of interest ratio value may include obtaining, as the region of interest ratio value, a result of dividing the aggregate weighted mean value by a mean value of a region of interest luminance thumbnail.

In the aspects described herein, obtaining the region of interest ratio value may include obtaining the region of interest luminance thumbnail in accordance with region of interest data and at least one of the first luminance thumbnail image or the second luminance thumbnail image.

In the aspects described herein, obtaining the processed spherical image in accordance with the region of interest ratio value may include obtaining, as a target aggregate gain region of interest value, a product of the target aggregate gain value and the region of interest ratio value. Obtaining the processed spherical image in accordance with the region of interest ratio value may include obtaining a temporally smoothed target aggregate gain in accordance with the target aggregate gain region of interest value. obtaining the processed spherical image in accordance with the region of interest ratio value may include using the temporally smoothed target aggregate gain as the target aggregate gain value.

In the aspects described herein, obtaining the processed spherical image may include obtaining the first gradient histogram by obtaining a first gradient of the first luminance thumbnail image in accordance with the first distortion correcting weight map. Obtaining the processed spherical image may include obtaining the first gradient histogram by obtaining, as the first gradient histogram, a histogram of the first gradient. Obtaining the processed spherical image may include obtaining the second gradient histogram by obtaining a second gradient of the second luminance thumbnail image in accordance with the second distortion correcting weight map. Obtaining the processed spherical image may include obtaining the second gradient histogram by obtaining, as the second gradient histogram, a histogram of the second gradient.

In the aspects described herein, obtaining the processed spherical image may include obtaining a first weighted RGB histogram for the first input image. Obtaining the processed spherical image may include obtaining a second weighted RGB histogram for the second input image. Obtaining the processed spherical image may include obtaining a contrast control black point value for the processed spherical image in accordance with the first weighted RGB histogram and the second weighted RGB histogram.

In the aspects described herein, obtaining the first weighted RGB histogram may include accessing a first RGB histogram for the first input image. Obtaining the first weighted RGB histogram may include obtaining the first weighted RGB histogram in accordance with the first RGB histogram and the first distortion correcting weight map. Obtaining the second weighted RGB histogram may include accessing a second RGB histogram for the second input image. Obtaining the second weighted RGB histogram may include obtaining the second weighted RGB histogram in accordance with the second RGB histogram and the second distortion correcting weight map.

The aspects described herein may include performing any combination of obtaining, as the first normalized weighted mean value, a sum of first weighted pixel values, wherein a first weighted pixel value from the first weighted pixel values is a result of multiplying a pixel value from the first luminance thumbnail image by a respective spatially corresponding distortion correcting weight value from the first distortion correcting weight map, normalized by a sum of the distortion correcting weight values from the first distortion correcting weight map, obtaining, as the second normalized weighted mean value, a sum of second weighted pixel values, wherein a second weighted pixel value from the second weighted pixel values is a result of multiplying a pixel value from the second luminance thumbnail image by a respective spatially corresponding distortion correcting weight value from the second distortion correcting weight map, normalized by a sum of the distortion correcting weight values from the second distortion correcting weight map, obtaining, as the aggregate weighted mean value, an average of the first normalized weighted mean value and the second normalized weighted mean value, obtaining a scene luminance value for the input spherical image in accordance with a result of dividing the aggregate weighted mean value by a result of multiplying a target gain value for the input spherical image by a target exposure duration value for the input spherical image, obtaining the target exposure value in accordance with the scene luminance value, obtaining, as the target aggregate gain value, a product of multiplying an exposure duration value used to capture the input spherical image, a sensor gain value of the input spherical image as captured, and a remaining gain for the input spherical image, obtaining the remaining gain in accordance with the target exposure value and the aggregate weighted mean value, obtaining, as the region of interest ratio value, a result of dividing the aggregate weighted mean value by a mean value of a region of interest luminance thumbnail, obtaining the region of interest luminance thumbnail in accordance with region of interest data and at least one of the first luminance thumbnail image or the second luminance thumbnail image, obtaining, as a target aggregate gain region of interest value, a product of the target aggregate gain value and the region of interest ratio value, obtaining a temporally smoothed target aggregate gain in accordance with the target aggregate gain region of interest value, using the temporally smoothed target aggregate gain as the target aggregate gain value, obtaining a first gradient of the first luminance thumbnail image in accordance with the first distortion correcting weight map, obtaining, as the first gradient histogram, a histogram of the first gradient, obtaining a second gradient of the second luminance thumbnail image in accordance with the second distortion correcting weight map, obtaining, as the second gradient histogram, a histogram of the second gradient, obtaining a first weighted RGB histogram for the first input image, obtaining a second weighted RGB histogram for the second input image, obtaining a contrast control black point value for the processed spherical image in accordance with the first weighted RGB histogram and the second weighted RGB histogram, accessing a first RGB histogram for the first input image, obtaining the first weighted RGB histogram in accordance with the first RGB histogram and the first distortion correcting weight map, accessing a second RGB histogram for the second input image, and obtaining the second weighted RGB histogram in accordance with the second RGB histogram and the second distortion correcting weight map.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 2A-1B are isometric views of another example of an image capture apparatus.

DETAILED DESCRIPTION

Figure 1A:
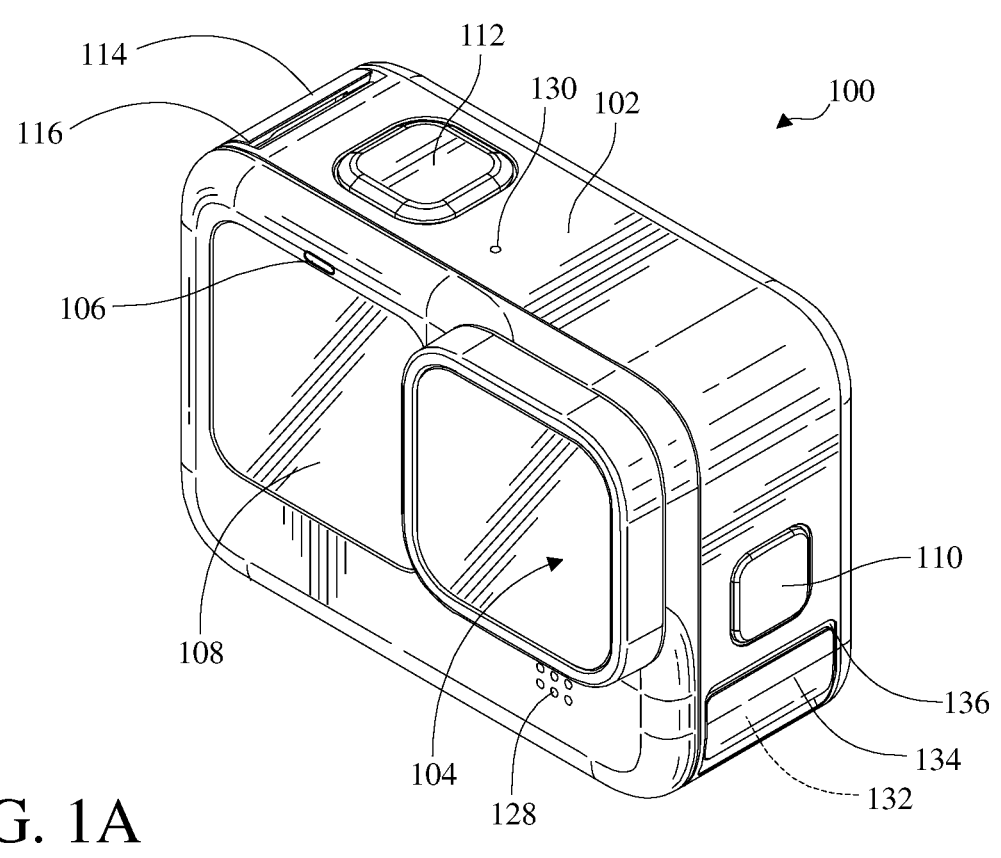
FIGS. 1A-1B are isometric views of an example of an image capture apparatus.

In an image capture apparatus, the quantity of light captured in an image, or frame, correlates to the amount of information captured in the image, or frame, and to image quality. Image quality, such as may be indicated by a signal-to-noise ratio (SNR) measured, calculated, or determined therefor, increases in correlation to the amount of light captured, subject to limitations or conditions, such as saturation and motion blur. The amount of light captured may be controlled, for a respective scene, by controlling the aperture, lens pupil diameter, exposure duration, or a combination thereof. Some image capture apparatuses apply gain to increase, or amplify, the captured image signal. The signal-to-noise ratio of a captured image corresponds with the gain and the gray level, brightness, or luminance, per pixel. An increase in gain for a respective gray level corresponds with a lower signal-to-noise ratio, whereas an increase in the gray level for a respective gain corresponds with a higher signal-to-noise ratio.

Image acquisition conditions, such as lighting conditions, image capture apparatus motion, image capture apparatuses constraints, such as hardware constraints, software constraints, or both, or combinations thereof, may limit the amount of information captured in the image or otherwise limit image quality. For example, in some image capture apparatuses, the aperture, lens pupil diameter, or both, may be fixed and hardware constraints, such as ruggedness constraints, may limit or prevent the use of autofocus, which may correspond with the use of a relatively large depth of field, which may correlate to the amount of light captured by the sensor, as lens pupil diameter influences depth of field. In another example, limitations on maximum pixel values may lead to pixel saturation, limiting the amount of information captured in the image. In another example, the exposure duration may be limited by the framerate, which may be expressed as frames per second (fps), such that determining a maximum exposure duration (expDurMax) may be expressed as expDurMax=1/fps, and the combination of exposure duration and image capture apparatus motion may correlate to motion blur, which may limit, such as reduce the strength of, the performance of electronic image stabilization (EIS). For example, relatively high exposure duration and image capture apparatus motion corresponds with relatively high motion blur.

The amount of information captured in a frame, image quality, or both, may be optimized by balancing with respect to signal-to-noise ratio, pixel saturation, and motion blur. For example, an image capture apparatus may include an adaptive acquisition control component that may include an auto-exposure component that automatically determines one or more adaptive acquisition control parameters, such as an exposure duration value, a sensor gain value, an aperture value, or a combination thereof, for controlling an image sensor of the image capture apparatus to capture one or more images, or frames, to optimize the amount of information, quality, or both, per frame as captured. In another example, the adaptive acquisition control component may include a tone control component, such as a global tone mapping component, which processes captured images, or frames, to maximize perceived quality of resulting processed, or partially processed, images, or frames, output by the image capture apparatus, such as for presentation to a user.

Limitations of image capture apparatuses may result in sub-optimal captured image quality, such as noisy or blurry images, uncaptured information, such as with respect to saturated pixels, or a combination thereof. For example, in some image capture apparatus, an auto-exposure component may identify an exposure duration value, a sensor gain value, or both, that are relatively high, which may result in captured images having saturated portions, or that are relatively low, which may result in an overly dark image. In another example, in relatively bright lighting conditions, a relatively high exposure duration may result in overly bright and saturated image portions, which may include values for some pixels clipped at the maximum value of the sensor such that image detail is unavailable.

Limitations of image capture apparatuses may result in sub-optimal output image quality, such as overly bright or overly dark images, or frames. For example, a tone control component may have limited adaptability to rapid changes in scene composition. In another example, a tone control component may be limited, constrained, or both, such that processed images are too dark in some areas, such as shadow areas. In another example, another image processing component of the image capture apparatus, such as an auto-exposure compensation component or a local tone mapping component, may be constrained by or may be inconsistent, or conflicting, with the tone control component, which may result in a tone curve determined for processing an image to reach a target histogram that is far from the current one (after auto-exposure compensation), resulting reduced image quality, such as including over-boosted shadows.

Image capture apparatuses implementing tone mapping for spherical images for image and video acquisition and processing as described herein may generate processed spherical images having improved image exposure, quality, or both, relative to image capture apparatuses that omit or exclude the tone mapping for spherical images for image and video acquisition and processing described herein, or portions thereof, such as image capture apparatuses that obtain processed spherical images based on image data in a rectangular portion of the captured images that are within a circular, or elliptical, content portion of the captured images may omit, skip, or exclude using image data from within the circular, or elliptical, content portion that is outside the rectangular portion, which may generate processed spherical images having reduced image exposure, quality, or both, relative to image capture apparatuses that implement the tone mapping for spherical images for image and video acquisition and processing described herein. In another example, image capture apparatuses that obtain processed spherical images based on rectangular captured images that include a circular, or elliptical, content portion and a non-content portion outside the circular portion, such as black corners, may use non-content image data, which may generate processed spherical images having reduced image exposure, quality, or both, relative to image capture apparatuses that implement the tone mapping for spherical images for image and video acquisition and processing described herein. Tone mapping for spherical images for image and video acquisition and processing as described herein may include using one or more distortion correcting weight maps to omit, exclude, or avoid using non-content image data, correct for distortion of image content associated with spherical or hemispherical image capture, or a combination thereof.

Figure 1B:
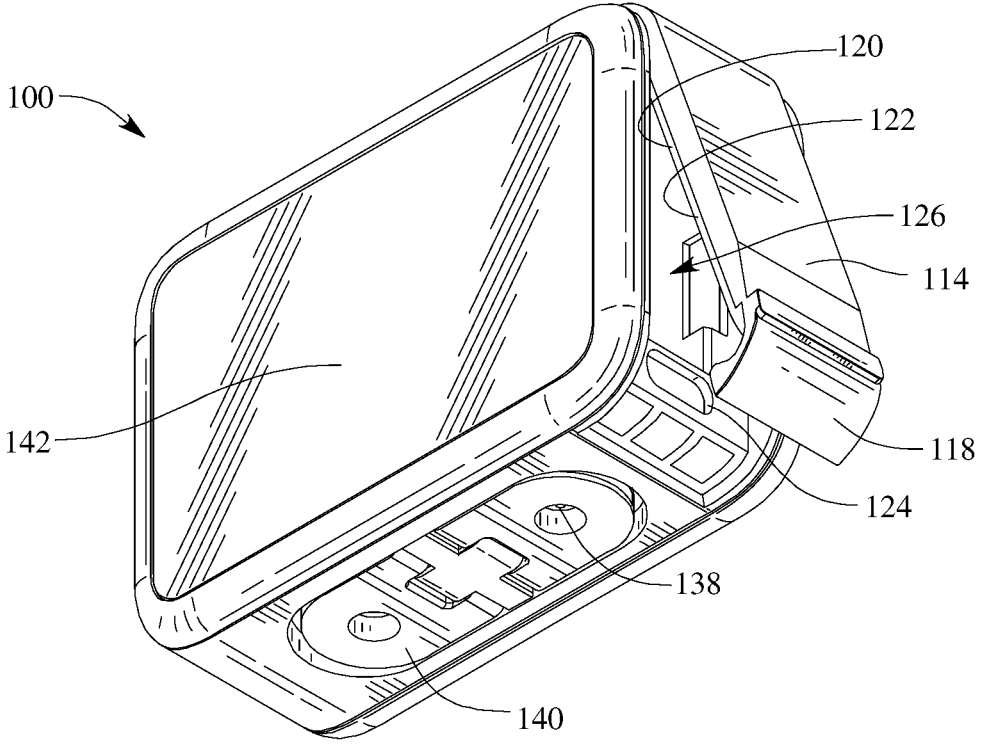
Figure 5:
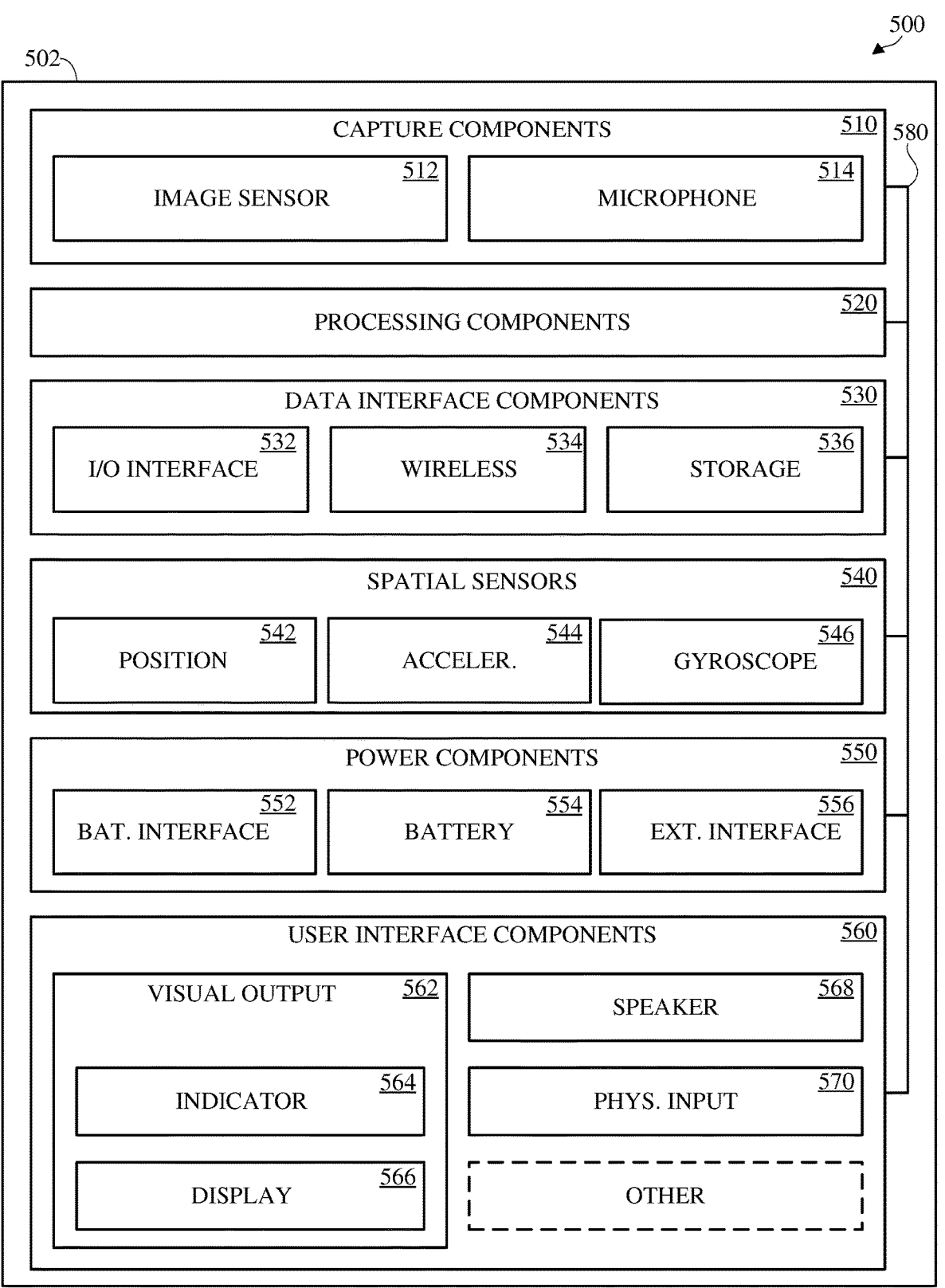
FIG. 5 is a block diagram of electronic components of an image capture apparatus.

FIGS. 1A-1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
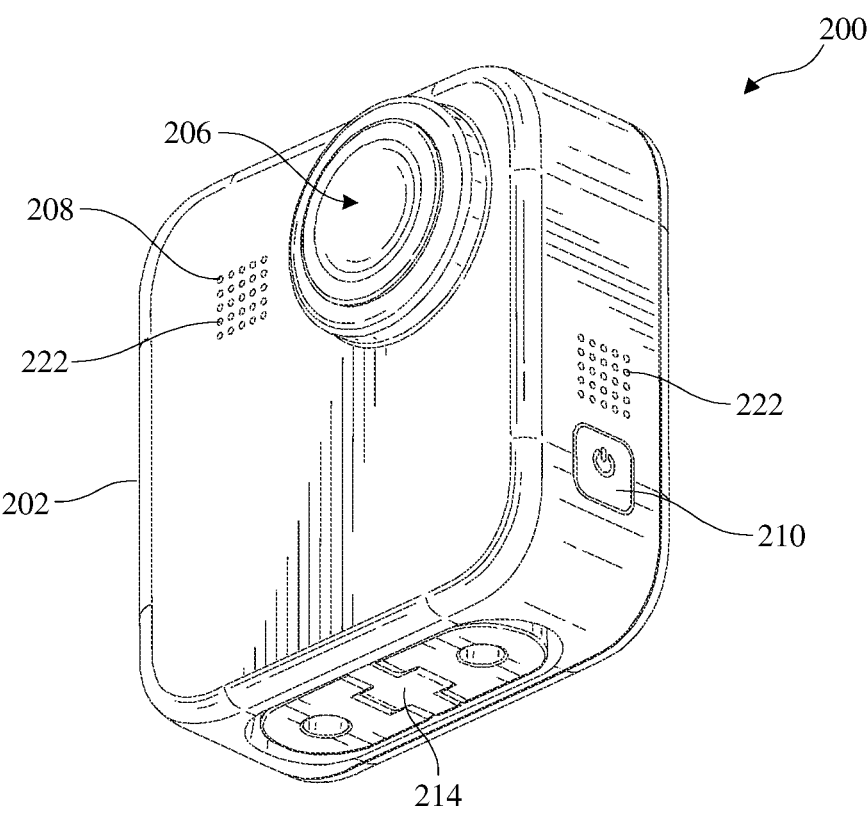
Figure 2B:
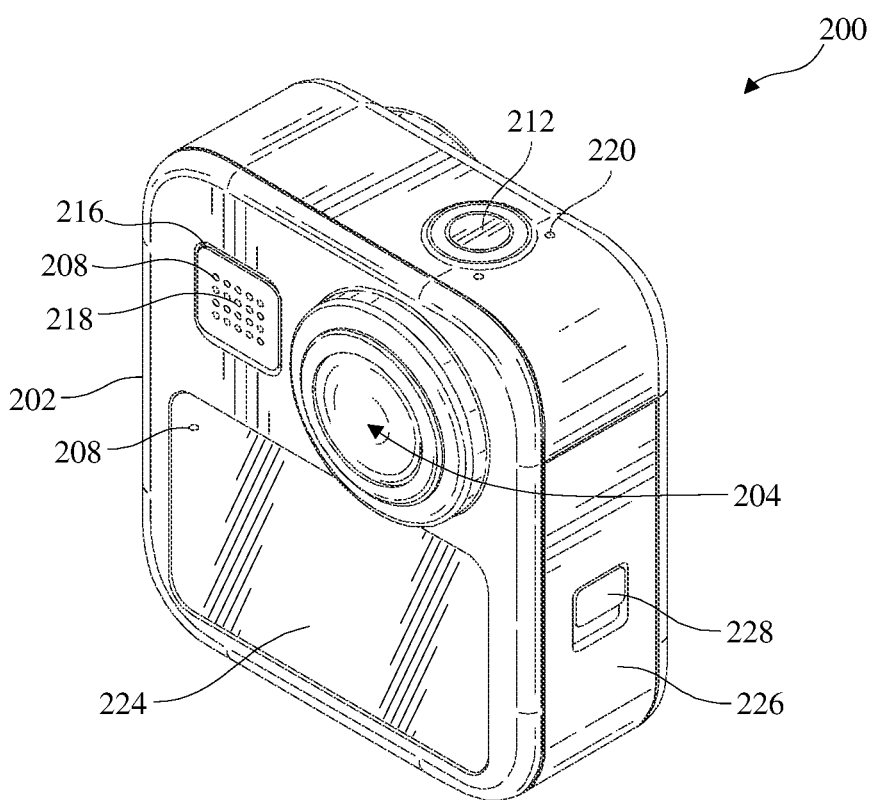

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-2B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
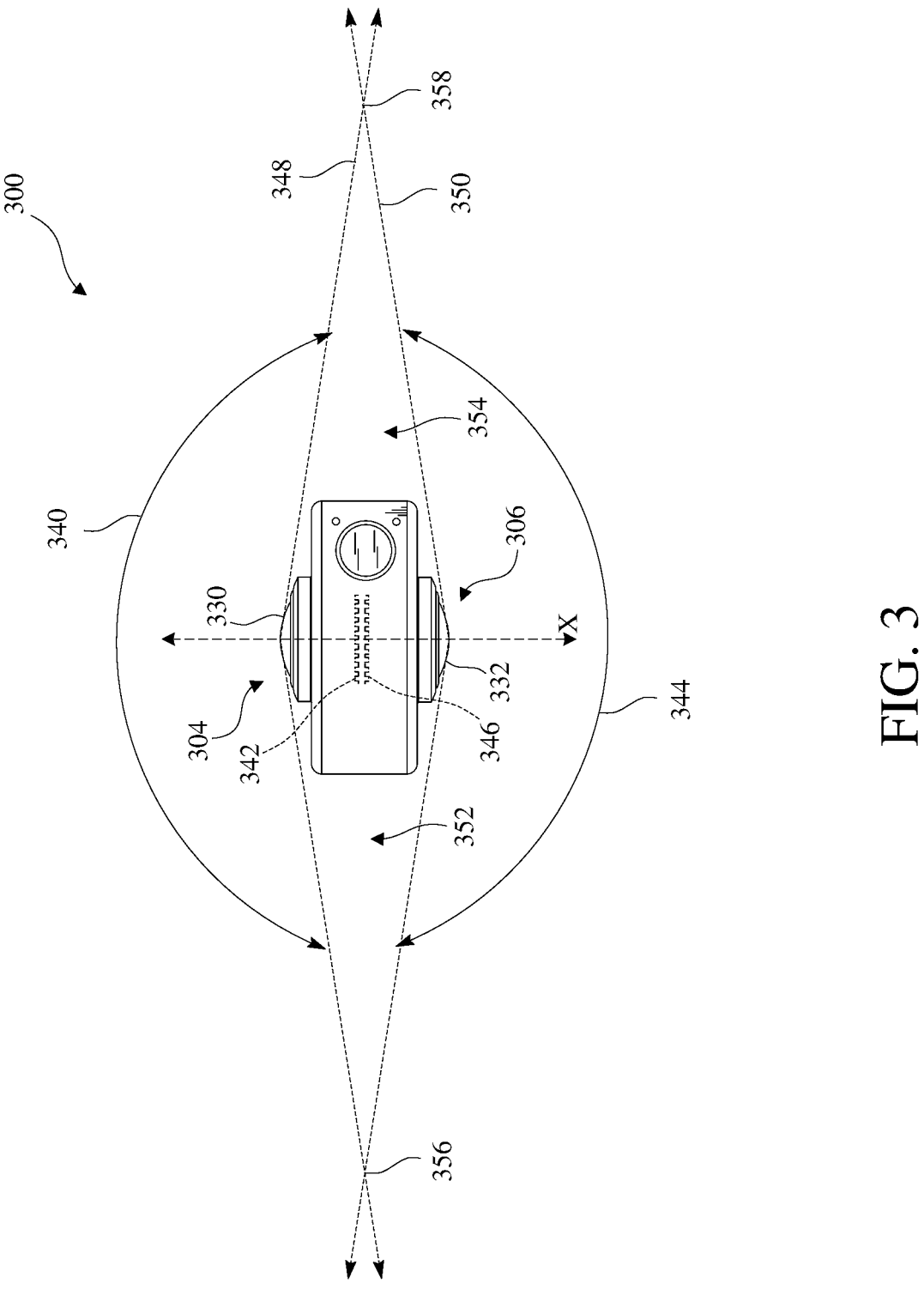
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured (e.g., measured or detected photons) concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
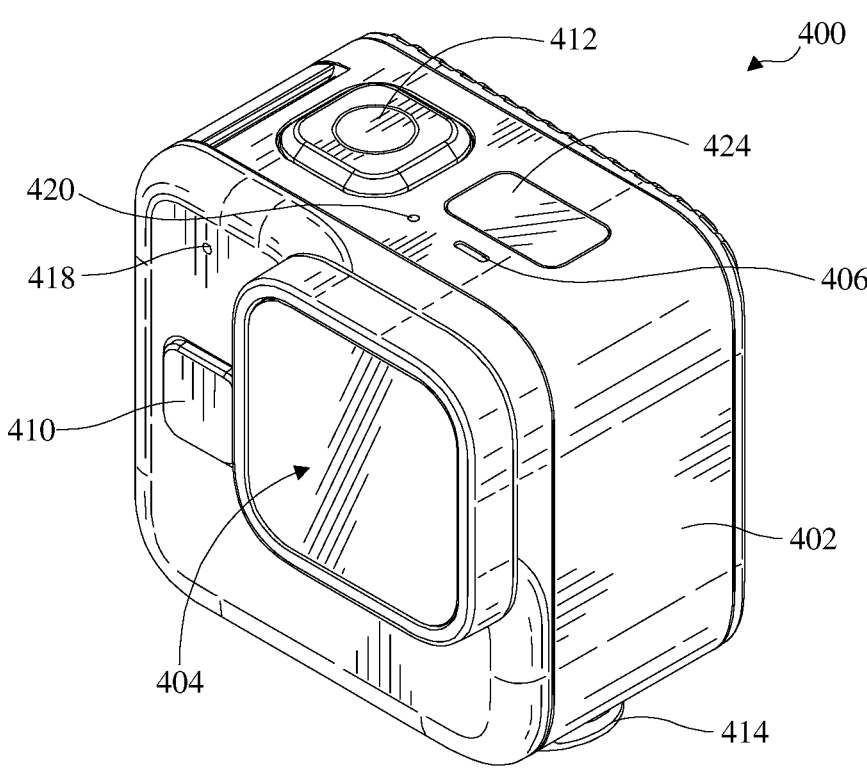
FIGS. 4A-4B are isometric views of another example of an image capture apparatus.
Figure 4B:
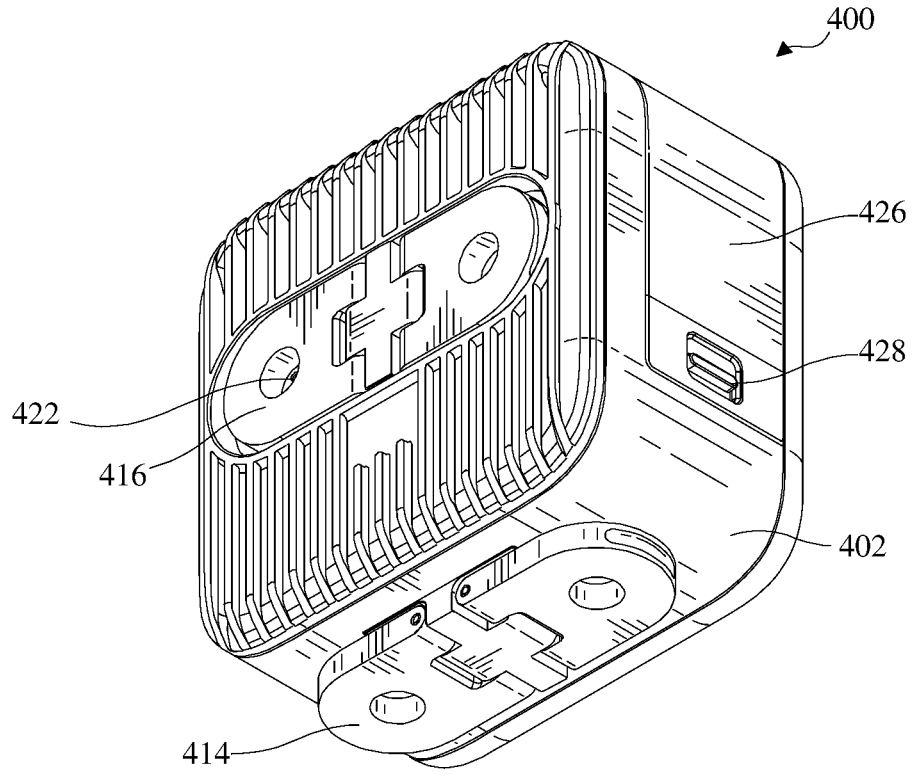

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIGS. 4A, the image capture apparatus 400 may include other indictors structured on respective surfaces of the body 402.

As shown in FIGS. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-1B, the image capture apparatus 200 shown in FIGS. 2A-2B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 captures light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures light as image data and conveys the image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with image acquisition by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may capture, detect, receive, or otherwise process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6:
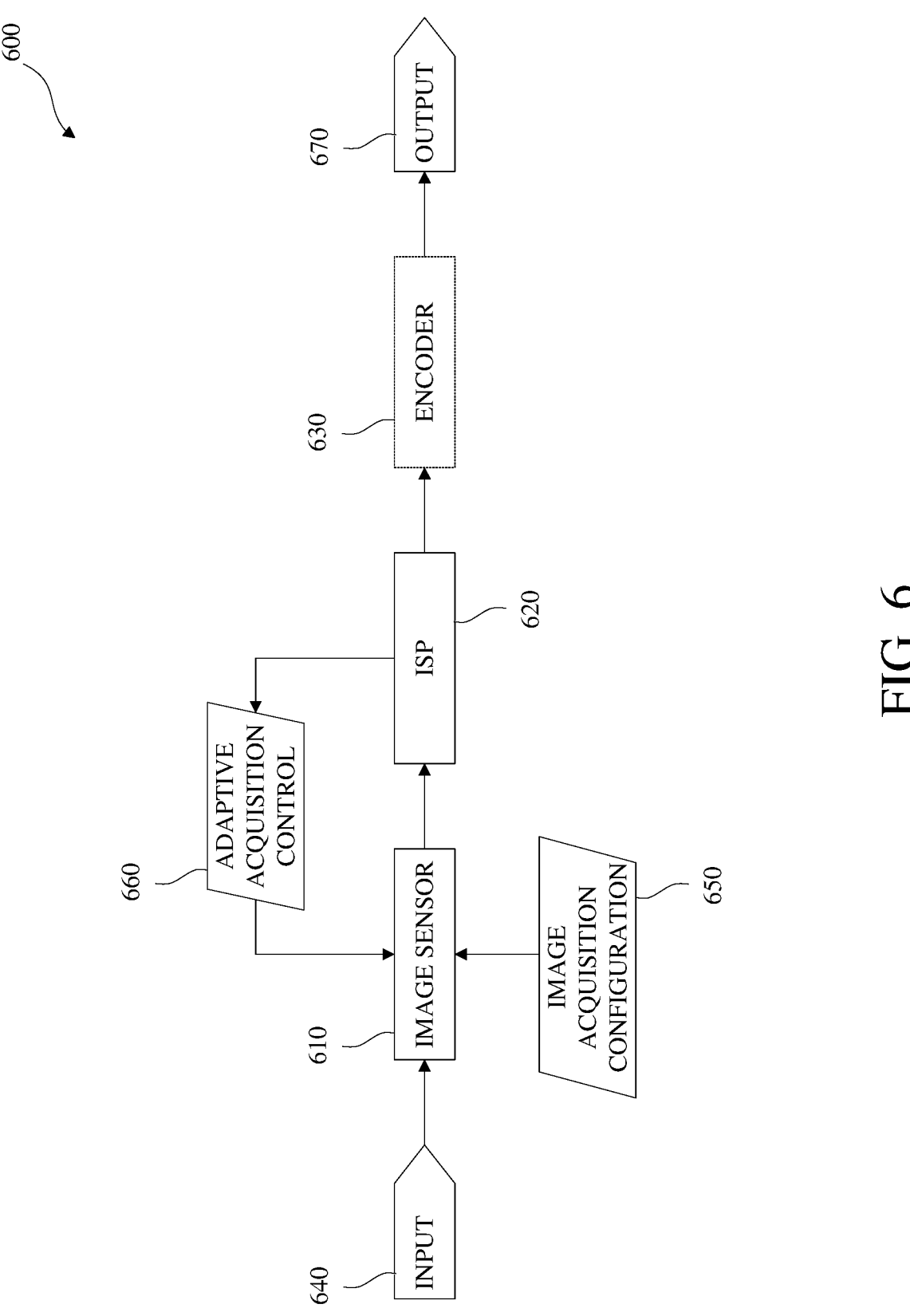
FIG. 6 is a flow diagram of an example of an image processing pipeline.

FIG. 6 is a block diagram of an example of an image processing pipeline 600. The image processing pipeline 600, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or another image capture apparatus. In some implementations, the image processing pipeline 600 may be implemented in a digital signal processor (DSP), an application-specific integrated circuit (ASIC), or a combination of a digital signal processor and an application-specific integrated circuit. One or more components of the pipeline 600 may be implemented in hardware, software, or a combination of hardware and software.

As shown in FIG. 6, the image processing pipeline 600 includes an image sensor 610, an image signal processor (ISP) 620, and an encoder 630. The encoder 630 is shown with a broken line border to indicate that the encoder may be omitted, or absent, from the image processing pipeline 600. In some implementations, the encoder 630 may be included in another device. In implementations that include the encoder 630, the image processing pipeline 600 may be an image processing and coding pipeline. The image processing pipeline 600 may include components other than the components shown in FIG. 6.

The image sensor 610 receives input 640, such as photons incident on the image sensor 610. The image sensor 610 captures image data (source image data). Capturing source image data includes measuring or sensing the input 640, which may include counting, or otherwise measuring, photons incident on the image sensor 610, such as for a defined temporal duration or period (exposure). Capturing source image data includes converting the analog input 640 to a digital source image signal in a defined format, which may be referred to herein as "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern.

Although one image sensor 610 is shown in FIG. 6, the image processing pipeline 600 may include two or more image sensors. In some implementations, an image, or frame, such as an image, or frame, included in the source image signal, may be one of a sequence or series of images or frames of a video, such as a sequence, or series, of frames captured at a rate, or frame rate, which may be a number or cardinality of frames captured per defined temporal period, such as twenty-four, thirty, sixty, or one-hundred twenty frames per second.

The image sensor 610 obtains image acquisition configuration data 650. The image acquisition configuration data 650 may include image cropping parameters, binning/skipping parameters, pixel rate parameters, bitrate parameters, resolution parameters, framerate parameters, or other image acquisition configuration data or combinations of image acquisition configuration data. Obtaining the image acquisition configuration data 650 may include receiving the image acquisition configuration data 650 from a source other than a component of the image processing pipeline 600. For example, the image acquisition configuration data 650, or a portion thereof, may be received from another component, such as a user interface component, of the image capture apparatus implementing the image processing pipeline 600, such as one or more of the user interface components 560 shown in FIG. 5. The image sensor 610 obtains, outputs, or both, the source image data in accordance with the image acquisition configuration data 650. For example, the image sensor 610 may obtain the image acquisition configuration data 650 prior to capturing the source image.

The image sensor 610 receives, or otherwise obtains or accesses, adaptive acquisition control data 660, such as auto exposure (AE) data, auto white balance (AWB) data, global tone mapping (GTM) data, Auto Color Lens Shading (ACLS) data, color correction data, or other adaptive acqui-sition control data or combination of adaptive acquisition control data. For example, the image sensor 610 receives the adaptive acquisition control data 660 from the image signal processor 620. The image sensor 610 obtains, outputs, or both, the source image data in accordance with the adaptive acquisition control data 660.

The image sensor 610 controls, such as configures, sets, or modifies, one or more image acquisition parameters or settings, or otherwise controls the operation of the image signal processor 620, in accordance with the image acqui-sition configuration data 650 and the adaptive acquisition control data 660. For example, the image sensor 610 may capture a first source image using, or in accordance with, the image acquisition configuration data 650, and in the absence of adaptive acquisition control data 660 or using defined values for the adaptive acquisition control data 660, output the first source image to the image signal processor 620, obtain adaptive acquisition control data 660 generated using the first source image data from the image signal processor 620, and capture a second source image using, or in accor-dance with, the image acquisition configuration data 650 and the adaptive acquisition control data 660 generated using the first source image. In an example, the adaptive acquisition control data 660 may include an exposure duration value and the image sensor 610 may capture an image in accordance with the exposure duration value.

The image sensor 610 outputs source image data, which may include the source image signal, image acquisition data, or a combination thereof, to the image signal processor 620.

The image signal processor 620 receives, or otherwise accesses or obtains, the source image data from the image sensor 610. The image signal processor 620 processes the source image data to obtain input image data. In some implementations, the image signal processor 620 converts the raw image signal (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

Processing the source image data includes generating the adaptive acquisition control data 660. The adaptive acqui-sition control data 660 includes data for controlling the detection or acquisition of a one or more images by the image sensor 610.

The image signal processor 620 includes components not expressly shown in FIG. 6 for obtaining and processing the source image data. For example, the image signal processor 620 may include one or more sensor input (SEN) compo-nents (not shown), one or more sensor readout (SRO) components (not shown), one or more image data compres-sion components, one or more image data decompression components, one or more internal memory, or data storage, components, one or more Bayer-to-Bayer (B2B) compo-nents, one or more local motion estimation (LME) compo-nents, one or more local motion compensation (LMC) components, one or more global motion compensation (GMC) components, one or more Bayer-to-RGB (B2R) components, one or more image processing units (IPU), one or more high dynamic range (HDR) components, one or more three-dimensional noise reduction (3DNR) compo-nents, one or more sharpening components, one or more raw-to-YUV (R2Y) components, one or more Chroma Noise Reduction (CNR) components, one or more local tone mapping (LTM) components, one or more YUV-to-YUV (Y2Y) components, one or more warp and blend compo-nents, one or more stitching cost components, one or more scaler components, or a configuration controller. The image signal processor 620, or respective components thereof, may be implemented in hardware, software, or a combination of hardware and software. Although one image signal proces-sor 620 is shown in FIG. 6, the image processing pipeline 600 may include multiple image signal processors. In imple-mentations that include multiple image signal processors, the functionality of the image signal processor 620 may be divided or distributed among the image signal processors.

In some implementations, the image signal processor 620 may implement or include multiple parallel, or partially parallel paths for image processing. For example, for high dynamic range image processing based on two source images, the image signal processor 620 may implement a first image processing path for a first source image and a second image processing path for a second source image, wherein the image processing paths may include compo-nents that are shared among the paths, such as memory components, and may include components that are sepa-rately included in each path, such as a first sensor readout component in the first image processing path and a second sensor readout component in the second image processing path, such that image processing by the respective paths may be performed in parallel, or partially in parallel.

The image signal processor 620, or one or more compo-nents thereof, such as the sensor input components, may perform black-point removal for the image data. In some implementations, the image sensor 610 may compress the source image data, or a portion thereof, and the image signal processor 620, or one or more components thereof, such as one or more of the sensor input components or one or more of the image data decompression components, may decom-press the compressed source image data to obtain the source image data.

The image signal processor 620, or one or more compo-nents thereof, such as the sensor readout components, may perform dead pixel correction for the image data. The sensor readout component may perform scaling for the image data. The sensor readout component may obtain, such as generate or determine, adaptive acquisition control data, such as auto exposure data, auto white balance data, global tone mapping data, Auto Color Lens Shading data, or other adaptive acquisition control data, based on the source image data.

The image signal processor 620, or one or more compo-nents thereof, such as the image data compression compo-nents, may obtain the image data, or a portion thereof, such as from another component of the image signal processor 620, compress the image data, and output the compressed image data, such as to another component of the image signal processor 620, such as to a memory component of the image signal processor 620.

The image signal processor 620, or one or more components thereof, such as the image data decompression, or uncompression, components (UCX), may read, receive, or otherwise access, compressed image data and may decompress, or uncompress, the compressed image data to obtain image data. In some implementations, other components of the image signal processor 620 may request, such as send a request message or signal, the image data from an uncompression component, and, in response to the request, the uncompression component may obtain corresponding compressed image data, uncompress the compressed image data to obtain the requested image data, and output, such as send or otherwise make available, the requested image data to the component that requested the image data. The image signal processor 620 may include multiple uncompression components, which may be respectively optimized for uncompression with respect to one or more defined image data formats.

The image signal processor 620, or one or more components thereof, such as the internal memory, or data storage, components. The memory components store image data, such as compressed image data internally within the image signal processor 620 and are accessible to the image signal processor 620, or to components of the image signal processor 620. In some implementations, a memory component may be accessible, such as write accessible, to a defined component of the image signal processor 620, such as an image data compression component, and the memory component may be accessible, such as read accessible, to another defined component of the image signal processor 620, such as an uncompression component of the image signal processor 620.

The image signal processor 620, or one or more components thereof, such as the Bayer-to-Bayer components, which may process image data, such as to transform or convert the image data from a first Bayer format, such as a signed 15-bit Bayer format data, to second Bayer format, such as an unsigned 14-bit Bayer format. The Bayer-to-Bayer components may obtain, such as generate or determine, high dynamic range Tone Control data based on the current image data.

Although not expressly shown in FIG. 6, in some implementations, a respective Bayer-to-Bayer component may include one or more sub-components. For example, the Bayer-to-Bayer component may include one or more gain components. In another example, the Bayer-to-Bayer component may include one or more offset map components, which may respectively apply respective offset maps to the image data. The respective offset maps may have a configurable size, which may have a maximum size, such as 129×129. The respective offset maps may have a non-uniform grid. Applying the offset map may include saturation management, which may preserve saturated areas on respective images based on R, G, and B values. The values of the offset map may be modified per-frame and double buffering may be used for the map values. A respective offset map component may, such as prior to Bayer noise removal (denoising), compensate for non-uniform black point removal, such as due to non-uniform thermal heating of the sensor or image capture device. A respective offset map component may, such as subsequent to Bayer noise removal, compensate for flare, such as flare on hemispherical lenses, and/or may perform local contrast enhancement, such a dehazing or local tone mapping.

In another example, the Bayer-to-Bayer component may include a Bayer Noise Reduction (Bayer NR) component, which may convert image data, such as from a first format, such as a signed 15-bit Bayer format, to a second format, such as an unsigned 14-bit Bayer format. In another example, the Bayer-to-Bayer component may include one or more lens shading (FSHD) component, which may, respectively, perform lens shading correction, such as luminance lens shading correction, color lens shading correction, or both. In some implementations, a respective lens shading component may perform exposure compensation between two or more sensors of a multi-sensor image capture apparatus, such as between two hemispherical lenses. In some implementations, a respective lens shading component may apply map-based gains, radial model gain, or a combination, such as a multiplicative combination, thereof. In some implementations, a respective lens shading component may perform saturation management, which may preserve saturated areas on respective images. Map and lookup table values for a respective lens shading component may be configured or modified on a per-frame basis and double buffering may be used.

In another example, the Bayer-to-Bayer component may include a PZSFT component. In another example, the Bayer-to-Bayer component may include a half-RGB (½ RGB) component. In another example, the Bayer-to-Bayer component may include a color correction (CC) component, which may obtain subsampled data for local tone mapping, which may be used, for example, for applying an unsharp mask. In another example, the Bayer-to-Bayer component may include a Tone Control (TC) component, which may obtain subsampled data for local tone mapping, which may be used, for example, for applying an unsharp mask. In another example, the Bayer-to-Bayer component may include a Gamma (GM) component, which may apply a lookup-table independently per channel for color rendering (gamma curve application). Using a lookup-table, which may be an array, may reduce resource utilization, such as processor utilization, using an array indexing operation rather than more complex computation. The gamma component may obtain subsampled data for local tone mapping, which may be used, for example, for applying an unsharp mask.

In another example, the Bayer-to-Bayer component may include an RGB binning (RGB BIN) component, which may include a configurable binning factor, such as a binning factor configurable in the range from four to sixteen, such as four, eight, or sixteen. One or more sub-components of the Bayer-to-Bayer component, such as the RGB Binning component and the half-RGB component, may operate in parallel. The RGB binning component may output image data, such as to an external memory, which may include compressing the image data. The output of the RGB binning component may be a binned image, which may include low-resolution image data or low-resolution image map data. The output of the RGB binning component may be used to extract statistics for combing images, such as combining hemispherical images. The output of the RGB binning component may be used to estimate flare on one or more lenses, such as hemispherical lenses. The RGB binning component may obtain G channel values for the binned image by averaging Gr channel values and Gb channel values. The RGB binning component may obtain one or more portions of or values for the binned image by averaging pixel values in spatial areas identified based on the binning factor. In another example, the Bayer-to-Bayer component may include, such as for spherical image processing, an RGB-to-YUV component, which may obtain tone mapping statistics, such as histogram data and thumbnail data, using a weight map, which may weight respective regions of interest prior to statistics aggregation.

The image signal processor 620, or one or more components thereof, such as the local motion estimation components, which may generate local motion estimation data for use in image signal processing and encoding, such as in correcting distortion, stitching, and/or motion compensation. For example, the local motion estimation components may partition an image into blocks, arbitrarily shaped patches, individual pixels, or a combination thereof. The local motion estimation components may compare pixel values between frames, such as successive images, to determine displacement, or movement, between frames, which may be expressed as motion vectors (local motion vectors).

The image signal processor 620, or one or more components thereof, such as the local motion compensation components, which may obtain local motion data, such as local motion vectors, and may spatially apply the local motion data to an image to obtain a local motion compensated image or frame and may output the local motion compensated image or frame to one or more other components of the image signal processor 620.

The image signal processor 620, or one or more components thereof, such as the global motion compensation components, may receive, or otherwise access, global motion data, such as global motion data from a gyroscopic unit of the image capture apparatus, such as the gyroscope 546 shown in FIG. 5, corresponding to the current frame. The global motion compensation component may apply the global motion data to a current image to obtain a global motion compensated image, which the global motion compensation component may output, or otherwise make available, to one or more other components of the image signal processor 620

The image signal processor 620, or one or more components thereof, such as the Bayer-to-RGB components, which convert the image data from Bayer format to an RGB format. The Bayer-to-RGB components may implement white balancing and demosaicing. The Bayer-to-RGB components respectively output, or otherwise make available, RGB format image data to one or more other components of the image signal processor 620.

The image signal processor 620, or one or more components thereof, such as the image processing units, which perform warping, image registration, electronic image stabilization, motion detection, object detection, or the like. The image processing units respectively output, or otherwise make available, processed, or partially processed, image data to one or more other components of the image signal processor 620.

The image signal processor 620, or one or more components thereof, such as the high dynamic range components, may, respectively, generate high dynamic range images based on the current input image, the corresponding local motion compensated frame, the corresponding global motion compensated frame, or a combination thereof. The high dynamic range components respectively output, or otherwise make available, high dynamic range images to one or more other components of the image signal processor 620.

The high dynamic range components of the image signal processor 620 may, respectively, include one or more high dynamic range core components, one or more tone control (TC) components, or one or more high dynamic range core components and one or more tone control components. For example, the image signal processor 620 may include a high dynamic range component that includes a high dynamic range core component and a tone control component. The high dynamic range core component may obtain, or generate, combined image data, such as a high dynamic range image, by merging, fusing, or combining the image data, such as unsigned 14-bit RGB format image data, for multiple, such as two, images (HDR fusion) to obtain, and output, the high dynamic range image, such as in an unsigned 23-bit RGB format (full dynamic data). The high dynamic range core component may output the combined image data to the Tone Control component, or to other components of the image signal processor 620. The Tone Control component may compress the combined image data, such as from the unsigned 23-bit RGB format data to an unsigned 17-bit RGB format (enhanced dynamic data).

The image signal processor 620, or one or more components thereof, such as the three-dimensional noise reduction components reduce image noise for a frame based on one or more previously processed frames and output, or otherwise make available, noise reduced images to one or more other components of the image signal processor 620. In some implementations, the three-dimensional noise reduction component may be omitted or may be replaced by one or more lower-dimensional noise reduction components, such as by a spatial noise reduction component. The three-dimensional noise reduction components of the image signal processor 620 may, respectively, include one or more temporal noise reduction (TNR) components, one or more raw-to-raw (R2R) components, or one or more temporal noise reduction components and one or more raw-to-raw components. For example, the image signal processor 620 may include a three-dimensional noise reduction component that includes a temporal noise reduction component and a raw-to-raw component.

The image signal processor 620, or one or more components thereof, such as the sharpening components, obtains sharpened image data based on the image data, such as based on noise reduced image data, which may recover image detail, such as detail reduced by temporal denoising or warping. The sharpening components respectively output, or otherwise make available, sharpened image data to one or more other components of the image signal processor 620.

The image signal processor 620, or one or more components thereof, such as the raw-to-YUV components, may transform, or convert, image data, such as from the raw image format to another image format, such as the YUV format, which includes a combination of a luminance (Y) component and two chrominance (UV) components. The raw-to-YUV components may, respectively, demosaic, color process, or a both, images.

Although not expressly shown in FIG. 6, in some implementations, a respective raw-to-YUV component may include one or more sub-components. For example, the raw-to-YUV component may include a white balance (WB) component, which performs white balance correction on the image data. In another example, a respective raw-to-YUV component may include one or more color correction components (CC0, CC1), which may implement linear color rendering, which may include applying a 3×3 color matrix. For example, the raw-to-YUV component may include a first color correction component (CC0) and a second color correction component (CC1). In another example, a respective raw-to-YUV component may include a three-dimensional lookup table component, such as subsequent to a first color correction component. Although not expressly shown in FIG. 6, in some implementations, a respective raw-to-YUV component may include a Multi-Axis Color Correction (MCC) component, such as subsequent to a three-dimensional lookup table component, which may implement non-linear color rendering, such as in Hue, Saturation, Value (HSV) space.

In another example, a respective raw-to-YUV component may include a black point RGB removal (BPRGB) component, which may process image data, such as low intensity values, such as values within a defined intensity threshold, such as less than or equal to, $2^8$, to obtain histogram data wherein values exceeding a defined intensity threshold may be omitted, or excluded, from the histogram data processing. In another example, a respective raw-to-YUV component may include a Multiple Tone Control (Multi-TC) component, which may convert image data, such as unsigned 17-bit RGB image data, to another format, such as unsigned 14-bit RGB image data. The Multiple Tone Control component may apply dynamic tone mapping to the Y channel (luminance) data, which may be based on, for example, image capture conditions, such as light conditions or scene conditions. The tone mapping may include local tone mapping, global tone mapping, or a combination thereof.

In another example, a respective raw-to-YUV component may include a Gamma (GM) component, which may convert image data, such as unsigned 14-bit RGB image data, to another format, such as unsigned 10-bit RGB image data. The Gamma component may apply a lookup-table independently per channel for color rendering (gamma curve application). Using a lookup-table, which may be an array, may reduce resource utilization, such as processor utilization, using an array indexing operation rather than more complex computation. In another example, a respective raw-to-YUV component may include a three-dimensional lookup table (3DLUT) component, which may include, or may be, a three-dimensional lookup table, which may map RGB input values to RGB output values through a non-linear function for non-linear color rendering. In another example, a respective raw-to-YUV component may include a Multi-Axis Color Correction (MCC) component, which may implement non-linear color rendering. For example, the multi-axis color correction component may perform color non-linear rendering, such as in Hue, Saturation, Value (HSV) space.

The image signal processor 620, or one or more components thereof, such as the Chroma Noise Reduction (CNR) components, may perform chroma denoising, luma denoising, or both.

The image signal processor 620, or one or more components thereof, such as the local tone mapping components, may perform multi-scale local tone mapping using a single pass approach or a multi-pass approach on a frame at different scales. The as the local tone mapping components may, respectively, enhance detail and may omit introducing artifacts. For example, the Local Tone Mapping components may, respectively, apply tone mapping, which may be similar to applying an unsharp-mask. Processing an image by the local tone mapping components may include obtaining, processing, such as in response to gamma correction, tone control, or both, and using a low-resolution map for local tone mapping.

The image signal processor 620, or one or more components thereof, such as the YUV-to-YUV (Y2Y) components, may perform local tone mapping of YUV images. In some implementations, the YUV-to-YUV components may include multi-scale local tone mapping using a single pass approach or a multi-pass approach on a frame at different scales.

The image signal processor 620, or one or more components thereof, such as the warp and blend components, may warp images, blend images, or both. In some implementations, the warp and blend components may warp a corona around the equator of a respective frame to a rectangle. For example, the warp and blend components may warp a corona around the equator of a respective frame to a rectangle based on the corresponding low-resolution frame. The warp and blend components, may, respectively, apply one or more transformations to the frames, such as to correct for distortions at image edges, which may be subject to a close to identity constraint.

The image signal processor 620, or one or more components thereof, such as the stitching cost components, may generate a stitching cost map, which may be represented as a rectangle having disparity (x) and longitude (y) based on a warping. Respective values of the stitching cost map may be a cost function of a disparity (x) value for a corresponding longitude. Stitching cost maps may be generated for various scales, longitudes, and disparities.

The image signal processor 620, or one or more components thereof, such as the scaler components, may scale images, such as in patches, or blocks, of pixels, such as 16×16 blocks, 8×8 blocks, or patches or blocks of any other size or combination of sizes.

The image signal processor 620, or one or more components thereof, such as the configuration controller, may control the operation of the image signal processor 620, or the components thereof.

The image signal processor 620 outputs processed image data, such as by storing the processed image data in a memory of the image capture apparatus, such as external to the image signal processor 620, or by sending, or otherwise making available, the processed image data to another component of the image processing pipeline 600, such as the encoder 630, or to another component of the image capture apparatus.

The encoder 630 encodes or compresses the output of the image signal processor 620. In some implementations, the encoder 630 implements one or more encoding standards, which may include motion estimation. The encoder 630 outputs the encoded processed image to an output 670. In an embodiment that does not include the encoder 630, the image signal processor 620 outputs the processed image to the output 670. The output 670 may include, for example, a display, such as a display of the image capture apparatus, such as one or more of the displays 108, 142 shown in FIGS. 1A-1B, the display 224 shown in FIG. 2B, the display 424 shown in FIG. 4A, or the display 566 shown in FIG. 5, to a storage device, or both. The output 670 is a signal, such as to an external device.

Figure 7:
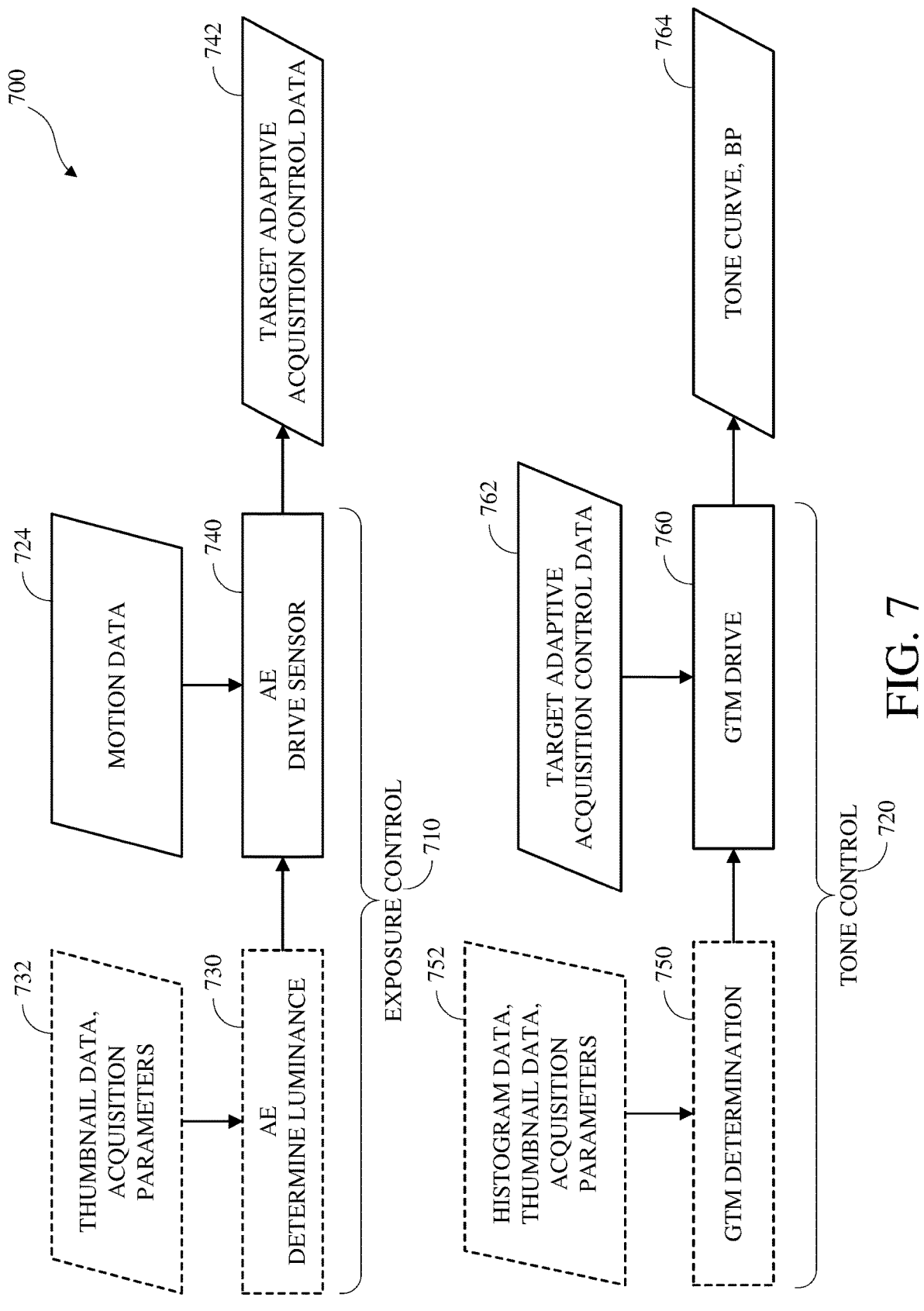
FIG. 7 is a block diagram of an example of an adaptive acquisition control component of an image capture apparatus.

FIG. 7 is a block diagram of an example of an adaptive acquisition control component 700. The adaptive acquisition control component 700, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, as a part, or parts, of the image processing pipeline 600 shown in FIG. 6, or in another image capture apparatus. In some implementations, the adaptive acquisition control component 700 may be implemented in a digital signal processor (DSP), an application-specific integrated circuit (ASIC), or a combination of a digital signal processor and an application-specific integrated circuit. One or more aspects of the adaptive acquisition control component 700 may be implemented in hardware, software, or a combination of hardware and software.

The adaptive acquisition control component 700 determines and controls the exposure for images, or frames, captured by an image capture apparatus, such as a RAW image as captured by a sensor of the image capture apparatus, and processed by the image processing pipeline thereof, that implements the adaptive acquisition control component 700, to obtain, and output, a processed, or partially processed, image, or frame.

In some implementations, the effective, or operative, sensitivity of an image sensor, such as the image sensor of the image capture device 104 shown in FIG. 1, the image sensors 342, 346 shown in FIG. 3, the image sensor 512 shown in FIG. 5, or the image sensor 610 shown in FIG. 6, is expressed, controlled, or both, as a gain value, which may be a floating point value, such as one (1.0). The gain value may be expressed or presented, such as to a user of the image capture apparatus, as an International Standards Organization (ISO) equivalence value (ISO value), which may be expressed as ISO value=gain*100. The exposure for an image, or frame, indicates the perceived luminosity or brightness of the image and may be expressed as a mean gray level of a luminance, or luma, channel or a median of the luminance, or luma, histogram thereof. Accurate exposure correlates to perceived image quality. Low, or dark, exposure and high, or bright, exposure may be perceived as low quality.

As shown in FIG. 7, the adaptive acquisition control component 700 includes an exposure control, or auto-exposure, portion, or component, 710 and a tone control portion, or component, 720. The adaptive acquisition control component 700 may include components other than the components shown in FIG. 7. For example, the image capture apparatus that implements the adaptive acquisition control component 700 may include an image sensor, such as the image sensor of the image capture device 104 shown in FIG. 1, the image sensors 342, 346 shown in FIG. 3, the image sensor 512 shown in FIG. 5, or the image sensor 610 shown in FIG. 6, and an image signal processor, such as the image signal processor 620 shown in FIG. 6, and the adaptive acquisition control component 700 may include the image sensor, or a portion thereof, the image signal processor, or a portion thereof, or one or more portions of the image sensor and the image signal processor.

The exposure control portion 710 determines adaptive acquisition control data, such as one or more adaptive acquisition control parameters, for subsequent image capture, video capture, or both, to balance motion blur minimization and signal-to-noise ratio (SNR), or quality, maximization. As shown in FIG. 7, the exposure control portion 710 includes an automatic exposure (auto-exposure) luminance determination component 730 (AE DETERMINE LUMINANCE) and an auto-exposure sensor driver 740 (AE DRIVE SENSOR).

The auto-exposure luminance determination component 730 obtains, determines, selects, generates, calculates, produces, or identifies, a scene luminance value, a corresponding target exposure value (targetY or auto-exposure target exposure value), or both. The auto-exposure luminance determination component 730 is shown with a broken line boarder to indicate that the auto-exposure luminance determination component 730 obtains, determines, selects, generates, calculates, produces, or identifies, the scene luminance value, the corresponding target exposure value, or both, periodically, such as in accordance with a determined, or defined, adaptive acquisition control sample period, or corresponding adaptive acquisition control sample rate, which is determined, or defined, in accordance with a current, active, or operative, frame rate for video capture, such as at a fraction of the frame rate, such as one third the frame rate. For example, the operative, active, or current, frame rate may be thirty frames per second (30 fps) and the auto-exposure luminance determination component 730 may obtain, generate, calculate, or determine the scene luminance value and the corresponding target exposure value at an adaptive acquisition control sample rate of ten frames per second (10 fps), such as on a per three captured frames basis. Although described with reference to a determined, or defined, adaptive acquisition control sample period, or corresponding adaptive acquisition control sample rate, other timing control may be implemented.

The auto-exposure luminance determination component 730 accesses, such as reads, such as from a memory of the image capture apparatus, receives, or otherwise obtains, adaptive acquisition control input data 732. The adaptive acquisition control input data 732 is shown with a broken line boarder to indicate that the adaptive acquisition control input data 732 is obtained periodically, such as in accordance with the adaptive acquisition control sample rate, such as on a per-third frame basis for video captured at thirty frames per second (30 fps).

The adaptive acquisition control input data 732 includes adaptive acquisition control data (ACQUISITION PARAMETERS) used to capture an image, or frame, such as an image, or frame, captured in accordance with the adaptive acquisition control sample rate, and, representative image data (THUMBNAIL DATA), including a representative image, obtained from the image, or frame, captured in accordance with the adaptive acquisition control sample rate, such as a reduced image corresponding to the captured image, such as a thumbnail image generated from the captured image, which may be in RGB format (thumbnailRGB), or in another image format, such as another RAW image format, or which may be luminance, or luma, data thereof (thumbnailY), generated from the captured image.

Although not expressly shown in FIG. 7, the adaptive acquisition control input data 732 may include representative histogram data for the image, or frame, as shown, captured in accordance with the adaptive acquisition control sample rate, which may be, or include, histogram data for a raw image, for one or more channels of the image, or frame, which constructively represent the current image. For example, the histogram data may include a histogram of a luminance, or luma, channel of the image, or frame, (histogramY, luma histogram, or representative luma histogram), respective per-channel histograms for the image, or frame, in RGB format (histogramsRGB), or a combination or collection thereof.

Although the adaptive acquisition control input data 732 is shown in FIG. 7 as including the representative image data (THUMBNAIL DATA), other image data, histogram data, or both, may be included in the adaptive acquisition control input data 732. For example, the adaptive acquisition control input data 732 may include the luma histogram (histogramY), the luma thumbnail (thumbnailY), a RAW, or RGB, format thumbnail (thumbnailRGB), per-channel RGB histograms (histogramsRGB), or a combination or collection thereof, of the image, or frame, as captured in accordance with the adaptive acquisition control sample rate.

Although described as constructively representing the current, or most recently captured, image, the representative image data may be generated from, or using, the current image, or a previously captured image captured sequentially before the current image, in accordance with the adaptive acquisition control sample rate. For example, the frame rate may be thirty frames per second (30 fps), first representative image data may be generated from, or using, the sequentially first captured image, and second representative image data may be generated from, or using, the sequentially fourth captured image. For example, the image capture apparatus, or a component thereof, such as the image sensor, may generate, as the representative image, an RGB format thumbnail image by down sampling, subsampling, such as spatially subsampling, cropping, or a combination thereof, the corresponding captured image, and the image capture apparatus, or a component thereof, may include the representative image and the adaptive acquisition control data obtained for capturing the current image in the adaptive acquisition control input data 732. In some implementations, the adaptive acquisition control data may be data output by the auto-exposure sensor driver 740 in accordance with processing a previous frame.

As used herein, the terms "current image", "current frame", "most recently captured image", "most recently captured frame", "source frame", "source image", "input frame", "input image", or variations thereof, refers to the image, or frame, temporally most recently output by the image sensor, except as is described herein or as is otherwise clear from context. For example, in some implementations, the image sensor may have latency such that the current image, or frame, or a portion thereof, may be output by the image sensor concurrently with capturing, or otherwise processing within the image sensor, a temporally subsequent image, or frame, or a portion thereof.

The auto-exposure luminance determination component 730 obtains, determines, selects, generates, calculates, produces, or identifies, the scene luminance value in accordance with the adaptive acquisition control input data 732. Obtaining the scene luminance value may include determining a mean grey level, or value, (meanGreyLevel) of the representative image from the adaptive acquisition control input data 732. Obtaining the scene luminance value includes determining a scene exposition value using the adaptive acquisition control data, from the adaptive acquisition control input data 732, used to capture the image from which the image capture apparatus obtained the representative, or thumbnail, image, which includes a gain value (gain) and an exposure duration (exposureDuration or exposure duration value) used to capture the image from which the image capture apparatus obtained the representative image. The scene exposition value is obtained as a product of multiplying the gain value by the exposure duration (gain*exposureDuration). The scene luminance, or scene luminance value, (sceneLuminance) is proportional to a result of dividing the mean grey value (meanGreyLevel) by the scene exposition value (gain*exposureDuration), which may be expressed as scene luminance∝meanGreyLevel/(gain*exposureDuration). The mean grey value (meanGreyLevel) may be expressed as a value, such as an integer value or a floating-point value, in a defined range, such as 0-255. The mean grey value (meanGreyLevel) may be a weighted mean grey value obtained using weighted pixel values obtained by weighting the pixel values from the representative image in accordance with a weighting map that indicates respective weights for the pixel values from the representative image. In some implementations, the adaptive acquisition control data, from the adaptive acquisition control input data 732 may include an aperture value used to capture the image from which the image capture apparatus obtained the representative, or thumbnail, image, and the scene luminance may be obtained using the aperture value, which may be expressed as the following:

$$sceneLuminance = \qquad\qquad\qquad \text{[Equation 1]}$$

$$meanGreyLevel * aperture^2/(gain * exposureDuration).$$

Other techniques for obtaining the scene luminance may be used.

The auto-exposure luminance determination component 730 obtains, determines, selects, generates, calculates, produces, or identifies, an auto-exposure target exposure value (targetY) in accordance with the scene luminance value (sceneLuminance). The auto-exposure target exposure value (targetY) is obtained using a tuned, such as manually tuned, curve, which may be implemented as a lookup table, that maps target exposure values to corresponding scene luminance values. The auto-exposure target exposure value (targetY) may be expressed a value, such as an integer value or a floating-point value, in a defined range, such as 0-255.

The auto-exposure luminance determination component 730 outputs, such as stores in a memory of the image capture apparatus, or otherwise makes available, the scene luminance value (sceneLuminance), the auto-exposure target exposure value (targetY), or both. For example, the auto-exposure luminance determination component 730 may send the scene luminance value (sceneLuminance), the auto-exposure target exposure value (targetY), or both, to the auto-exposure sensor driver 740. In some implementations, the auto-exposure luminance determination component 730 may output the adaptive acquisition control input data 732, or a portion or portions thereof, such as to the auto-exposure sensor driver 740.

The auto-exposure sensor driver 740 accesses, such as reads, such as from a memory of the image capture apparatus, receives, or otherwise obtains, the target exposure value (targetY). For example, the auto-exposure sensor driver 740 may receive the target exposure value (targetY) from the auto-exposure luminance determination component 730. In some implementations, the auto-exposure sensor driver 740 may obtain the target exposure value (targetY) in accordance with the adaptive acquisition control sample rate. For frames other than frames for which auto-exposure luminance determination component 730 generates data, the auto-exposure sensor driver 740 may use a previously obtained target exposure value (targetY). Although not expressly shown in FIG. 7, in some implementations, the auto-exposure sensor driver 740 may access, such as read, such as from a memory of the image capture apparatus, receive, or otherwise obtain, the scene luminance value (sceneLuminance), a previously obtained target exposure value, such as the target exposure value obtained for the most recently processed image obtained prior to processing the current image, the adaptive acquisition control input data 732, a portion thereof, or a combination thereof.

The auto-exposure sensor driver 740 accesses, such as reads, such as from a memory of the image capture apparatus, receives, or otherwise obtains, motion data 724, such as on a per-frame basis. The motion data 724 indicates, represents, or describes motion of the image capture apparatus, captured, generated, or determined, in accordance with, such as concurrently with, capturing the current image. The motion data 724 may include angular speed data that indicates an angular component of motion velocity of the image capture apparatus in accordance with capturing the current image. For example, the angular speed data may be determined using data from a motion sensor, or combination of motion sensors, of the image capture apparatus, such as a gyroscope, such as the gyroscope 546 shown in FIG. 5, an accelerometer, such as the accelerometer 544 shown in FIG. 5, or a combination thereof. In some implementations, the auto-exposure sensor driver 740 omits obtaining and using the motion data.

Although not expressly shown in FIG. 7, the auto-exposure sensor driver 740 accesses, such as reads, such as from a memory of the image capture apparatus, receives, or otherwise obtains, one or more gain-exposure duration curves, such as previously, such as manually, defined, or tuned, gain-exposure duration curves, or interpolated gain-exposure duration curves interpolated from the gain-exposure duration curves. The gain-exposure duration curves may be implemented as lookup tables. The gain-exposure duration curves, respectively define or describe the allocation, or mapping, of a target exposure, such as the target exposure value (targetY) obtained from the auto-exposure luminance determination component 730, to a target exposure duration value (targetExposureDuration), a target gain value (targetGain), or a combination thereof.

Based on, using, or in accordance with, the target exposure value (targetY), the gain-exposure duration curves, the motion data, or a combination thereof, the auto-exposure sensor driver 740 obtains, determines, selects, generates, calculates, produces, or identifies, target adaptive acquisition control data 742, such as the parameters of the adaptive acquisition control data 660 shown in FIG. 6, for subsequent use, such as subsequent image, or frame, capture or subsequent processing of images captured in accordance therewith. The auto-exposure sensor driver 740 includes the target exposure duration value (targetExposureDuration), the target gain value (targetGain), or both, in the target adaptive acquisition control data 742. The target exposure duration value (targetExposureDuration) and the target gain value (targetGain) may be expressed as a couple or tuple ([targetExposureDuration, targetGain]). In some implementations, the target exposure duration value (targetExposureDuration) and the target gain value (targetGain) may be expressed as an exposition parameter that is a product of multiplying the target exposure duration value (targetExposureDuration) by the target gain value (targetGain).

The auto-exposure sensor driver 740 identifies a current gain-exposure duration curve from the previously defined gain-exposure duration curves or by generating a respective interpolated gain-exposure duration curve from one or more of the previously defined gain-exposure duration curves, in accordance with the motion data 724. For example, the motion data 724 may indicate little or zero motion, such as motion less than a defined minimum motion threshold, and a corresponding gain-exposure duration curve, such as a low angular speed gain-exposure duration curve, may be used. In another example, the motion data 724 may indicate high motion, such as motion greater than a defined maximum motion threshold, and a corresponding gain-exposure duration curve, such as a high angular speed gain-exposure duration curve, may be used. In another example, the motion data 724 may indicate medium or moderate motion, such as motion greater than the defined minimum motion threshold and less than the defined maximum motion threshold, and a corresponding gain-exposure duration curve, such as a medium angular speed gain-exposure duration curve, may be used. Other thresholds and metrics may be defined or determined for generating and using interpolated gain-exposure duration curves.

To identify the current gain-exposure duration curve, the auto-exposure sensor driver 740 may obtain, generate, calculate, or determine, one or more interpolated gain-exposure duration curves based on the one or more previously defined gain-exposure duration curves. For example, the auto-exposure sensor driver 740, or another component of the image capture apparatus, may obtain, generate, calculate, or determine, the one or more interpolated gain-exposure duration curves in accordance with the angular speed data, which may include generating, storing, or both, corresponding lookup tables representing the respective interpolated gain-exposure duration curves. One or more of the previously defined gain-exposure duration curves may be associated with, and used for, respective angular speeds. For angular speeds other than the angular speeds associated with previously defined gain-exposure duration curves, current interpolated gain-exposure duration curves may be interpolated based on the previously defined gain-exposure duration curves.

The auto-exposure sensor driver 740 obtains, determines, selects, generates, calculates, produces, or identifies, the target exposure duration value (targetExposureDuration) and the target gain value (targetGain) for the target adaptive acquisition control data 742 using the target exposure value (targetY) and the current gain-exposure duration curve.

To obtain the target exposure duration value (targetExposureDuration) and the target gain value (targetGain) using the target exposure value (targetY) and the current gain-exposure duration curve, the auto-exposure sensor driver 740 obtains, determines, selects, generates, calculates, produces, or identifies, a maximum exposure duration threshold (expDurMax) for the current frame. The exposure duration may be limited by the framerate (fps), such that determining a maximum exposure duration threshold (expDurMax) may be expressed as expDurMax=1/fps. For example, the maximum exposure duration threshold (expDurMax) for capturing a frame in accordance with a frame rate of thirty frames per second (30 fps) is, approximately, thirty-three milliseconds (33 ms). In some implementations, obtaining the target exposure duration value (targetExposureDuration) and the target gain value (targetGain) using the target exposure value (targetY) may include determining a difference between the target exposure value (targetY) and the previously obtained target exposure value to determine whether increase or decrease the target exposure duration value (targetExposureDuration) and the target gain value (targetGain) relative to the exposure duration value (exposureDuration) and gain value (gain) from the adaptive acquisition control input data 732. In some implementations, obtaining the target exposure duration value (targetExposureDuration) and the target gain value (targetGain) may include obtaining a difference between the exposure duration value (exposureDuration) and gain value (gain) from the adaptive acquisition control input data 732 and the target exposure duration value (targetExposureDuration) and the target gain value (targetGain).

To obtain the target exposure duration value (targetExposureDuration) using the target exposure value (targetY), the current gain-exposure duration curve, and the maximum exposure duration threshold (expDurMax), the auto-exposure sensor driver 740 obtains, determines, selects, generates, calculates, produces, or identifies, a maximal exposure duration value from the current gain-exposure duration curve that is less than or equal to the maximum exposure duration threshold (expDurMax) and that, for a current gain value of one (1), corresponds with an exposition value that is less than or equal to the target exposure value (targetY), wherein the exposition value for a respective exposure duration value from the current gain-exposure duration curve is a product of multiplying the respective exposure duration value by the current gain value, and uses the maximal exposure duration value as the target exposure duration value (targetExposureDuration). The auto-exposure sensor driver 740 may obtain, determine, select, or identify the target exposure duration value (targetExposureDuration) by iterating through exposure duration values available from the current gain-exposure duration curve that are less than or equal to the maximum exposure duration threshold (exp-DurMax) in increasing order.

The exposition value corresponding to the target exposure duration value (targetExposureDuration) and the current gain value of one (1) may be equal to, or match, the target exposure value (targetY), and the current gain value of one (1) may be used as the target gain value (targetGain).

The exposition value corresponding to the target exposure duration value (targetExposureDuration) and the current gain value of one (1) may be less than the target exposure value (targetY), and the auto-exposure sensor driver 740 may obtain, determine, select, or identify the target gain value (targetGain) using the target exposure value (targetY), the current gain-exposure duration curve, and the target exposure duration value (targetExposureDuration). To obtain, determine, select, or identify the target gain value (targetGain) using the target exposure value (targetY), the current gain-exposure duration curve, and the target exposure duration value (targetExposureDuration), the auto-exposure sensor driver 740 obtains, determines, selects, generates, calculates, produces, or identifies, a maximal gain value from the current gain-exposure duration curve that, for the target exposure duration value (targetExposureDuration), corresponds with an exposition value that is less than or equal to the target exposure value (targetY), wherein the exposition value for a respective exposure duration value from the current gain-exposure duration curve is a product of multiplying the respective gain value by the target exposure duration value (targetExposureDuration), and uses the maximal gain value as the target gain value (targetGain). The auto-exposure sensor driver 740 may obtain, determine, select, or identify the target gain value (targetGain) by iterating through gain values available from the current gain-exposure duration curve in increasing order.

The auto-exposure sensor driver 740 outputs, such as stores in a memory of the image capture apparatus, sends, or otherwise makes accessible, the target adaptive acquisition control data 742 including the target exposure duration value (targetExposureDuration) and the target gain value (targetGain), which may be expressed as a couple, or tuple, ([targetExposureDuration, targetGain]). For example, the auto-exposure sensor driver 740 may output the target adaptive acquisition control data 742 to an image sensor, such as the image sensor of the image capture device 104 shown in FIG. 1, the image sensors 342, 346 shown in FIG. 3, the image sensor 512 shown in FIG. 5, or the image sensor 610 shown in FIG. 6, of the image capture apparatus, to control the capture of a subsequent, such as immediately subsequent, image or frame. The target adaptive acquisition control data 742 is shown with a solid line border to indicate that the target adaptive acquisition control data 742 is output on a per-frame basis.

The auto-exposure sensor driver 740 is shown with a solid line border to indicate that the auto-exposure sensor driver 740 operates, such as obtains motion data 724, outputs the target adaptive acquisition control data 742, or both, on a per-frame basis. The auto-exposure sensor driver 740 may omit obtaining, processing, or modifying the current image, or frame.

As indicated above, the exposure control portion 710 determines and outputs the target adaptive acquisition control data 742, which may include target exposure duration value (targetExposureDuration), target gain value (target-Gain), which may be expressed as a couple, or tuple, ([targetExposureDuration, targetGain]), such as on a per-frame basis. The target gain value (targetGain) may be interpreted, or used, such as by the image sensor, as a combination of an analog gain value (analogGain) and a digital gain value (digitalGain or digital gain), such as a product of multiplying the analog gain (analogGain) by the digital gain (digitalGain). The analog gain (analogGain) is applied electrically on the sensor prior to analog-to-digital conversion, or capture, of the input signal (photons) to obtain an image, or frame. The digital gain (digitalGain) is applied to the captured, or RAW, image, or frame, such as by the image sensor, the image signal processor, or by a combination of the image sensor and the image signal processor. The product of multiplying the analog gain (analogGain) by the digital gain (digitalGain) may be referred to as the sensor gain (sensorGain). The sensor gain (sensorGain) may be applied, such as globally, to the pixels of an image, or frame.

Although not shown in FIG. 7, the image sensor may obtain the adaptive acquisition control data, or a portion thereof, from the exposure control portion 710 and may capture one or more images, or frames, in accordance therewith. Adaptive acquisition control data indicating relatively high exposure values may correspond with an over-saturated image, wherein image detail is lost in bright areas and is unavailable for image processing. Adaptive acquisition control data indicating relatively low exposure values may correspond with an undersaturated image, wherein image detail is dark areas is subject to sensor noise such that applying a digital gain (digitalGain) greater than one may increase the sensor noise. Determining adaptive acquisition control data, such as the determination of the target adaptive acquisition control data 742 shown in FIG. 7, may include balancing sensor gain (sensorGain) and exposure duration to obtain an image (processed image), or frame, having a target exposure, maximizing the information available in the image, and limiting or eliminating image saturation, motion blur, or both.

The tone control portion 720 obtains a global tone mapping tone curve, which may be a dynamically, or adaptively, generated tone curve, for an image, such as an input, or RAW image, such as the current image, for use in processing the current image to obtain a processed, or partially processed, image. A tone curve, such as the global tone mapping tone curve, may be used to implement, or apply, a digital gain (digitalGain) to an image, such as in accordance with respective pixel values from the image, and may be adaptive to the image content. The global tone mapping tone curve may be implemented as a lookup table (LUT), that maps input luminance values from pixels in an input image, in a respective defined range, to a corresponding output luminance value that is included for the respective pixels in an output image, which is the processed, or partially processed, image.

The tone control portion 720 obtains a global tone mapping black point value, which may be or include per-channel values, for the image, to obtain the processed, or partially processed image. The global tone mapping black point value corresponds to a determined black point for the respective image, such as on a per-channel basis, which is subtracted from the respective image, such as on a per-channel and per-pixel basis, and is adaptive to the image content. The black point value is used to apply a shift on the pixel values of the image to maximize the accuracy of dark, such as black or near black, pixels. Subtracting the black point value from the pixel values, such as per-channel, may preserve the relative pixel values and adjust the pixel values so that the mean of dark pixels in the image after subtracting the black point value is zero (0) or approximately zero. Subtracting the global tone mapping black point from the pixel values may preserve the relative pixel values and adjust the pixel values so that the mean of dark pixels in the image, after subtracting the black point value, is zero (0) or approximately zero.

As shown in FIG. 7, the tone control portion 720 includes a global tone mapping determination component 750 (GTM DETERMINATION) and a global tone mapping driver 760 (GTM DRIVE).

The global tone mapping determination component 750 accesses, such as reads, such as from a memory of the image capture apparatus, receives, or otherwise obtains, global tone mapping input data 752. The global tone mapping input data 752 is shown with a broken line boarder to indicate that the global tone mapping input data 752 is obtained periodically, such as in accordance with the adaptive acquisition control sample rate.

The global tone mapping input data 752 includes the adaptive acquisition control data (ACQUISITION PARAMETERS), the representative image data (THUMBNAIL DATA), representative histogram data (HISTOGRAM DATA) for the image, or frame, as shown, as captured in accordance with the adaptive acquisition control sample rate, which may be histogram data for a raw image, for one or more channels of the image, or frame, which constructively represent the current image. For example, the histogram data may include a histogram of a luminance, or luma, channel of the image, or frame, (histogramY), respective per-channel histograms for the image, or frame, in RGB format (histogramsRGB), or a combination or collection thereof.

Although the global tone mapping input data 752 is shown in FIG. 7 as including the representative image data (THUMBNAIL DATA) and the representative histogram data (HISTOGRAM DATA), other image data, other histogram data, or both, may be included in the global tone mapping input data 752. For example, the global tone mapping input data 752 may include the luma histogram (histogramY), the luma thumbnail (thumbnailY), a RAW, or RGB, format thumbnail (thumbnailRGB), per-channel RGB histograms (histogramsRGB), or a combination or collection thereof, of the image, or frame, as captured in accordance with the adaptive acquisition control sample rate. In some implementations, the representative image data included in the global tone mapping input data 752 may differ from the representative image data included in the acquisition control input data 732. For example, the acquisition control input data 732 may include the RGB thumbnail (thumbnailRGB) and the global tone mapping input data 752 may include the luma thumbnail (thumbnailY). In some implementations, the representative histogram data included in the global tone mapping input data 752 may differ from the representative histogram data included in the acquisition control input data 732. For example, the acquisition control input data 732 may include the per-channel RGB histograms (histogramsRGB) and the global tone mapping input data 752 may include luma histogram (histogramY).

Although described as constructively representing the current, or most recently captured, image, the representative image data, the representative histogram data, or both, may be generated from, or using, the current image, or a previously captured image captured sequentially before the current image, in accordance with the adaptive acquisition control sample rate. Although not shown expressly in FIG. 7, the acquisition parameters of the global tone mapping input data 752, may be, or may include, data output by the exposure control portion 710 in accordance with capturing a previous frame captured in accordance with the adaptive acquisition control sample rate, which may correspond with the captured frame associated with the adaptive acquisition control input data 732. For example, the target adaptive acquisition control data 742, or a portion thereof, output for capturing a frame in accordance with the adaptive acquisition control sample rate, may be included in the global tone mapping input data 752 subsequent to capturing the frame in accordance with the adaptive acquisition control sample rate.

The global tone mapping determination component 750 obtains, determines, selects, generates, calculates, produces, or identifies, the global tone mapping tone curve (toneCurve). The global tone mapping determination component 750 is shown with a broken line boarder to indicate that the global tone mapping determination component 750 obtains, determines, selects, generates, calculates, produces, or identifies, the global tone mapping tone curve (toneCurve) periodically, such as in accordance with the adaptive acquisition control sample period, or corresponding adaptive acquisition control sample rate, such as on a per three captured frames basis for video captured at thirty frames per second (30 fps).

The global tone mapping determination component 750 obtains, determines, selects, generates, calculates, produces, or identifies, the global tone mapping tone curve (toneCurve) from, based on, using, or in accordance with, the global tone mapping input data 752. The global tone mapping tone curve (toneCurve) is generated such that a histogram of a processed, or partially processed, image (post-GTM image) that is a result of applying the global tone mapping tone curve (toneCurve) to the current image matches a defined, or tuned, such as manually, global tone mapping target histogram, which is scene and image content independent. Although the post-global tone mapping image is described as having a histogram that matches the global tone mapping target histogram, the histogram of the post-global tone mapping image may differ from the global tone mapping target histogram, such as within defined minimal similarity parameters. One or more similarity parameters, metrics, or thresholds, or a combination thereof, may be used. For example, a difference in the respective means of the histograms may be less than twenty percent. In another example, a difference between a number, or cardinality, of pixels in a defined low value range, such as from zero to thirty-three percent of the dynamic range, may be less than ten percent. In another example, a difference between a number, or cardinality, of pixels in a defined medium value range, such as from thirty-three percent to sixty-six percent of the dynamic range, may be less than ten percent. In another example, a difference between a number, or cardinality, of pixels in a defined high value range, such as from sixty-six percent to ninety-nine percent of the dynamic range, may be less than ten percent.

For example, the global tone mapping tone curve (toneCurve) may be obtained, determined, selected, generated, calculated, produced, or identified, in accordance with a difference, such as in a difference of exposure mean, between the representative histogram and the global tone mapping target histogram, such that the processed, or partially processed, image that results from, or is output by, applying the global tone mapping tone curve (toneCurve) to the current image has the exposure mean of the global tone mapping target histogram. Although not expressly shown in FIG. 7, the global tone mapping determination component 750 may access, such as read, such as from a memory of the image capture apparatus, receive, or otherwise obtain, the global tone mapping target histogram.

The global tone mapping determination component 750 obtains, determines, selects, generates, calculates, produces, or identifies, a global tone mapping black point. The global tone mapping determination component 750 is shown with a broken line boarder to indicate that the global tone mapping determination component 750 obtains, determines, selects, generates, calculates, produces, or identifies, the global tone mapping black point periodically, such as in accordance with the adaptive acquisition control sample period, or corresponding adaptive acquisition control sample rate, such as on a per three captured frames basis for video captured at thirty frames per second (30 fps).

The global tone mapping determination component 750 obtains, determines, selects, generates, calculates, produces, or identifies, the global tone mapping black point, or global tone mapping black point value, (blackPoint), such that a defined, or tuned, such as manually, black point target percentage (blackPointTarget), such as two percent (2%), of pixels in the processed, or partially processed, image output by the tone control portion 720 are zero value pixels. To obtain the global tone mapping black point (blackPoint), the tone control portion 720 obtains, identifies, calculates, or determines the cardinality, count, or number, of pixels in the image (pixelCount), and determines the cardinality, count, or number, of pixels corresponding to the defined black point target percentage (blackPointTarget) of the pixels in the image (darkPixelCount, or dark pixel count), which may be expressed as darkPixelCount=pixelCount*blackPointTarget. Other ranges may be used for identifying the dark pixels.

To obtain the global tone mapping black point (blackPoint), the global tone mapping determination component 750 obtains, determines, selects, generates, calculates, produces, or identifies, the dark pixel count (darkPixelCount) darkest pixels (dark pixel values) from the representative histogram data, such as on a per-channel basis from the per-channel histograms (histogramsRGB) corresponding to the image. To obtain the global tone mapping black point (blackPoint), the global tone mapping determination component 750 obtains, determines, selects, generates, calculates, produces, or identifies, a mean, or another average, of the dark pixel values as the global tone mapping black point (blackPoint).

To obtain the global tone mapping black point (blackPoint), the global tone mapping determination component 750 may obtain, determine, select, generate, calculate, produce, or identify, a global tone mapping normalized black point value (blackPointNormalized) and may use the global tone mapping normalized black point value (blackPointNormalized) as the global tone mapping black point (blackPoint). To obtain the global tone mapping normalized black point value (blackPointNormalized), the global tone mapping determination component 750 may obtain, as the global tone mapping normalized black point value (blackPointNormalized), a result of dividing the global tone mapping black point (blackPoint) by a product of multiplying the exposure duration value (exposureDuration) corresponding to the representative image by the gain value (gain) corresponding to the representative image, which may be expressed as blackPointNormalized=blackPoint/ (exposureDuration*gain).

The global tone mapping determination component 750 outputs, such as stores in a memory of the image capture apparatus, sends, transmits, or otherwise makes accessible, the global tone mapping tone curve (toneCurve), the global tone mapping black point (blackPoint), or both. For example, the global tone mapping determination component 750 may send the global tone mapping tone curve (toneCurve), the global tone mapping black point (blackPoint), or both, to the global tone mapping driver 760. In some implementations, the global tone mapping determination component 750 may output the global tone mapping input data 752, or a portion or portions thereof. The global tone mapping determination component 750 may omit obtaining, processing, or modifying the current image, or frame.

The global tone mapping driver 760 accesses, such as reads, such as from a memory of the image capture apparatus, receives, or otherwise obtains, the global tone mapping tone curve (toneCurve), the global tone mapping black point (blackPoint), the global tone mapping input data 752, or a combination thereof. For example, the global tone mapping driver 760 may receive the global tone mapping tone curve (toneCurve) and the global tone mapping black point (blackPoint) from the global tone mapping determination component 750, such as in accordance with the adaptive acquisition control sample rate. The global tone mapping driver 760 is shown with a solid line border to indicate that the global tone mapping driver 760 operates on a per-frame basis.

The global tone mapping driver 760 accesses, such as reads, such as from a memory of the image capture apparatus, receives, or otherwise obtains, target adaptive acquisition control data 762, such as the target adaptive acquisition control data 742, or a portion thereof, previously output by the auto-exposure sensor driver 740 for capturing the current image. The target adaptive acquisition control data 762 is shown with a solid line border to indicate that the target adaptive acquisition control data 762 is obtained on a per-frame basis.

The global tone mapping driver 760 obtains, determines, selects, generates, calculates, produces, or identifies, a temporally smoothed global tone mapping tone curve (toneCurveSmoothed), a temporally smoothed global tone mapping black point value (blackPointSmoothed), or both, which are temporally smoothed to avoid frame to frame oscillations.

Although not shown separately in FIG. 7, the global tone mapping driver 760 accesses, such as reads, such as from a memory of the image capture apparatus, receives, or otherwise obtains, a previous global tone mapping tone curve (toneCurvePrevious), such as the temporally smoothed global tone mapping tone curve output by the global tone mapping driver 760 in accordance with processing a previously captured image, such as the frame captured immediately prior to capturing the current image.

The global tone mapping driver 760 obtains, determines, selects, generates, calculates, produces, or identifies, the temporally smoothed global tone mapping tone curve (toneCurveSmoothed) by interpolating between the previous global tone mapping tone curve (toneCurvePrevious) and the global tone mapping tone curve (toneCurve) received from the global tone mapping determination component 750 and in accordance with a smoothing function (ƒ( )) and a smoothing coefficient (a), which may be a tuned, such as manually, defined smoothing coefficient for smoothing the global tone mapping tone curve, which may be expressed as the following:

$$toneCurveSmoothed = f(a, toneCurvePrevious, toneCurve).$$

Although the same term, smoothing coefficient, and symbol, (a), is used with respect to smoothing other values, the smoothing coefficient (a) used for obtaining the temporally smoothed global tone mapping tone curve (toneCurveSmoothed) may be defined, or tuned, such as manually, for obtaining the temporally smoothed global tone mapping tone curve (toneCurveSmoothed), which may be referred to as a global tone mapping tone curve smoothing coefficient.

The global tone mapping driver 760 may use the temporally smoothed global tone mapping tone curve (toneCurveSmoothed) as the global tone mapping tone curve (toneCurve).

Although not shown separately in FIG. 7, the global tone mapping driver 760 accesses, such as reads, such as from a memory of the image capture apparatus, receives, or otherwise obtains, a previous global tone mapping black point value (blackPointPrevious), such as the temporally smoothed global tone mapping black point value, previously output, such as stored, by the global tone mapping driver 760 in accordance with processing a previously captured image, such as the frame captured immediately prior to capturing the current image.

The global tone mapping driver 760 obtains, determines, selects, generates, calculates, produces, or identifies, the temporally smoothed global tone mapping black point (blackPointSmoothed) by interpolating between the previous global tone mapping black point (blackPointPrevious) and the global tone mapping black point (blackPoint) output by the global tone mapping determination component 750, in accordance with a smoothing coefficient (a), which may be a tuned, such as manually, defined smoothing coefficient, and multiplying the interpolated value by the scene exposition value (gain*exposureDuration) used to capture the current frame, obtained from the target adaptive acquisition control data 762, which may be expressed as the following:

$$blackPointSmoothed =$$
$$((1 - a) * blackPointPrevious + a * blackPoint) * (gain * exposureDuration).$$

Although the term 'smoothing coefficient' and symbol (a) are used with respect to smoothing other values, the smoothing coefficient (a) used for obtaining the temporally smoothed global tone mapping black point (blackPointSmoothed) may be defined, or tuned, such as manually, for obtaining the temporally smoothed global tone mapping black point (blackPointSmoothed), which may be referred to as a global tone mapping black point smoothing coefficient.

In some implementations, to obtain the global tone mapping black point value (blackPoint), the global tone mapping driver 760 obtains, as the global tone mapping black point value (blackPoint), a product of multiplying the temporally smoothed global tone mapping black point (blackPointSmoothed) by a product of multiplying the exposure duration value from the adaptive acquisition control parameters used to capture the current image from the target adaptive acquisition control data 762 by the gain value (gain) from the adaptive acquisition control parameters used to capture the current image from the target adaptive acquisition control data 762.

The global tone mapping driver 760 includes the global tone mapping tone curve (toneCurve), which may be the temporally smoothed global tone mapping tone curve (toneCurveSmoothed), the global tone mapping black point value (blackPoint), which may be the temporally smoothed global tone mapping black point (blackPointSmoothed), or both, in global tone mapping driver output data 764.

The global tone mapping driver 760 outputs, such as stores in a memory of the image capture apparatus, sends, transmits, or otherwise makes accessible, the global tone mapping driver output data 764. The global tone mapping driver output data 764 is shown with a solid line border to indicate that the global tone mapping driver output data 764 is output on a per-frame basis. The global tone mapping driver 760 may omit obtaining, processing, or modifying the current image, or frame.

Figure 8:
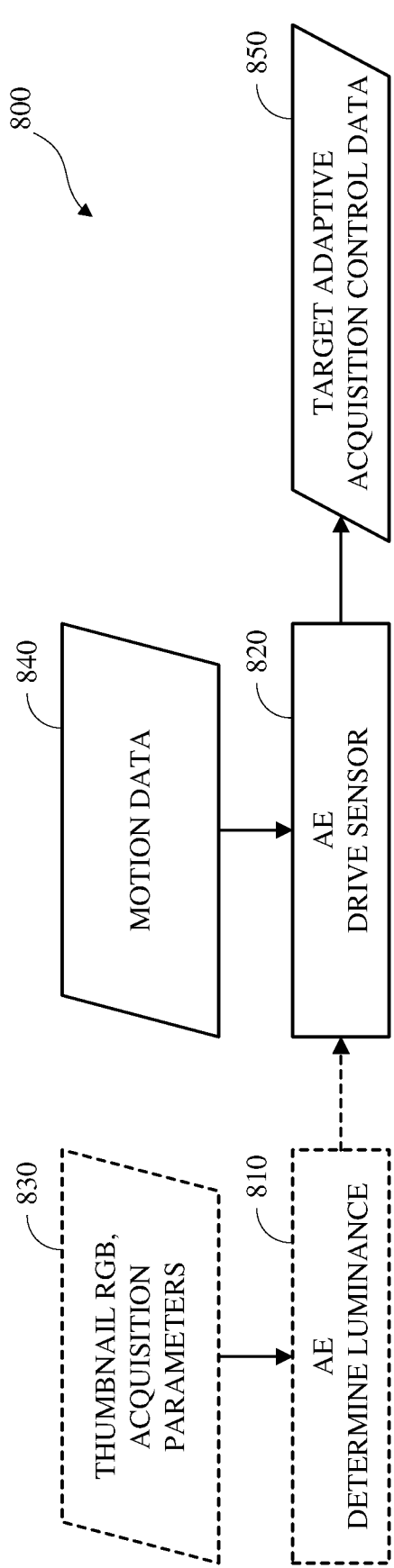
FIG. 8 is a block diagram of an example of an exposure control component of an adaptive acquisition control component for images other than spherical images.
Figure 9:
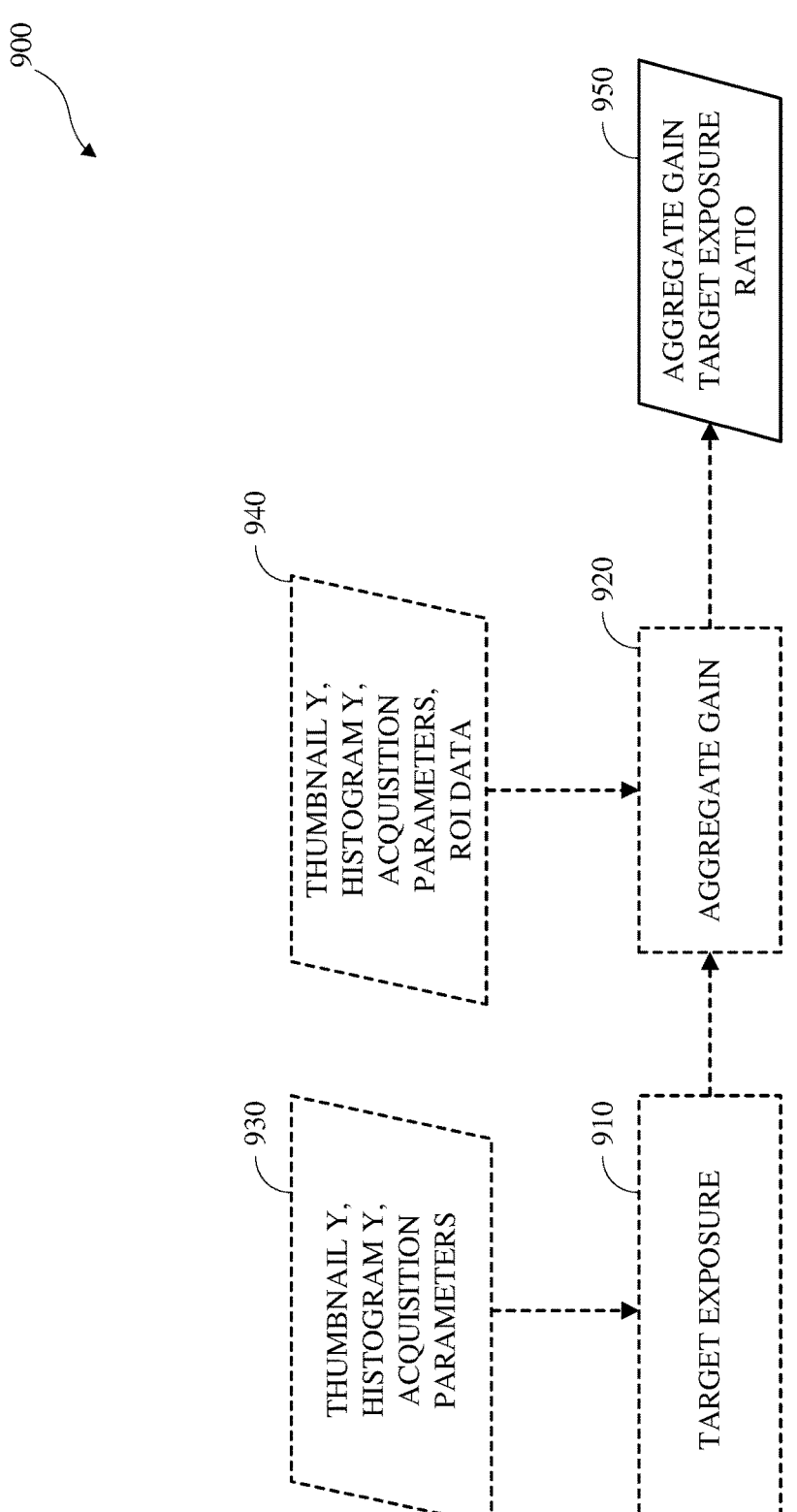
FIG. 9 is a block diagram of an example of a first portion of a tone control component of an adaptive acquisition control component for images other than spherical images.
Figure 10:
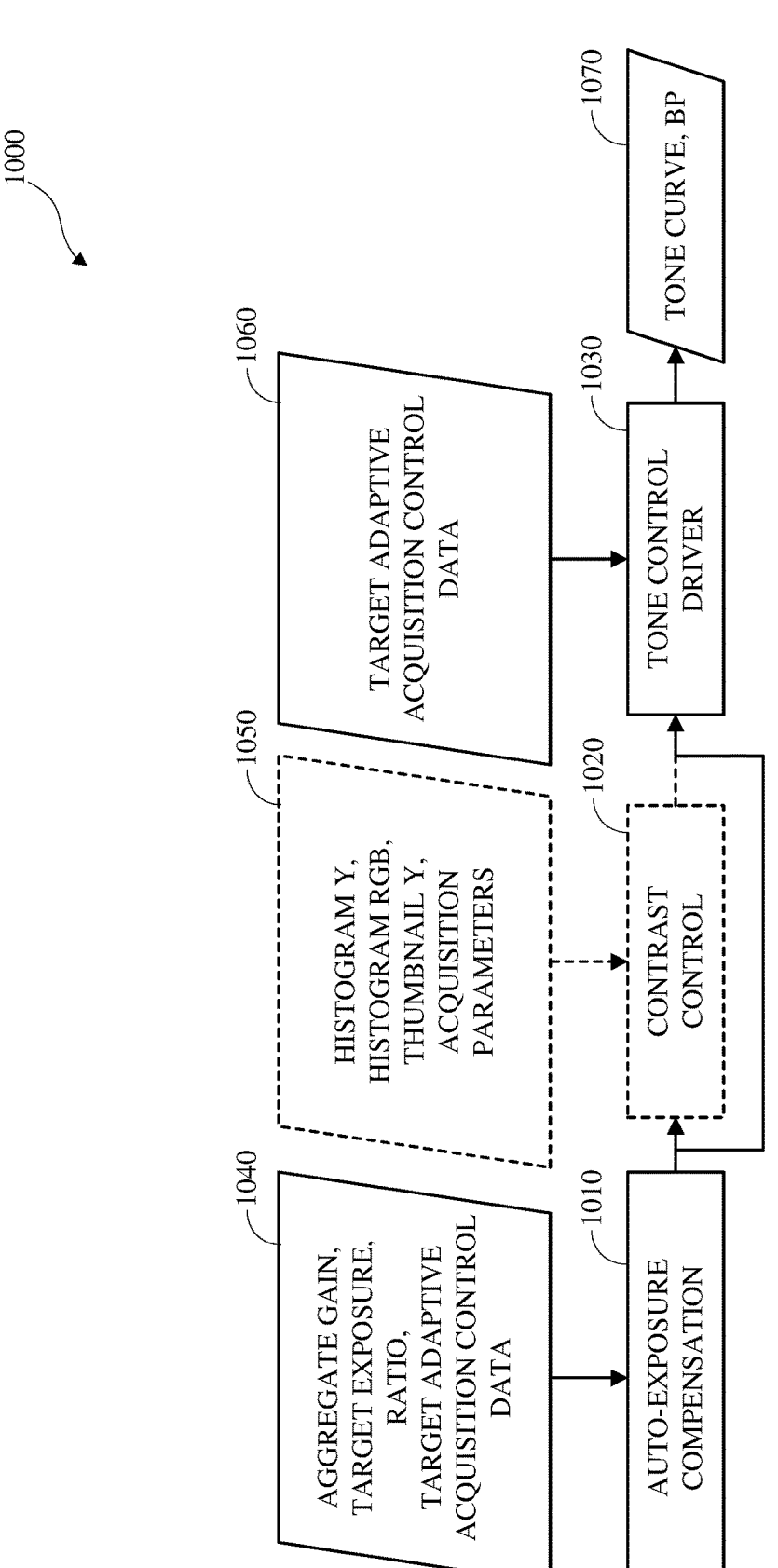
FIG. 10 is a block diagram of an example of a second portion of a tone control component of an adaptive acquisition control component for images other than spherical images.

FIGS. 8-10 show another example of an adaptive acquisition control component, such as for images other than spherical images. The adaptive acquisition control component shown in FIGS. 8-10, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, as a part, or parts, of the image processing pipeline 600 shown in FIG. 6, or in another image capture apparatus. In some implementations, the adaptive acquisition control component shown in FIGS. 8-10 may be implemented in a digital signal processor (DSP), an application-specific integrated circuit (ASIC), or a combination of a digital signal processor and an application-specific integrated circuit. One or more components of the adaptive acquisition control component shown in FIGS. 8-10 may be implemented in hardware, software, or a combination of hardware and software.

The adaptive acquisition control component determines and controls the exposure for images, or frames, such as images other than spherical images, such as a current, or input, image, or frame, captured by an image capture apparatus, such as a RAW image as captured by a sensor of the image capture apparatus, and processed by the image processing pipeline thereof that implements the adaptive acquisition control component to obtain, and output, a processed image or frame.

The adaptive acquisition control component shown in FIGS. 8-10 includes an exposure control component, shown at 800 in FIG. 8 and a tone control component, shown in FIGS. 9 and 10, which includes a first portion, shown at 900 in FIG. 9, and a second portion, shown at 1000 in FIG. 10.

The adaptive acquisition control component may include components other than the components shown in FIGS. 8-10. For example, the image capture apparatus that implements the adaptive acquisition control component may include an image sensor, such as the image sensors 342, 346 shown in FIG. 3, the image sensor 512 shown in FIG. 5, or the image sensor 610 shown in FIG. 6, and an image signal processor, such as the image signal processor 620 shown in FIG. 6, and the adaptive acquisition control component may include the image sensor, or a portion thereof, the image signal processor, or a portion thereof, or one or more portions of the image sensor and the image signal processor.

FIG. 8 is a block diagram of an example of an exposure control component 800 of an adaptive acquisition control component, such as for images other than spherical images.

The exposure control component 800, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, as a part, or parts, of the image processing pipeline 600 shown in FIG. 6, or in another image capture apparatus. In some implementations, the exposure control component 800 may be implemented in a digital signal processor (DSP), an application-specific integrated circuit (ASIC), or a combination of a digital signal processor and an application-specific integrated circuit. One or more aspects of the exposure control component 800 may be implemented in hardware, software, or a combination of hardware and software.

The exposure control component 800, or a component thereof, obtains, determines, selects, generates, calculates, produces, or identifies, target adaptive acquisition control data, such as a target exposure duration value (targetExposureDuration), a target gain value (targetGain), both, or a combination thereof, such as on a per-frame basis.

The target exposure duration value (targetExposureDuration), the target gain value (targetGain), both, or a combination thereof, may be used to control the image sensor of the image capture apparatus to capture a subsequent frame, or frames, to maximize the information in the captured images, or frames, as captured (e.g., RAW images). The information is maximized by balancing between signal-to-noise ratio, pixel saturation, and motion blur. The exposure control component 800 may implement saturation management control, which may include using a representative histogram data, such as the representative luma histogram (histogramY), to adjust the target exposure duration value (targetExposureDuration), the target gain value (targetGain), or both, to limit or eliminate saturation. For example, the last bin of the representative luma histogram (histogramY) may indicate a number, or cardinality, of saturated pixels which may be compared with a defined threshold number, or cardinality, of saturated pixels, such that for images wherein the number, or cardinality, of saturated pixels exceeds, such as is greater than, the defined threshold number, or cardinality, of saturated pixels, the target exposure duration value (targetExposureDuration), a target gain value (targetGain), both, may be lowered.

The exposure control component 800 may omit expressly controlling the brightness of processed images output by the image capture apparatus. The exposure control component 800 may omit obtaining, processing, or modifying the current image, or frame.

The exposure control component 800 includes an automatic exposure (auto-exposure) luminance determination component 810 (AE DETERMINE LUMINANCE) and an auto-exposure sensor driver 820 (AE DRIVE SENSOR). The exposure control component 800 may include components other than the components shown in FIG. 8. The exposure control component 800 may be similar to the exposure control portion 710 shown in FIG. 7, except as is described herein or as is otherwise clear from context. The auto-exposure luminance determination component 810 may be similar to the auto-exposure luminance determination component 730 shown in FIG. 7, except as is described herein or as is otherwise clear from context. The auto-exposure sensor driver 820 may be similar to the auto-exposure sensor driver 740 shown in FIG. 7, except as is described herein or as is otherwise clear from context.

For example, the target exposure obtained by the exposure control component 800 may be lower for bright scenes than the target exposure obtained by the exposure control portion 710 shown in FIG. 7 for comparable scenes, which will lower the mean of the RAW image and avoid saturated images relative to the exposure control portion 710 shown in FIG. 7. In another example, the exposure control portion 710 shown in FIG. 7 may use previously defined gain-exposure duration curves and the exposure control component 800 shown in FIG. 8 may use other previously defined gain-exposure duration curves.

The auto-exposure luminance determination component 810 obtains, determines, selects, generates, calculates, produces, or identifies, a scene luminance value, a corresponding target exposure value (targetY), or both. The auto-exposure luminance determination component 810 is shown with a broken line boarder to indicate that the auto-exposure luminance determination component 810 obtains, determines, selects, generates, calculates, produces, or identifies, the scene luminance value, the corresponding target exposure value, or both, periodically, such as in accordance with a determined, or defined, adaptive acquisition control sample period, or corresponding adaptive acquisition control sample rate, which is determined, or defined, in accordance with a current, active, or operative, frame rate for video capture, such as at a fraction of the frame rate, such as one third the frame rate.

The auto-exposure luminance determination component 810 accesses, such as reads, such as from a memory of the image capture apparatus, receives, or otherwise obtains, adaptive acquisition control input data 830. The adaptive acquisition control input data 830 is shown with a broken line boarder to indicate that the adaptive acquisition control input data 830 is obtained periodically, such as in accordance with the adaptive acquisition control sample rate, such as on a per-third frame basis for video captured at thirty frames per second (30 fps). The adaptive acquisition control input data 830 is similar to the adaptive acquisition control input data 732 shown in FIG. 7, except as is described herein or as is otherwise clear from context.

The adaptive acquisition control input data 830 includes adaptive acquisition control data (ACQUISITION PARAMETERS) used to capture an image, or frame, such as an image, or frame, captured in accordance with the adaptive acquisition control sample rate, and, representative image data (THUMBNAIL RGB) obtained from the image, or frame, captured in accordance with the adaptive acquisition control sample rate, such as a reduced image corresponding to the captured image, such as a thumbnail image generated from the captured image, which may be in RGB format (thumbnailRGB), or in another image format, such as another RAW image format, or which may be luminance, or luma, data thereof (thumbnailY), generated from the captured image.

Although the adaptive acquisition control input data 830 is shown in FIG. 8 as including the representative image data (THUMBNAIL RGB), other image data, histogram data, or both, may be included in the adaptive acquisition control input data 830. For example, the adaptive acquisition control input data 830 may include the luma histogram (histogramY), the luma thumbnail (thumbnailY), a RAW, or RGB, format thumbnail (thumbnailRGB), per-channel RGB histograms (histogramsRGB), or a combination or collection thereof, of the image, or frame, as captured in accordance with the adaptive acquisition control sample rate.

The auto-exposure luminance determination component 810 obtains, determines, selects, generates, calculates, produces, or identifies, the scene luminance value in accordance with the adaptive acquisition control input data 830.

The auto-exposure luminance determination component 810 obtains, determines, selects, generates, calculates, produces, or identifies, an auto-exposure target exposure value (targetY) in accordance with the scene luminance value (sceneLuminance).

The auto-exposure luminance determination component 810 outputs, such as stores in a memory of the image capture apparatus, or otherwise makes available, the scene luminance value (sceneLuminance), the auto-exposure target exposure value (targetY), or both. For example, the auto-exposure luminance determination component 810 may send the scene luminance value (sceneLuminance), the auto-exposure target exposure value (targetY), or both, to the auto-exposure sensor driver 820. In some implementations, the auto-exposure luminance determination component 810 may output the adaptive acquisition control input data 830, or a portion or portions thereof, such as to the auto-exposure sensor driver 820.

The auto-exposure sensor driver 820 accesses, such as reads, such as from a memory of the image capture apparatus, receives, or otherwise obtains, the target exposure value (targetY).

The auto-exposure sensor driver 820 accesses, such as reads, such as from a memory of the image capture apparatus, receives, or otherwise obtains, motion data 840, such as on a per-frame basis. In some implementations, the auto-exposure sensor driver 820 omits obtaining and using the motion data.

Although not expressly shown in FIG. 8, the auto-exposure sensor driver 820 accesses, such as reads, such as from a memory of the image capture apparatus, receives, or otherwise obtains, one or more gain-exposure duration curves, such as previously, such as manually, defined, or tuned, gain-exposure duration curves, or interpolated gain-exposure duration curves interpolated from the gain-exposure duration curves.

Based on, using, or in accordance with, the target exposure value (targetY), the gain-exposure duration curves, the motion data, or a combination thereof, the auto-exposure sensor driver 820 obtains, determines, selects, generates, calculates, produces, or identifies, target adaptive acquisition control data 850, such as the parameters of the adaptive acquisition control data 660 shown in FIG. 6, for subsequent use, such as subsequent image, or frame, capture or subsequent processing of images captured in accordance therewith. The auto-exposure sensor driver 820 includes the target exposure duration value, the target gain value, or both, in the target adaptive acquisition control data 850.

The auto-exposure sensor driver 820 identifies a current gain-exposure duration curve from the previously defined gain-exposure duration curves or by generating a respective interpolated gain-exposure duration curve from one or more of the previously defined gain-exposure duration curves, in accordance with the motion data 840.

The auto-exposure sensor driver 820 obtains, determines, selects, generates, calculates, produces, or identifies, the target exposure duration value (targetExposureDuration) and the target gain value (targetGain) for the target adaptive acquisition control data 850 using the target exposure value (targetY) and the current gain-exposure duration curve.

The auto-exposure sensor driver 820 outputs, such as stores in a memory of the image capture apparatus, sends, or otherwise makes accessible, the target adaptive acquisition control data 850 including the target exposure duration value (targetExposureDuration) and the target gain value (targetGain), which may be expressed as a couple, or tuple, ([targetExposureDuration, targetGain]). For example, the auto-exposure sensor driver 820 may output the target adaptive acquisition control data 850 to an image sensor, such as the image sensor 610 shown in FIG. 6, of the image capture apparatus, to control the capture of a subsequent, such as immediately subsequent, image or frame. The target adaptive acquisition control data 850 is shown with a solid line border to indicate that the target adaptive acquisition control data 850 is output on a per-frame basis.

The auto-exposure sensor driver 820 is shown with a solid line border to indicate that the auto-exposure sensor driver 820 operates, such as obtains motion data 840, outputs the target adaptive acquisition control data 850, or both, on a per-frame basis. The auto-exposure sensor driver 820 may omit obtaining, processing, or modifying the current image, or frame.

As indicated above, the exposure control component 800 determines and outputs the target adaptive acquisition control data 850, which may include target exposure duration value (targetExposureDuration), target gain value (targetGain), which may be expressed as a couple, or tuple, ([targetExposureDuration, targetGain]), such as on a per-frame basis. The target gain value (targetGain) may be interpreted, or used, such as by the image sensor, as a combination of an analog gain value (analogGain or analog gain) and a digital gain value (digitalGain or digital gain), such as a product of multiplying the analog gain (analogGain) by the digital gain (digitalGain). The analog gain (analogGain) is applied electrically on the sensor prior to analog-to-digital conversion, or capture, of the input signal (photons) to obtain an image, or frame. The digital gain (digitalGain) is applied to the captured, or RAW, image, or frame, such as by the image sensor, the image signal processor, or by a combination of the image sensor and the image signal processor. The product of multiplying the analog gain (analogGain) by the digital gain (digitalGain) may be referred to as the sensor gain, or sensor gain value, (sensorGain). The sensor gain (sensorGain) may be applied, such as globally, to the pixels of an image, or frame.

The exposure control component 800 outputs, such as stores in a memory of the image capture apparatus, sends, transmits, or otherwise makes accessible, the target adaptive acquisition control data, including the target exposure duration value (targetExposureDuration), the target gain value (targetGain), both, or a combination thereof, such as on a per-frame basis. For example, the exposure control component 800 may output the target adaptive acquisition control data, or a portion thereof, to the image sensor, the tone control component shown in FIGS. 9 and 10, or both.

The tone control component, shown in FIGS. 9-10, of the adaptive acquisition control component, shown in FIGS. 8-10, obtains a tone control tone curve, which may be a dynamically, or adaptively, generated tone curve, for an image, such as an input, or RAW image, such as the current image, or frame, which may be the frame most recently captured by the image sensor of the image capture apparatus, for use in processing the current image, or frame, to obtain a processed, or partially processed, image, or frame. The tone control tone curve is similar to the global tone mapping tone curve obtained by the tone control portion 720 shown in FIG. 7, except as is described herein or as is otherwise clear from context. The tone control tone curve may be implemented as a lookup table (lut), that maps input luminance values from pixels in an input image, in a respective defined range, to a respective corresponding output luminance value that is included for the respective pixels in an output image, which is the processed, or partially processed, image. The tone control tone curve is adaptive to the image content.

The tone control component, shown in FIGS. 9-10, of the adaptive acquisition control component, shown in FIGS. 8-10, obtains a tone control black point value, which may be or include per-channel values, which may be applied to obtain the processed, or partially processed image. The tone control black point value corresponds to a determined black point for the respective image, such as on a per-channel basis, which is subtracted from the respective image, such as on a per-channel and per-pixel basis, and is adaptive to the image content. The tone control black point value is used to apply a shift on the pixel values of the image to maximize the accuracy of dark, such as black or near black, pixels. Subtracting the tone control black point value from the pixel values may preserve the relative pixel values and adjust the pixel values so that the mean of dark pixels in the image after subtracting the black point value is zero (0), or approximately zero.

The tone control component, shown in FIGS. 9-10, of the adaptive acquisition control component, shown in FIGS. 8-10, may be similar to the tone control portion 720 shown in FIG. 7, except as is described herein or as is otherwise clear from context.

FIG. 9 is a block diagram of an example of a first portion 900 of a tone control component of an adaptive acquisition control component. The first portion 900 of the tone control component of the adaptive acquisition control component, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, as a part, or parts, of the image processing pipeline 600 shown in FIG. 6, or in another image capture apparatus. In some implementations, the first portion 900 of the tone control component of the adaptive acquisition control component may be implemented in a digital signal processor (DSP), an application-specific integrated circuit (ASIC), or a combination of a digital signal processor and an application-specific integrated circuit. One or more aspects of the first portion 900 of the tone control component of the adaptive acquisition control component may be implemented in hardware, software, or a combination of hardware and software.

As shown in FIG. 9, the first portion 900 of the tone control component includes a target exposure component 910 (TARGET EXPOSURE) and an aggregate gain component 920 (AGGREGATE GAIN). The first portion 900 of the tone control component may include components other than the components shown in FIG. 9.

The target exposure component 910 accesses, such as reads, such as from a memory of the image capture apparatus, receives, or otherwise obtains, target exposure input data 930. The target exposure input data 930 is shown with a broken line boarder to indicate that the target exposure input data 930 is obtained periodically, such as in accordance with the adaptive acquisition control sample rate, such as on a per-third frame basis.

The target exposure input data 930 includes representative adaptive acquisition control data (acquisition parameters) and representative image data (THUMBNAIL Y). In some implementations, the target exposure input data 930 includes representative histogram data (HISTOGRAM Y). In some implementations, the target exposure input data 930 includes scene classification data (not expressly shown). In some implementations, the target exposure input data 930 includes motion data (not expressly shown).

Although not shown expressly in FIG. 9, the representative adaptive acquisition control data of the target exposure input data 930, may be, or may include, data output by an exposure control component, such as the exposure control component 800 shown in FIG. 8, such as the target exposure duration value, the target gain value, or both, for capturing a previous frame captured in accordance with the adaptive acquisition control sample rate. For simplicity, the target exposure duration value output by the exposure control component for capturing the previous frame captured in accordance with the adaptive acquisition control sample rate, is referred to as the exposure duration value (exposure-Duration) as obtained by the first portion 900 of the tone control component, or components thereof, in accordance with the adaptive acquisition control sample rate, and the target gain value output by the exposure control component for capturing the previous frame captured in accordance with the adaptive acquisition control sample rate, is referred to as the gain value (gain) as obtained by first portion 900 of the tone control component, or components thereof, in accordance with the adaptive acquisition control sample rate.

For example, the target adaptive acquisition control data, or a portion thereof, output for capturing the previous frame in accordance with the adaptive acquisition control sample rate may be included in the target exposure input data 930 subsequent to capturing the previous frame in accordance with the adaptive acquisition control sample rate. The representative adaptive acquisition control data of the target exposure input data 930 constructively represents the adaptive acquisition control data used to capture the current image and may differ from the adaptive acquisition control data used to capture the current image.

The representative image data (Thumbnail Y) may be image data obtained from the image, or frame, captured in accordance with the adaptive acquisition control sample rate, a reduced image corresponding to the captured image, such as a thumbnail image, which may be a RAW image, or luminance, or luma, data thereof, generated from the captured image. For example, the image capture apparatus, or one or more components thereof, may generate the luminance (Y) component of the thumbnail image by down sampling the luminance (Y) component of the previously captured image. The representative image data of the target exposure input data 930 constructively represents the current image and may differ from the current image.

The representative histogram data may be histogram data obtained for the image, or frame, captured in accordance with the adaptive acquisition control sample rate, which may be histogram data for a raw image, or the luminance, or luma, channel of the image, or frame, (histogramY), RGB, format thumbnail (thumbnailRGB), per-channel RGB histograms (histogramsRGB), or a combination or collection thereof. The representative histogram data of the target exposure input data 930 constructively represents a histogram of the current image and may differ from the histogram of the current image.

Although described as constructively representing the current, or most recently captured, image, the representative image data, the representative histogram data, or both, may be generated from, or using, the current image, or a previously captured image captured sequentially before the current image, in accordance with the adaptive acquisition control sample rate, such as using the representative adaptive acquisition control data.

In some implementations, the target exposure input data 930 includes scene classification data corresponding to the previous frame captured in accordance with the adaptive acquisition control sample rate.

In some implementations, the target exposure input data 930 includes motion data, such as motion data describing motion of the image capture apparatus, captured, generated, or determined, in accordance with capturing the previous frame captured in accordance with the adaptive acquisition control sample rate. The motion data may include angular speed data that indicates the angular component of motion velocity of the image capture apparatus in accordance with capturing the previous frame captured in accordance with the adaptive acquisition control sample rate. For example, the angular speed data may be determined using data from a motion sensor, such as a gyroscope, of the image capture apparatus, such as the gyroscope 546 shown in FIG. 5. The motion data of the target exposure input data 930 constructively represents the motion of the image capture apparatus corresponding to capturing the current frame and may differ from motion data indicating the motion of the image capture apparatus corresponding to capturing the current frame.

The target exposure component 910 obtains, determines, selects, generates, calculates, produces, or identifies, a target exposure, or target exposure value, (targetExposure). The target exposure component 910 is shown with a broken line boarder to indicate that the target exposure component 910 obtains, determines, selects, generates, calculates, produces, or identifies, the target exposure (targetExposure) periodically, such as in accordance with the adaptive acquisition control sample period, or the corresponding adaptive acquisition control sample rate, such as on a per third captured frames basis for video captured at thirty frames per second (30 fps). Obtaining the target exposure (targetExposure) by the target exposure component 910 may be similar to obtaining a target exposure value by the auto-exposure luminance determination component 710 shown in FIG. 7, or a portion thereof, except as is described herein or as is otherwise clear from context.

The target exposure component 910 obtains, determines, selects, generates, calculates, produces, or identifies, the target exposure (targetExposure) based on, using, or in accordance with, the target exposure input data 930, or a portion thereof. The target exposure (targetExposure) indicates an optimized, target, mean gray level, such as for the luma, or luminance, channel for the processed image, such as subsequent to gamma correction. Although not expressly shown in FIG. 9, gamma correction may be applied to the processed, or partially processed, image output by the first portion 900 of the tone control component of the adaptive acquisition control component.

The target exposure (targetExposure) is adapted in accordance with the scene luminance (sceneLuminance) of the representative image. The target exposure (targetExposure) is distinct from, such as generated separately from, the target exposure value (targetY) obtained by the exposure control component 800 shown in FIG. 8.

The target exposure component 910 obtains, determines, selects, generates, calculates, produces, or identifies, the scene luminance value (sceneLuminance) in accordance with the target exposure input data 930. Obtaining the scene luminance value (sceneLuminance) includes determining a mean gray level, or value, (meanGrayLevel) of the representative image from the target exposure input data 930. Obtaining the scene luminance value (sceneLuminance) may include determining a scene exposition value (sceneExposition) using the adaptive acquisition control data from the target exposure input data 930. The scene exposition value (sceneExposition) is obtained as a product of multiplying the gain value (gain) by the exposure duration value (exposureDuration) (sceneExposition=gain*exposureDuration).

Obtaining the scene luminance value (sceneLuminance) by the target exposure component 910 may be similar to obtaining a scene luminance value by the auto-exposure luminance determination component 710 shown in FIG. 7, or a portion thereof, except as is described herein or as is otherwise clear from context.

The scene luminance (sceneLuminance) is proportional to a result of dividing the mean gray value (meanGrayLevel) by the scene exposition value (gain*exposureDuration), which may be expressed as the following:

$$sceneLuminance \propto meanGrayLevel/(gain * exposureDuration).$$

The mean gray value (meanGrayLevel) may be expressed as a value, such as an integer value or a floating-point value, in a defined range, such as 0-255. The mean gray value (meanGrayLevel) may be a weighted mean gray value obtained using weighted pixel values obtained by weighting the pixel values from the representative image in accordance with a weighting map that indicates respective weights for the pixel values from the representative image.

The target exposure component 910 obtains, determines, selects, generates, calculates, produces, or identifies, the mean gray value (meanGrayLevel). The mean gray value (meanGrayLevel) is distinct from, such as generated separately from, a mean grey value obtained by the auto-exposure luminance determination component 810 shown in FIG. 8, which is similar to the mean grey value obtained by the auto-exposure luminance determination component 730 shown in FIG. 7, except as is described herein or as is otherwise clear from context. In some implementations, the mean gray value (meanGrayLevel) may be determined in accordance with region of interest (ROI) data. Other techniques for obtaining the scene luminance may be used.

In some implementations, the adaptive acquisition control data, from the target exposure input data 930, may include an aperture value used to capture the image from which the image capture apparatus obtained the representative, or thumbnail, image, and the scene luminance value (sceneLuminance) may be obtained using the aperture value, which may be expressed as shown in Equation 1.

The target exposure (targetExposure) is adaptive to a defined, such as manually tuned, target exposure tone curve (targetExposureCurve), which may be implemented as a lookup table (lut), that maps exposure values, such as target exposure values, to corresponding scene luminance values. Although not expressly shown in FIG. 9, the target exposure component 910 may access, such as read, such as from a memory of the image capture apparatus, receive, or otherwise obtain, the target exposure tone curve (targetExposureCurve).

For example, the target exposure component 910 may obtain the target exposure (targetExposure) adaptive to, or as a function ($f(\ )$) of, the scene luminance (sceneLuminance) and the target exposure tone curve (targetExposureCurve), which may be expressed as the following:

$$targetexposure = f(sceneLuminance, targetExposureCurve).$$

For example, the scene luminance (sceneLuminance) may be used as an abscissa to obtain the target exposure (targetExposure) from the lookup table corresponding to the target exposure tone curve (targetExposureCurve), which may be expressed as targetExposure=targetExposureCurve (sceneLuminance).

In some implementations, the target exposure is adaptive to the scene classification data included in the target exposure input data 930. Although not expressly shown in FIG. 9, the target exposure component 910 may access, such as read, such as from a memory of the image capture apparatus, receive, or otherwise obtain, one or more scene-classification-specific target exposure tone curves, or the target exposure tone curve may map exposure values, such as target exposure values, to corresponding scene luminance values for respective scene classifications.

For example, the target exposure component 910 may obtain the target exposure (targetExposure) adaptive to, or as a function ($f(\ )$) of, the scene luminance (sceneLuminance), the target exposure tone curve (targetExposureCurve), and the scene classification (sceneClassification), which may be expressed as the following:

$$targetExposure=f(sceneLuminance,targetExposureCurve,sceneClassification).$$

For example, the function ($f(\ )$) may include using the scene classification (sceneClassification) to determine a bias value (bias), such that obtaining the target exposure (targetExposure) may be expressed as targetExposure=bias*targetExposureCurve (sceneLuminance).

The target exposure component 910 temporally smooths the target exposure, such as to avoid large temporal variation, to obtain a temporally smoothed target exposure, or temporally smoothed target exposure value, (targetExposureSmoothed). The target exposure component 910 may use the temporally smoothed target exposure value (targetExposureSmoothed) as the target exposure (targetExposure).

Although not shown separately in FIG. 9, the target exposure component 910 accesses, such as reads, such as from a memory of the image capture apparatus, receives, or otherwise obtains, a previous target exposure, or previous target exposure value, (targetExposurePrevious), such as a temporally smoothed target exposure previously output, such as stored, by the target exposure component 910 in accordance with processing a previously captured image.

The temporally smoothed target exposure (targetExposureSmoothed) may be obtained as a linear combination of the target exposure (targetExposure) and the previous target exposure (targetExposurePrevious), and in accordance with a smoothing coefficient (a), which may be a tuned, such as manually, defined smoothing coefficient, which may be expressed as the following:

$$targetExposureSmoothed =$$
$$(1-a)*targetExposurePrevious + a*targetExposure.$$

Although the term 'smoothing coefficient' and the symbol (a) are used with respect to smoothing other values, the smoothing coefficient (a) used for obtaining the temporally smoothed target exposure (targetExposureSmoothed) may be defined, or tuned, such as manually, for obtaining the temporally smoothed target exposure (targetExposureSmoothed), which may be referred to as a target exposure smoothing coefficient or defined target exposure smoothing coefficient. Although described herein with respect to the temporally smoothed target exposure (targetExposureSmoothed), temporal smoothing may be omitted, and the target exposure (targetExposure) may be used.

The target exposure component 910 outputs, such as stores in a memory of the image capture apparatus, sends, transmits, or otherwise makes accessible, target exposure output data including the target exposure (targetExposure), which may be the temporally smoothed target exposure value (targetExposureSmoothed). For example, the target exposure component 910 may output the target exposure data to the aggregate gain component 920.

The aggregate gain component 920 obtains, determines, selects, generates, calculates, produces, or identifies, a target aggregate gain, or target aggregate gain value, (targetAggregateGain) to apply to the current image, or frame, to obtain the processed image, or frame, having the target exposure (targetExposure), which may be the temporally smoothed target exposure value (targetExposureSmoothed). The aggregate gain component 920 is shown with a broken line boarder to indicate that the aggregate gain component 920 obtains, determines, selects, generates, calculates, produces, or identifies, the target aggregate gain (targetAggregateGain) periodically, such as in accordance with the adaptive acquisition control sample period, or the corresponding adaptive acquisition control sample rate, such as on a per third captured frames basis for video captured at thirty frames per second (30 fps).

The aggregate gain component 920 accesses, such as reads, such as from a memory of the image capture apparatus, receives, or otherwise obtains, aggregate gain input data 940. The aggregate gain input data 940 is shown with a broken line boarder to indicate that the aggregate gain input data 940 is obtained periodically, such as in accordance with the adaptive acquisition control sample rate, such as on a per-third frame basis.

The aggregate gain input data 940 is similar to the target exposure input data 930, except as is described herein or as is otherwise clear from context. For example, the aggregate gain input data 940 may omit scene classification data.

The aggregate gain component 920 obtains, such as reads or receives, the target exposure output data including the target exposure (targetExposure), which may be the temporally smoothed target exposure value (targetExposureSmoothed), or a portion thereof, output by the target exposure component 910, such as in accordance with the adaptive acquisition control sample rate.

The target aggregate gain (targetAggregateGain) is an aggregate, such as a sum, of gain applied to the current image, or frame, to obtain the processed, or partially processed, image, or frame, having the target exposure (targetExposure), which may be the temporally smoothed target exposure value (targetExposureSmoothed). For example, the target aggregate gain (targetAggregateGain) may be eighteen percent (18%) of the dynamic, or bit depth, wherein bit depth indicates the number or cardinality of bits available for storing a respective pixel value, of the current image. For example, a compressed image format may have a bit depth of eight bits, whereas the current image, which may be uncompressed, may have a higher bit depth, such as fourteen bits or seventeen bits.

The aggregate gain component 920 obtains, determines, selects, generates, calculates, produces, or identifies, the exposure of the representative frame (representativeExposure or representative exposure value), such as using the representative histogram data, such as the luma, or luminance, channel, or component, histogram (histogramY), from the aggregate gain input data 940. The exposure of the representative frame (representativeExposure) represents the exposure of the current frame and may differ from the exposure of the current frame. The exposure of the representative frame (representativeExposure) may be defined or described as the mean gray level of the luma histogram (histogramY) from the aggregate gain input data 940. Obtaining the exposure of the representative frame (representativeExposure) may be expressed as the following:

$$representativeExposure = \text{mean}(histogramY).$$

In another example, the exposure of the representative frame (representativeExposure) may be defined or described as the mean gray level of the representative image (thumbnailY) from the aggregate gain input data 940. Obtaining the exposure of the representative frame (representativeExposure) may be expressed as the following:

$$representativeExposure = \text{mean}(thumbnailY).$$

In some implementations, the aggregate gain input data 940 includes region of interest data, such as manually defined region of interest data, automatically determined region of interest data, such as face detection region of interest data, stabilization region of interest data, or a combination thereof. In some implementations, respective weighting data may be associated with the region of interest data, such that pixels in a region of interest are weighted more than other pixels, and obtaining the exposure of the representative frame (representativeExposure) may include obtaining the exposure of the representative frame (representativeExposure) in accordance with the weighting data and the corresponding region of interest data. For example, the weighting may be applied to the representative image (thumbnailY), wherein region of interest pixels have a high weight relative to other pixels, such that the mean of the weighted representative image is used. In another example, a histogram of the weighted representative image may be obtained and a mean of the histogram of the weighted representative image may be used.

In some implementations, obtaining the exposure of the representative frame (representativeExposure) includes obtaining the exposure of the representative frame (representativeExposure) using the representative image (thumbnailY), independent of the region of interest data, obtaining a region of interest luminance thumbnail (ROIofThumbnailY) in accordance with the representative image (thumbnailY) and the region of interest data, and obtaining a region of interest ratio value (ratioExpoStatsRoi), which may be expressed as ratioExpoStatsRoi=mean(thumbnailY)/mean (ROIofThumbnailY). The region of interest ratio value (ratioExpoStatsRoi) may be clipped to within a defined range, defined by a minimum ratio (minRatio) and a maximum ratio (maxRatio), to obtain a clipped region of interest ratio value (ratioExpoStatsRoiClipped), which may be expressed as ratioExpoStatsRoiClipped=min(max(ratioExpoStatsRoi, minRatio), maxRatio). A target aggregate gain region of interest value (targetAggregateGainRoi) may be obtained as a product of the target aggregate gain (targetAggregateGain) and the region of interest ratio value (ratio- AggregateGain) and the region of interest ratio value (ratio- ExpoStatsRoi), which may be expressed as targetAggregateGainRoi=targetAggregateGain*ratioExpo StatsRoi.

The current frame, as captured, has gain applied, or used, by the image sensor in accordance with capturing the current frame (sensor gain or sensorGain). The exposure of the current frame may differ from the target exposure (targetExposure), which may be the temporally smoothed target exposure value (targetExposureSmoothed) for the current gain. To obtain the processed, or partially processed, image, or frame, corresponding to the current frame, the aggregate gain component 920 determines a remaining gain, or remaining digital gain, (gainRemaining) to be applied to the current frame to obtain the processed, or partially processed, image, or frame, corresponding to the current frame the aggregate gain component 920 having the target exposure (targetExposure), which may be the temporally smoothed target exposure value (targetExposureSmoothed), such that the aggregate gain of the processed, or partially processed, image, or frame, is a sum of the sensor gain (sensorGain) and the remaining gain.

The target aggregate gain (targetAggregateGain) is a combination of the exposure duration (exposureDuration), from the aggregate gain input data 940, the sensor gain (sensorGain), from the aggregate gain input data 940, and a remaining gain (gainRemaining) determined by the aggregate gain component 920, which may be expressed as the following:

$$targetAggregateGain = exposureDuration*sensorGain*gainRemaining.$$

The aggregate gain component 920 obtains, determines, selects, generates, calculates, produces, or identifies, the remaining gain (gainRemaining) for obtaining the processed, or partially processed, image having the target exposure (targetExposure), which may be the temporally smoothed target exposure value (targetExposureSmoothed).

The aggregate gain component 920 obtains the remaining gain (gainRemaining) adaptive to, or as a function ($f(\ )$) of, the target exposure (targetExposure), which may be the temporally smoothed target exposure value (targetExposureSmoothed), obtained from the target exposure component 910 and the exposure of the representative frame (representativeExposure), which may be expressed as the following:

$$gainRemaining = f(representativeExposure, targetExposure).$$

For example, the remaining gain (gainRemaining) may be a result of dividing the temporally smoothed target exposure (targetExposureSmoothed) by the exposure of the representative frame (representativeExposure), which may be expressed as the following:

$$gainRemaining = targetExposureSmoothed / representativeExposure.$$

The remaining gain (gainRemaining) may be applied to the current image as captured to compensate for, such as reduce or eliminate, differences, such as luminance variations, of the current image as captured with respect to previously captured, such as immediately previously captured, images corresponding to differences, such as greater than thirty percent (30%), in the respective adaptive acquisition control parameters used for capturing the respective images. The output or result of applying the remaining gain (gainRemaining) to the current image may include differences from the previously captured, such as immediately previously captured, images corresponding to changes of the captured scene, or scene modification, such as a change from a relatively dark lighting condition to a relatively bright lighting condition.

The aggregate gain component 920 obtains, determines, selects, generates, calculates, produces, or identifies, a temporally smoothed target aggregate gain, or temporally smoothed target aggregate gain value, (targetAggregateGainSmoothed) to compensate for, such as reduce or eliminate, differences, including differences corresponding to scene modification and differences corresponding to the respective adaptive acquisition control parameters used for capturing the respective images, by applying temporal smoothing. The aggregate gain component 920 may use the temporally smoothed target aggregate gain value (targetAggregateGainSmoothed) as the target aggregate gain value (targetAggregateGain).

The aggregate gain component 920 obtains, determines, selects, generates, calculates, produces, or identifies, the temporally smoothed target aggregate gain (targetAggregateGainSmoothed) by temporally smoothing the target aggregate gain (targetAggregateGain). A temporally smoothed target aggregate gain (targetAggregateGainSmoothed) greater than one (1) corresponds with a processed image that is bright relative to the captured image. A temporally smoothed target aggregate gain (targetAggregateGainSmoothed) less than one (1) corresponds with a processed image that is dark relative to the captured image.

Although not shown separately in FIG. 9, to obtain the temporally smoothed target aggregate gain (targetAggregateGainSmoothed), the aggregate gain component 920 accesses, such as reads, such as from a memory of the image capture apparatus, receives, or otherwise obtains, a previous target aggregate gain, such as a previous temporally smoothed target aggregate gain, or previous temporally smoothed target aggregate gain value, (targetAggregateGainSmoothedPrevious), such as a target aggregate gain previously output by the aggregate gain component 920, such as for the previous processed frame.

The temporally smoothed target aggregate gain (targetAggregateGainSmoothed) may be obtained by interpolating between, such as obtaining a linear combination of, the target aggregate gain (targetAggregateGain) and the previous target aggregate gain, which may be the previous temporally smoothed target aggregate gain (targetAggregateGainSmoothedPrevious), and in accordance with a smoothing coefficient (a), which may be a tuned, such as manually, defined smoothing coefficient, which may be expressed as the following:

$$\text{targetAggregateGainSmoothed} =$$
$$(1-a)*\text{targetAggregateGainSmoothedPrevious} + a*\text{targetAggregateGain}.$$

In some implementations, the aggregate gain component 920 obtains, determines, selects, generates, calculates, produces, or identifies, the temporally smoothed target aggregate gain (targetAggregateGainSmoothed) by temporally smoothing the target aggregate gain region of interest value (targetAggregateGainRoi). Although not shown separately in FIG. 9, to obtain the temporally smoothed target aggregate gain (targetAggregateGainSmoothed), the aggregate gain component 920 accesses, such as reads, such as from a memory of the image capture apparatus, receives, or otherwise obtains, a previous target aggregate gain region of interest value, such as a previous temporally smoothed target aggregate gain region of interest value, (targetAggregateGainRoiSmoothedPrevious), such as a target aggregate gain region of interest value previously output by the aggregate gain component 920, such as for the previous processed frame.

The temporally smoothed target aggregate gain (targetAggregateGainSmoothed) may be obtained by interpolating between, such as obtaining a linear combination of, the target aggregate gain region of interest value (targetAggregateGainRoi) and the previous target aggregate gain region of interest value, which may be the previous temporally smoothed target aggregate gain region of interest value (targetAggregateGainRoiSmoothedPrevious), and in accordance with the smoothing coefficient (a), which may be expressed as the following:

$$\text{targetAggregateGainSmoothed} =$$
$$(1-a)*\text{targetAggregateGain}Roi\text{SmoothedPrevious} +$$
$$a*\text{targetAggregateGain}Roi.$$

Using the target aggregate gain region of interest value (targetAggregateGainRoi) improves the system relative to using the target aggregate gain (targetAggregateGain) such that the use of region of interest data may be enabled or disabled while maintaining the value of the representative exposure.

Although the term 'smoothing coefficient' and the symbol (a) are used with respect to smoothing other values, the smoothing coefficient (a) used for obtaining the temporally smoothed target aggregate gain (targetAggregateGainSmoothed) may be defined, or tuned, such as manually, for obtaining the temporally smoothed target aggregate gain (targetAggregateGainSmoothed), which may be referred to as a defined target aggregate gain smoothing coefficient. Although described herein with respect to the temporally smoothed target aggregate gain (targetAggregateGainSmoothed), temporal smoothing may be omitted.

The aggregate gain component 920 outputs, such as stores in a memory of the image capture apparatus, sends, transmits, or otherwise makes accessible, aggregate gain output data 950 including the target aggregate gain value (targetAggregateGain), which may be the temporally smoothed target aggregate gain (targetAggregateGainSmoothed). For example, the aggregate gain component 920 may output the aggregate gain output data including the target aggregate gain (targetAggregateGain) to the auto-exposure compensation component 1010 shown in FIG. 10. The aggregate gain component 920 may omit obtaining, processing, or modifying the current image, or frame.

FIG. 10 is a block diagram of an example of a second portion 1000 of a tone control component of an adaptive acquisition control component. The second portion 1000 of the tone control component, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, as a part, or parts, of the image processing pipeline 600 shown in FIG. 6, or in another image capture apparatus. In some implementations, the second portion 1000 of the tone control component may be implemented in a digital signal processor (DSP), an application-specific integrated circuit (ASIC), or a combination of a digital signal processor and an application-specific integrated circuit. One or more aspects of the second portion 1000 of the tone control component may be implemented in hardware, software, or a combination of hardware and software.

As shown in FIG. 10, the second portion 1000 of the tone control component includes an auto-exposure compensation component 1010, a contrast control component 1020, and a tone control driver component 1030. The second portion 1000 of the tone control component may include components other than the components shown in FIG. 10.

The auto-exposure compensation component 1010 obtains, determines, selects, generates, calculates, produces, or identifies, an auto-exposure compensation tone curve, which may be expressed as an auto-exposure compensation lookup table (lutAEC), that defines or describes a per-pixel value gain to apply the current image to obtain the processed, or partially processed, image having the target aggregate gain value (targetAggregateGain), which may be the temporally smoothed target aggregate gain (targetAggregateGainSmoothed), corresponding to applying the remaining gain (gainRemaining). The auto-exposure compensation component 1010 is shown with a solid line border to indicate that the auto-exposure compensation component 1010 obtains the auto-exposure compensation lookup table (lutAEC) on a per-frame basis.

The auto-exposure compensation component 1010 accesses, such as reads, such as from a memory of the image capture apparatus, receives, or otherwise obtains, auto-exposure compensation input data 1040. The auto-exposure compensation input data 1040 is shown with a solid line border to indicate that the auto-exposure compensation input data 1040 is obtained on a per-frame basis.

The auto-exposure compensation input data 1040 includes target adaptive acquisition control data, such as the target adaptive acquisition control data 850 previously output by the exposure control component 800 shown in FIG. 8, such as exposition data, such as exposure duration (exposureDuration) data and sensor gain (sensorGain) data previously output by the exposure control component 800 shown in FIG. 8.

The auto-exposure compensation input data 1040 may include a manually defined, such as user defined, exposure bias (EB), such as 0.5 or 1.0 (positive values) to obtain brighter images, or −0.5 or −1.0 (negative values) to obtain darker images. In some implementations, the defined exposure bias, or defined exposure bias value, (EB) may be omitted or a value of one may be used.

The auto-exposure compensation component 1010 obtains, such as reads or receives, the aggregate gain output data including the target aggregate gain value (targetAggregateGain), which may be the temporally smoothed target aggregate gain (targetAggregateGainSmoothed), output by the aggregate gain component 920 shown in FIG. 9, such as in accordance with the adaptive acquisition control sample rate.

The auto-exposure compensation component 1010 obtains, such as reads or receives, the target exposure output data, or a portion thereof, target exposure output data including the target exposure (targetExposure), which may be the temporally smoothed target exposure value (targetExposureSmoothed), output by the target exposure component 910 shown in FIG. 9, such as in accordance with the adaptive acquisition control sample rate.

Relative to linear gain, the per-pixel value gain defined or described by the auto-exposure compensation tone curve reduces or eliminates saturation for bright pixels by applying relatively low gain and reduces or eliminates noise in dark pixels by applying relatively high gain, such as in relatively bright, highlight, scenes, and applying relatively moderate gain, such as in dark, lowlight, scenes.

To obtain the auto-exposure compensation lookup table (lutAEC), corresponding to the auto-exposure compensation tone curve, the auto-exposure compensation component 1010 obtains, determines, selects, generates, calculates, produces, or identifies, a compliant aggregate gain, or compliant aggregate gain value, (compliantAggregateGain) based on the target aggregate gain value (targetAggregateGain), which may be the temporally smoothed target aggregate gain (targetAggregateGainSmoothed), obtained from the aggregate gain component 920 shown in FIG. 9, the exposure bias (EB), one or more sensor exposure constraints, or a combination thereof. A respective sensor exposure constraint defines or describes a range of exposure values, or corresponding gain values, such as from a defined minimum aggregate gain, or defined minimum aggregate gain value, (minAggregateGain) to a maximum aggregate gain, or maximum aggregate gain value, (maxAggregateGain), in accordance with sensor capacity, or capability, and corresponding defined, such as user defined, configuration values. Obtaining the compliant aggregate gain (compliantAggregateGain) may be expressed as the following:

$$compliantAggregateGain = \max\big($$
$$\min\big(targetAggregateGain * 2^{EB}, maxAggregateGain\big), minAggregateGain\big).$$

For example, the sensor gain (sensorGain) may be a value in a defined range, such as from a minimum sensor gain (minSensorGain) of one (1.0) to a maximum sensor gain (maxSensorGain) of thirty-two (32.0), the exposure duration may be a value in a defined range, such as from a minimum exposure duration (minExposureDuration) of 0.0006 seconds to a maximum exposure duration (maxExposureDuration) of 0.33 seconds, such that obtaining the minimum aggregate gain value (minAggregateGain) may be expressed as minAggregateGain=minSensorGain*minExposureDuration, or minAggregateGain=1*0.0006, and obtaining the maximum aggregate gain value (maxAggregateGain) may be expressed as maxAggregateGain=maxSensorGain*maxExposureDuration, or maxAggregateGain=32*0.33. Other ranges, which may correspond with respective frame rates and sensor capabilities, may be used.

The auto-exposure compensation component 1010 obtains, determines, selects, generates, calculates, produces, or identifies, an auto-exposure compensation gain value (gainAEC) by dividing the compliant aggregate gain (compliantAggregateGain) by a product of multiplying the exposure duration (exposureDuration), previously output by the exposure control component 800 shown in FIG. 8, used to capture the current frame, and the sensor gain (sensorGain), previously output by the exposure control component 800 shown in FIG. 8, used to capture the current frame, which may be expressed as the following:

$$gainAEC = compliantAggregateGain / (sensorGain * exposureDuration).$$

The auto-exposure compensation component 1010 obtains, determines, selects, generates, calculates, produces, or identifies, the auto-exposure compensation lookup table (lutAEC) as a non-linear curve for applying the auto-exposure compensation gain (gainAEC), which avoids saturating bright portions of the processed image, such as using Bézier curves. Obtaining the auto-exposure compensation lookup table (lutAEC) as non-linear curve adaptive to, or as a function ($f($ $))$ of, the auto-exposure compensation gain (gainAEC) and the target exposure (targetExposure), which may be the temporally smoothed target exposure value (targetExposureSmoothed), may be expressed as the following:

$$lutAEC = f(gainAEC, targetExposure).$$

The slope of the curve of the auto-exposure compensation lookup table (lutAEC) at origin is equal to the auto-exposure compensation gain (gainAEC). The slope of the curve of the auto-exposure compensation lookup table (lutAEC) becomes zero, or null, in the brightest part of the dynamic. The curve includes a linear slope from zero (0) to the point corresponding to a result of dividing the target exposure (targetExposure), which may be the temporally smoothed target exposure value (targetExposureSmoothed), by the auto-exposure compensation gain (gainAEC), with a slope of the auto-exposure compensation gain (gainAEC), such that for a point (x) on the horizontal axis, the value of the corresponding point (y) on the vertical axis is a product of multiplying the auto-exposure compensation gain (gainAEC) by x, and a Bézier curve until the point [1,1] with three control points, wherein the Bézier curve is a parametric curve with N control points, including a control point corresponding to the origin [0,0], a control point corresponding to the end [1,1], and one or more intermediate control points, which may be non-intersecting with the curve. For example, the Bézier curve may be defined, or described, with three control points and may be a quadratic curve.

The auto-exposure compensation component 1010 outputs, such as stores in a memory of the image capture apparatus, sends, transmits, or otherwise makes accessible, auto-exposure compensation output data including the auto-exposure compensation lookup table (lutAEC), the auto-exposure compensation gain (gainAEC), or both. For example, the auto-exposure compensation component 1010 may output the auto-exposure compensation output data including the auto-exposure compensation lookup table (lutAEC), the auto-exposure compensation gain (gainAEC), or both, to the contrast control component 1020, the tone control driver 1030, or both.

The contrast control component 1020 determines a per gray level gain to apply to the current image, or frame, to obtain the processed, or partially processed, image. The contrast control component 1020 is shown with a broken line boarder to indicate that the contrast control component 1020 obtains, determines, selects, generates, calculates, produces, or identifies, the per gray level gain to apply to the current image, or frame, periodically, such as in accordance with the adaptive acquisition control sample period, or the corresponding adaptive acquisition control sample rate, such as on a per third captured frames basis for video captured at thirty frames per second (30 fps).

The contrast control component 1020 accesses, such as reads, such as from a memory of the image capture apparatus, receives, or otherwise obtains, contrast control input data 1050. The contrast control input data 1050 is shown with a broken line boarder to indicate that the contrast control input data 1050 is obtained periodically, such as in accordance with the adaptive acquisition control sample rate, such as on a per-third frame basis.

The contrast control input data 1050 is similar to the target exposure input data 930 shown in FIG. 9, except as is described herein or as is otherwise clear from context. For example, the contrast control input data 1050 includes the representative histogram data, such as histograms of the captured image corresponding to the representative image, such as histograms of the RGB format image (histogram-sRGB), which may include a red channel (R) histogram, a blue channel (B) histogram, and a green channel (G) histogram. In some implementations, the contrast control input data 1050 may omit scene classification data.

The contrast control component 1020 accesses, such as reads, such as from a memory of the image capture apparatus, receives, or otherwise obtains, the auto-exposure compensation output data including the auto-exposure compensation lookup table (lutAEC), the auto-exposure compensation gain (gainAEC), or both, output by the auto-exposure compensation component 1010, such as in accordance with the adaptive acquisition control sample rate.

To determine the per gray level gain to apply to the current image, or frame, to obtain the processed, or partially processed, image, the contrast control component 1020 obtains, determines, selects, generates, calculates, produces, or identifies, a contrast control tone curve (CCTC), or a corresponding contrast control lookup table (lutCC), for optimizing perceived contrast in the processed, or partially processed, image.

To obtain the contrast control tone curve (CCTC), or the corresponding contrast control lookup table (lutCC), the contrast control component 1020 obtains, determines, selects, generates, calculates, produces, or identifies, a post auto-exposure compensation histogram (postAECHistogram) by applying the auto-exposure compensation gain (gainAEC) to the representative histogram obtained for the image, or frame, captured in accordance with the adaptive acquisition control sample rate, which may be histogram data for a raw image, or the luminance, or luma, channel of the image, or frame, (histogramY), which constructively represents the current image, or the histogram thereof. Applying a lookup table to a histogram includes shifting the positions of respective bins of the histogram in accordance with the lookup table applied to the input positions.

For example, the input histogram (H) may have a number, or cardinality, (N) of bins. A respective bin has a corresponding value, such that obtaining the value of a bin(x) of the input histogram (H) may be expressed as H(x). The input lookup table (f) may have the number, or cardinality, (N) of value, which may be in the range from zero (0) to one less than the number, or cardinality, (N), which may be expressed as (0, N−1). The value (x) of the input lookup table (f) may be expressed as f(x). The input lookup table (f) may have integer indexes and values, such that x and f(x) are integers in the range from zero (0) to one less than the number, or cardinality, (N) (0, N−1). An output histogram (G) may have the number, or cardinality, (N) bins. A respective bin may have a respective value, such that the bin x of G has the value G (x). For example, obtaining the output histogram (G) may include using an empty histogram wherein the bins have the value zero (0). Applying the input lookup table (f) to the input histogram (H) may include iteration. For a respective value (x), which is an integer index ranging from zero (0) to N–1, G(f(x)) is the value of bin f(x), and G(f(x)) is incremented by the value H(x).

Although not shown separately in FIG. 10, the contrast control component 1020 may access, such as read, such as from a memory of the image capture apparatus, receive, or otherwise obtain, a defined histogram tuning value, such as a histogram shape parameter, (targetHistogramTuning), which may be Gaussian. Other shapes, such as flat or parabola may be used. The histogram shape parameter (targetHistogramTuning) may be defined, or tuned, such as manually.

The contrast control component 1020 obtains, determines, selects, generates, calculates, produces, or identifies, a contrast control target histogram, or contrast control target histogram data, (targetHistogram) using the post automatic exposure control histogram (postAECHistogram). The contrast control target histogram (targetHistogram) may be adapted to, or a function ($f(\ )$) of, the post automatic exposure control histogram (postAECHistogram), and the histogram shape parameter (targetHistogramTuning). Obtaining the contrast control target histogram (targetHistogram) may be expressed as the following:

$$targetHistogram = f(postAECHistogram, targetHistogramTuning).$$

For example, obtaining the contrast control target histogram (targetHistogram) as a function ($f(\ )$) of, the post automatic exposure control histogram (postAECHistogram), and the histogram shape parameter (targetHistogramTuning), may include using a Gaussian function that includes an expected value parameter for adjusting the center of the Gaussian curve and a standard deviation parameter for adjusting the stretch, or the width of the 'bell' wherein the Gaussian curve is similar to a bell curve, of the Gaussian curve. The mean, such as the mean luminosity, of the post automatic exposure control histogram (postAECHistogram) is used as the expected value parameter, which may preserve the global exposure of the image. Although not shown separately in FIG. 10, the contrast control component 1020 may access, such as read, such as from a memory of the image capture apparatus, receive, or otherwise obtain, defined, or tuned, such as manually, such as based on training data, value for the standard deviation, which may correspond with an image capture mode of the image capture apparatus. The contrast of the image corresponds to the standard deviation relative to the center of the curve. For example, a standard deviation that is relatively close to the center of the curve corresponds to a relatively low curve spread and relatively high image contrast. In another example, a standard deviation that is relatively far to the center of the curve corresponds to a relatively high curve spread and relatively low image contrast.

In some implementations, the contrast control input data 1050 may include scene classification data, which may indicate a scene classification, such as underwater, daylight, or nighttime, and the contrast control target histogram (targetHistogram) may be adapted to, or a function ($f(\ )$) of, the scene classification (sceneClassification), the post automatic exposure control histogram (postAECHistogram), and the histogram shape parameter (targetHistogramTuning). Obtaining the contrast control target histogram (targetHistogram) may be expressed as the following:

$$targetHistogram = $$
$$f(postAECHistogram, targetHistogramTuning, sceneClassifaction).$$

The contrast control component 1020 obtains, determines, selects, generates, calculates, produces, or identifies, the contrast control lookup table (lutCC), implementing the contrast control tone curve (CCTC), via optimization, subject to one or more defined contrast control constraints, such as to avoid quantification, noise enhancement, contrast enhancement of uniform scenes, flat tones, or the like, such that the contrast control lookup table (lutCC) is adapted to, or a function ($f(\ )$) of, the post automatic exposure control histogram (postAECHistogram), the contrast control target histogram (targetHistogram), constraint data (lutCCConstraints) defining, or describing, the defined constraints, and the representative image (thumbnailY), such that applying the contrast control tone curve (CCTC) to the current image results in the processed, or partially processed, image, or frame, having the contrast control target histogram (targetHistogram), which may be expressed as the following:

$$lutCC = $$
$$f(postAECHistogram, targetHistogram, lutCCConstraints, thumbnailY).$$

In some implementations, the contrast control component 1020 obtains, determines, selects, generates, calculates, produces, or identifies, a uniformity score (uniformityScore) for the representative image (thumbnailY), such as in a defined range, such as from zero (0) to one (1). The uniformity score (uniformityScore) may be greater than, or equal to, a defined threshold, such as 0.5, which indicates that the image content in the representative image (thumbnailY) is relatively uniform, indicating an absence of edges, features, texture, or a combination thereof in the image content. The uniformity score (uniformityScore) may be less than the defined threshold indicates that the image content in the representative image (thumbnailY) is relatively non-uniform, indicating a prevalence of edges, features, texture, or a combination thereof, in the image content.

To obtain the uniformity score (uniformityScore), the contrast control component 1020 obtains, determines, selects, generates, calculates, produces, or identifies, a gradient of the representative image (thumbnailY). The gradient is a filter to detect edges in the image content of the representative image (thumbnailY).

To obtain the uniformity score (uniformityScore), the contrast control component 1020 obtains, determines, selects, generates, calculates, produces, or identifies, a histogram of the gradient (gradient histogram) of the representative image (thumbnailY).

The contrast control component 1020 obtains, determines, selects, generates, calculates, produces, or identifies, the uniformity score (uniformityScore) in accordance with the gradient histogram.

In some implementations, the contrast control component 1020 obtains, determines, selects, generates, calculates, produces, or identifies, a first intensity value (fIntensity) in a defined range, such as from zero (0) to one (1), in accordance with the uniformity score (uniformityScore), and in accordance with a defined tuning intensity value (tuningIntensity), which is a value in a defined range, such as from zero (0) to one (1), which may be expressed as fIntensity=

(1−uniformityScore)*tuningIntensity. The first intensity value (fIntensity) may be zero (0) for a uniform image and may be the defined tuning intensity value (tuningIntensity) for a non-uniform image.

In some implementations, the contrast control component 1020 obtains, determines, selects, generates, calculates, produces, or identifies, as the contrast control lookup table (lutCC), a uniformity modulated contrast control lookup table (lutCCMod) in accordance with the first intensity value (fIntensity), and in accordance with a look-up table representing, or including, the identify function (lutIdentity), which may be expressed as lutCCMod=(lutCC−lutIdentity) *uniformityScore+lutIdentity.

The contrast control component 1020 obtains, determines, selects, generates, calculates, produces, or identifies, a temporally smoothed contrast control lookup table (lutCCSmoothed), or a corresponding temporally smoothed contrast control tone curve (CCTCSmoothed), which may prevent, or minimize, abrupt contrast variation between frames, by temporally smoothing the contrast control lookup table (lutCC). The contrast control component 1020 may use the temporally smoothed contrast control lookup table (lutCCSmoothed), or the corresponding temporally smoothed contrast control tone curve (CCTCSmoothed), as the contrast control lookup table (lutCC), or the contrast control tone curve (CCTC).

Although not shown separately in FIG. 10, the contrast control component 1020 accesses, such as reads, such as from a memory of the image capture apparatus, receives, or otherwise obtains, a previous contrast control lookup table (lutCCPrevious), which may be a previous temporally smoothed contrast control lookup table (lutCCSmoothedPrevious), such as the contrast control lookup table previously output by the contrast control component 1020, such as for the previous processed frame.

The temporally smoothed contrast control lookup table (lutCCSmoothed) may be obtained by interpolating between, such as by obtaining a linear combination of, the contrast control lookup table (lutCC) and the previous contrast control lookup table (lutCCPrevious), which may be the previous temporally smoothed contrast control lookup table (lutCCSmoothedPrevious), and in accordance with a smoothing coefficient (a), which may be a tuned, such as manually, defined smoothing coefficient, which may be expressed as the following:

$$lutCCSmoothed = (1 - a) * lutCCPrevious + a * lutCC.$$

Although the term 'smoothing coefficient' and the symbol (a) are used with respect to smoothing other values, the smoothing coefficient (a) used for obtaining the temporally smoothed contrast control lookup table (lutCCSmoothed) may be a defined, or tuned, such as manually, value for obtaining the temporally smoothed contrast control lookup table (lutCCSmoothed), which may be referred to as a contrast control lookup table smoothing coefficient, or as a defined contrast control tone curve smoothing coefficient. Although described herein with respect to the temporally smoothed contrast control lookup table (lutCCSmoothed), temporal smoothing may be omitted, and the contrast control lookup table (lutCC) may be used.

The contrast control component 1020 obtains, determines, selects, generates, calculates, produces, or identifies, a contrast control black point value (ccBlackPoint), which may be or include per-channel values. For example, the contrast control component 1020 may obtain a first contrast control black point value for a red color channel (ccBlackPointR), a second contrast control black point value for a green color channel (ccBlackPointG), and a third contrast control black point value for a blue color channel (ccBlackPointB).

Obtaining the contrast control black point value (ccBlackPoint) is similar to obtaining the global tone mapping black point (blackPoint) by the global tone mapping driver 760 shown in FIG. 7, except as is described herein or as is otherwise clear from context.

The contrast control component 1020 obtains, determines, selects, generates, calculates, produces, or identifies, a normalized contrast control black point value (ccBlackPointNormalized). To obtain the normalized contrast control black point value (ccBlackPointNormalized), the contrast control component 1020 may obtain, as the normalized contrast control black point value (ccBlackPointNormalized), a result of dividing the contrast control black point value (ccBlackPoint) by a product of multiplying the exposure duration value (exposureDuration) corresponding to the captured image used to obtain the representative image by the gain value (gain) corresponding to the captured image used to obtain the representative image, which may be expressed as ccBlackPointNormalized=ccBlackPoint/ (exposureDuration*gain). The contrast control component 1020 may use the normalized contrast control black point value (ccBlackPointNormalized) as the contrast control black point value (ccBlackPoint).

The contrast control component 1020 outputs, such as stores in a memory of the image capture apparatus, sends, transmits, or otherwise makes accessible, contrast control output data including the contrast control black point value (ccBlackPoint), the contrast control lookup table (lutCC), which may be the temporally smoothed contrast control lookup table (lutCCSmoothed), or both. For example, the contrast control component 1020 may output the contrast control output data including the contrast control black point value (ccBlackPoint), the contrast control lookup table (lutCC), which may be the temporally smoothed contrast control lookup table (lutCCSmoothed), or both to the tone control driver 1030.

In some implementations, the contrast control component 1020 obtains, determines, selects, generates, calculates, produces, or identifies, as the contrast control black point value (ccBlackPoint), a uniformity modulated contrast control black point value (ccBlackPointMod) in accordance with the first intensity value (fIntensity), which may be expressed as ccBlackPointMod=ccBlackPoint*fIntensity.

The tone control driver 1030 obtains the tone control tone curve, the tone control black point value, or both. The tone control driver 1030 is shown with a solid line border to indicate that the tone control driver 1030 obtains the tone control tone curve, the tone control black point value, or both, on a per-frame basis.

The tone control driver 1030 accesses, such as reads, such as from a memory of the image capture apparatus, receives, or otherwise obtains, tone control driver input data 1060. The tone control driver input data 1060 includes the adaptive acquisition control parameters used to capture the current image, such as the current exposition data. The tone control driver input data 1060 is shown with a solid line border to indicate that the tone control driver input data 1060 is obtained on a per-frame basis.

The tone control driver 1030 accesses, such as reads, such as from a memory of the image capture apparatus, receives, or otherwise obtains, the auto-exposure compensation output data including the auto-exposure compensation lookup table (lutAEC), the auto-exposure compensation gain (gain-AEC), or both, output by the auto-exposure compensation component 1010, such as in accordance with the adaptive acquisition control sample rate.

The tone control driver 1030 accesses, such as reads, such as from a memory of the image capture apparatus, receives, or otherwise obtains, the contrast control output data including the contrast control black point value (ccBlackPoint), the contrast control lookup table (lutCC), which may be the temporally smoothed contrast control lookup table (lutCCSmoothed), or both, output by the contrast control component 1020, such as in accordance with the adaptive acquisition control sample rate. In some implementations, the contrast control output data may include the contrast control black point value (ccBlackPoint), the contrast control lookup table (lutCC), or both.

The tone control driver 1030 obtains, determines, selects, generates, calculates, produces, or identifies, the tone control tone curve, or the corresponding tone control lookup table (lutTC), adaptive to, or as a function ($f(\ )$) of, such as by combining or merging, the auto-exposure compensation lookup table (lutAEC) and the contrast control lookup table (lutCC), which may be the temporally smoothed contrast control lookup table (lutCCSmoothed), and in accordance with the input luminance (x), where (x) is a value of an index of the tone control lookup table (lutTC), which may be expressed as the following:

$$lutTC(x) = f(lutCC, lutAEC)(x)$$

$$= lutAEC\ (x) * lutCC\ (lutAEC\ (x)).$$

For example, tone control tone curve, or the corresponding tone control lookup table (lutTC), adaptive to, or as a function ($f(\ )$) of, such as by combining or merging, the auto-exposure compensation lookup table (lutAEC) and the contrast control lookup table (lutCC), which may be the temporally smoothed contrast control lookup table (lutCCSmoothed), and in accordance with the input luminance (x), where (x) is a value of an index of the tone control lookup table (lutTC), may include obtaining an auto-exposure compensation value from the auto-exposure compensation tone curve, or auto-exposure compensation lookup table (lutAEC), for an input luminance value (x), obtaining a contrast control value from the contrast control tone curve, or the temporally smoothed contrast control lookup table (lutCCSmoothed), for the auto-exposure compensation value, and obtaining, as the tone control tone curve, or the corresponding tone control lookup table (lutTC), a result of multiplying the auto-exposure compensation value by the contrast control value.

The tone control driver 1030 may obtain a tone control black point, or tone control black point value, (tcBlackPoint). To obtain the tone control black point (tcBlackPoint), the tone control driver 1030 may obtain a temporally smoothed tone control black point value (tcBlackPointSmoothed) as the tone control black point, or tone control black point value, (tcBlackPoint).

Although not shown separately in FIG. 10, the tone control driver 1030 accesses, such as reads, such as from a memory of the image capture apparatus, receives, or otherwise obtains, a previous tone control black point value (tcBlackPointPrevious), such as a tone control black point value, or a normalized previous tone control black point value (tcBlackPointPreviousNormalized), previously output by the tone control driver 1030, such as for the previous processed frame.

The tone control driver 1030 may obtain a temporally smoothed tone control black point value (tcBlackPointSmoothed) by interpolating between, such as by obtaining a linear combination of, the contrast control black point value (ccBlackPoint), which may be the normalized contrast control black point value (ccBlackPointNormalized), and the previous tone control black point value (tcBlackPointPrevious), which may be the normalized previous tone control black point value (tcBlackPointPreviousNormalized), and in accordance with a smoothing coefficient (a), which may be a tuned, such as manually, defined smoothing coefficient, which may be expressed as the following:

$$tc\text{BlackPointSmoothed} = (1 - a) * tc\text{BlackPointPrevious} + a * cc\text{BlackPoint}.$$

Although the term 'smoothing coefficient' and the symbol (a) are used with respect to smoothing other values, the smoothing coefficient (a) used for obtaining the temporally smoothed tone control black point value (tcBlackPointSmoothed) may be a defined, or tuned, such as manually, value for obtaining the temporally smoothed tone control black point value (tcBlackPointSmoothed), which may be referred to as a tone control black point value smoothing coefficient. Although described herein with respect to the temporally smoothed tone control black point value (tcBlackPointSmoothed), temporal smoothing may be omitted.

The tone control driver 1030 may obtain, as the tone control black point (tcBlackPoint), a product of multiplying the temporally smoothed tone control black point value (tcBlackPointSmoothed) by a product of multiplying the exposure duration value from the adaptive acquisition control parameters used to capture the current image by the gain value from the adaptive acquisition control parameters used to capture the current image.

The tone control driver 1030 outputs, such as stores in a memory of the image capture apparatus, sends, transmits, or otherwise makes accessible, tone control driver output data 1070. The tone control driver output data 1070 includes the tone control lookup table (lutTC), the tone control black point value (tcBlackPoint), or both. The tone control driver output data 1070 is shown with a solid line border to indicate that the tone control driver output data 1070 is output on a per-frame basis.

Although not expressly shown in FIG. 10, a processed, or partially processed, image, or frame, may be obtained, generated, calculated, produced, or determined, by applying the tone control driver output data 1070, such as the tone control lookup table (lutTC), the tone control black point value, or both, to the current, input, or source, image, or frame, such as by another component of the image capture apparatus.

Figure 11:
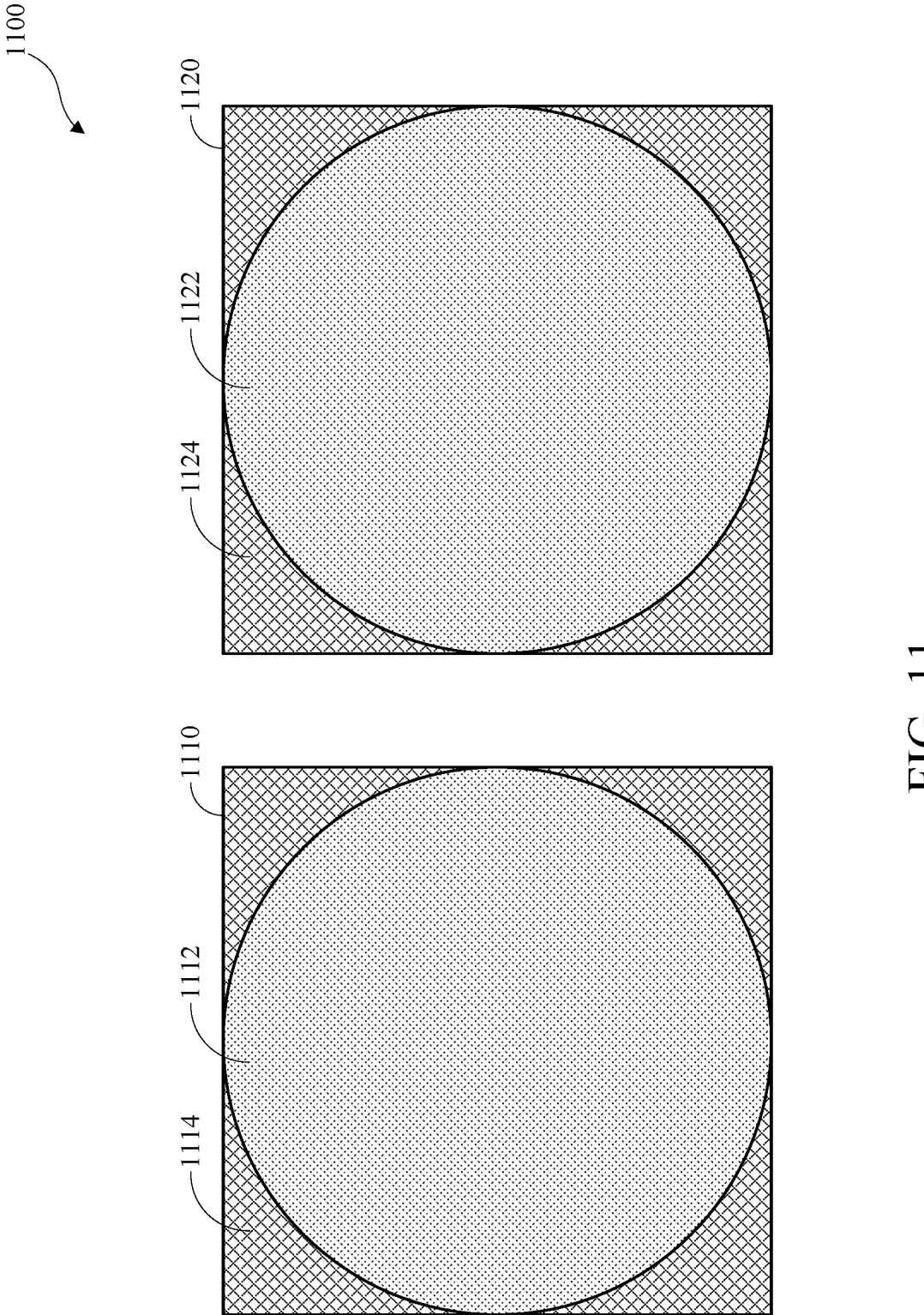
FIG. 11 is a diagram of an example of a representation of a spherical image.

FIG. 11 is a diagram of an example of a representation of a spherical image 1100. The representation of the spherical image 1100 is shown as a representation of a first, or front, image portion 1110, such as a first hemispheric, or hyper-hemispherical, image and a representation of a second, or back, image portion 1120, such as a second hemispheric, or hyper-hemispherical, image. Although shown as the first image portion 1110 and the second image portion 1120, the spherical image 1100 may be one image.

For example, a first image capture device of an image capture apparatus, such as the first image capture device 304 shown in FIG. 3, may capture, as the first image portion 1110, a first hemispheric, or hyper-hemispherical, image having, capturing, or corresponding to, a first field-of-view, such as the first field-of-view 340 shown in FIG. 3, which may be a 180 degree field-of-view, a second image capture device of the image capture apparatus, such as the second image capture device 306 shown in FIG. 3, may concurrently, or substantially concurrently, capture, as the second image portion 1120, a second hemispheric, or hyper-hemispherical, image having, capturing, or corresponding to, a second field-of-view, such as the second field-of-view 344 shown in FIG. 3, which may be a 180 degree field-of-view, and the image capture apparatus, such as the image capture apparatus 300 shown in FIG. 3, may incorporate, stitch, or combine the first image portion 1110 and the second image portion 1120 to generate, or otherwise obtain, the spherical image 1100, which may have a 360 degree field-of-view.

As shown, the first image portion 1110 is rectangular, such as square, and includes a round, circular, or elliptical, image content portion 1112, shown with a stippled background to indicate the portion of the first image portion 1110 that includes image content, corresponding to substantial measured light, and other portions 1114, shown with a cross-hatched background to indicate the portions of the captured image that omit image content and are substantially black, corresponding with little to no light measured or detected by the image sensor. The first image portion 1110 may partially overlap with the second image portion 1120. For example, the first field-of-view may partially overlap with the second first field-of-view. At least some of the first image portion 1110 is non-overlapping with the second image portion 1120. The image content portion 1112 of the first image portion 1110, as captured or as obtained from the image sensor, may include hemispheric distortion, the severity of which may be correlated with the distance from the center of the first image portion 1110.

As shown, the second image portion 1120 is rectangular, such as square, and includes a round, circular, or elliptical, image content portion 1122, shown with a stippled background to indicate the portion of the second image portion 1120 that includes image content, corresponding to substantial measured light, and other portions 1124, shown with a cross-hatched background to indicate the portions of the captured image that omit image content and are substantially black, corresponding with little to no light measured or detected by the image sensor. The second image portion 1120 may partially overlap with the first image portion 1110. For example, the second field-of-view may partially overlap with the first field-of-view. At least some of the second image portion 1120 is non-overlapping with the first image portion 1110. The image content portion 1122 of the second image portion 1120, as captured or as obtained from the image sensor, may include hemispheric distortion, the severity of which may be correlated with the distance from the center of the second image portion 1120.

Figure 12:
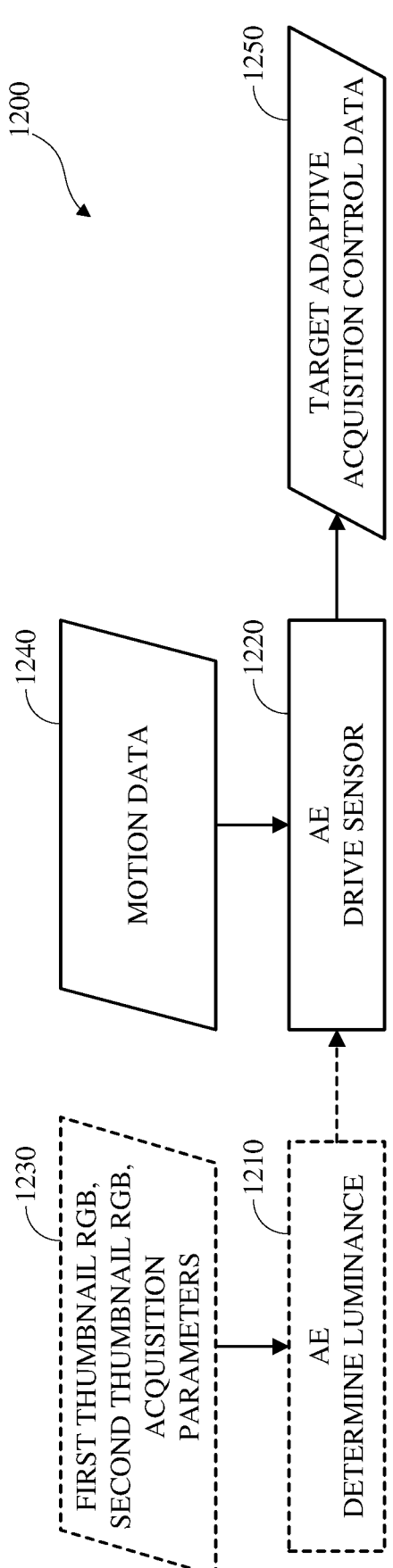
FIG. 12 is a block diagram of an example of an exposure control component of an adaptive acquisition control component for spherical images.
Figure 13:
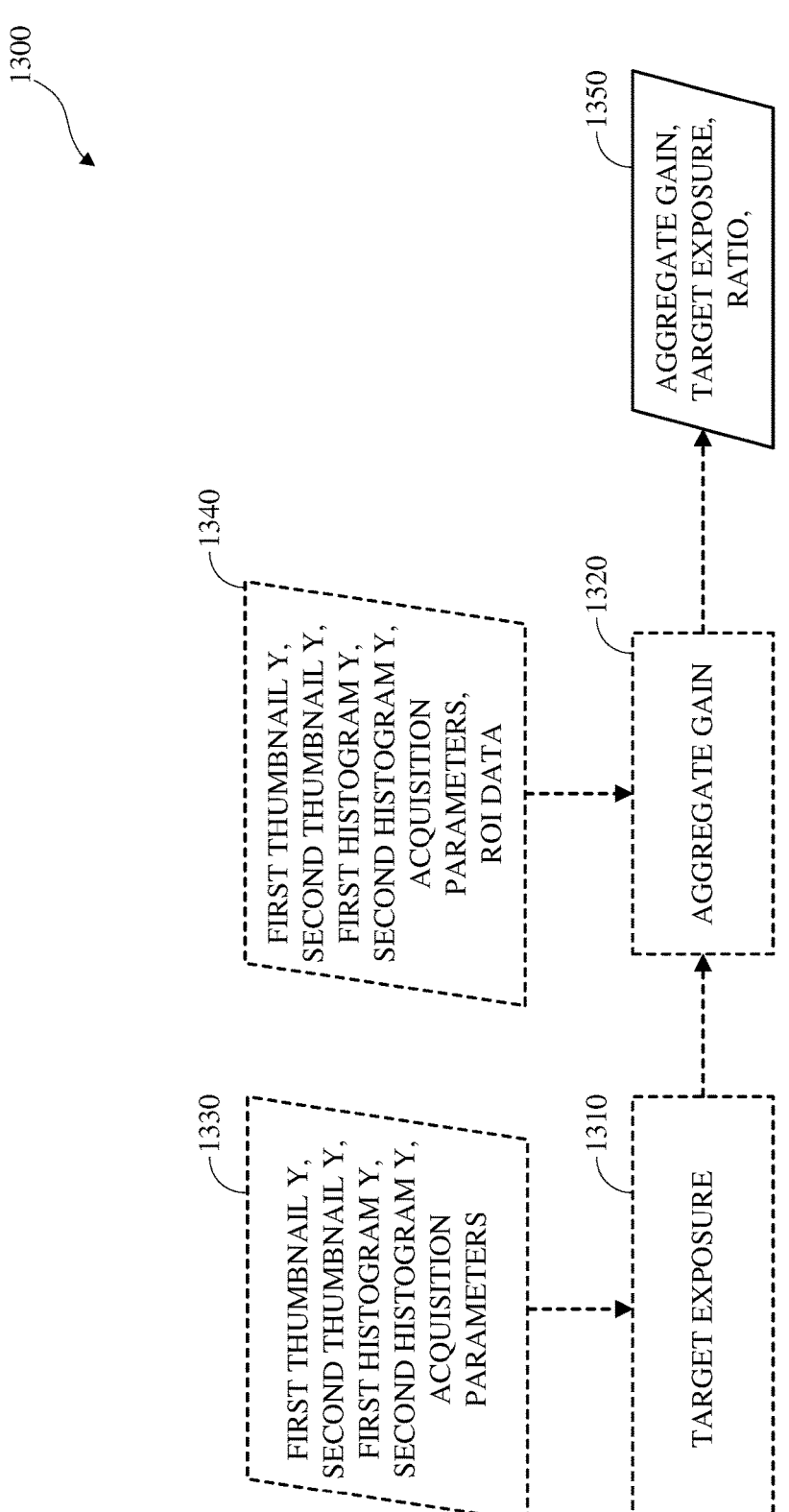
FIG. 13 is a block diagram of an example of a first portion of a tone control component of an adaptive acquisition control component for spherical images.
Figure 14:
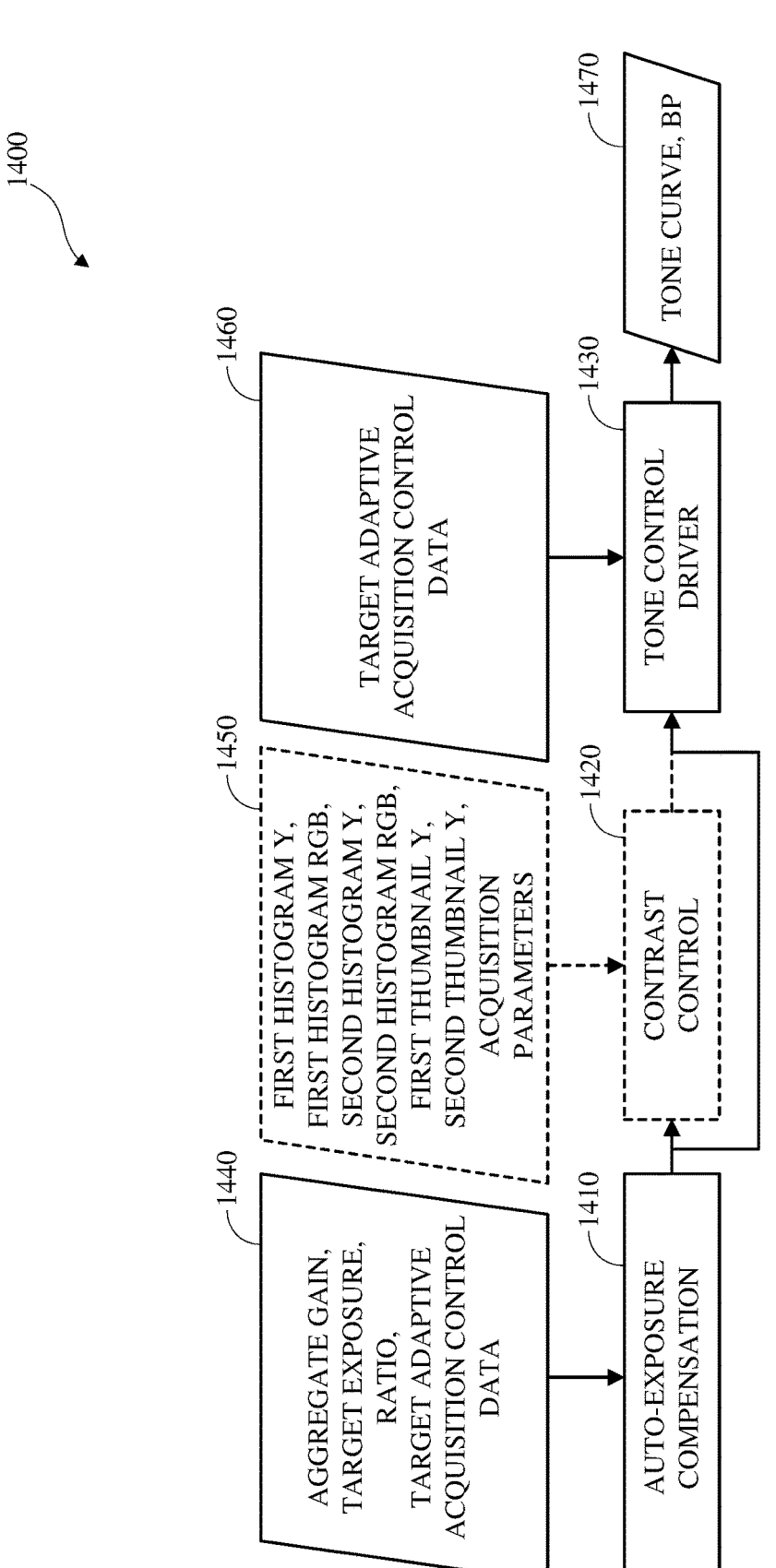
FIG. 14 is a block diagram of an example of a second portion of a tone control component of an adaptive acquisition control component for spherical images.

FIGS. 12-14 show an example of an adaptive acquisition control component for spherical images. The adaptive acquisition control component for spherical images shown in FIGS. 12-14, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, as a part, or parts, of the image processing pipeline 600 shown in FIG. 6, or in another image capture apparatus. In some implementations, the adaptive acquisition control component shown in FIGS. 12-14 may be implemented in a digital signal processor (DSP), an application-specific integrated circuit (ASIC), or a combination of a digital signal processor and an application-specific integrated circuit. One or more components of the adaptive acquisition control component shown in FIGS. 12-14 may be implemented in hardware, software, or a combination of hardware and software. The adaptive acquisition control component for spherical images shown in FIGS. 12-14 may be similar to the adaptive acquisition control component shown in FIGS. 8-10, except as is described herein or as is otherwise clear from context.

The adaptive acquisition control component for spherical images shown in FIGS. 12-14 determines and controls the exposure for spherical images, or frames, such as a current, or input, spherical image, or frame, captured by an image capture apparatus, such as a RAW spherical image as captured by sensors of the image capture apparatus, and processed by the image processing pipeline thereof that implements the adaptive acquisition control component to obtain, and output, a processed spherical image or frame.

The image capture apparatus includes a first, or front, image capture device, such as the first image capture device 304 shown in FIG. 3, which may capture, as a first image portion, such as the first image portion 1110 shown in FIG. 11, of an input spherical image, a first hemispheric, or hyper-hemispherical, image having, capturing, or corresponding to, a first field-of-view, such as the first field-of-view 340 shown in FIG. 3, which may be a 180 degree field-of-view. The image capture apparatus includes a second, or back, image capture device, such as the second image capture device 306 shown in FIG. 3, which may concurrently, or substantially concurrently, capture, as a second image portion, such as the second image portion 1120 shown in FIG. 11, of the input spherical image, a second hemispheric, or hyper-hemispherical, image having, capturing, or corresponding to, a second field-of-view, such as the second field-of-view 344 shown in FIG. 3, which may be a 180 degree field-of-view. The image capture apparatus may incorporate, stitch, or combine the first image portion and the second image portion to generate, or otherwise obtain, a processed spherical image, which may have a 360-degree field-of-view.

The adaptive acquisition control component for spherical images shown in FIGS. 12-14 includes an exposure control component, shown at 1200 in FIG. 12 and a tone control component, shown in FIGS. 13 and 14, which includes a first portion, shown at 1300 in FIG. 13, and a second portion, shown at 1400 in FIG. 14.

The adaptive acquisition control component for spherical images shown in FIGS. 12-14 may include components other than the components shown in FIGS. 12-14. For example, the image capture apparatus that implements the adaptive acquisition control component for spherical images shown in FIGS. 12-14 may include an image sensor, such as the image sensors 342, 346 shown in FIG. 3, the image sensor 512 shown in FIG. 5, or the image sensor 610 shown in FIG. 6, and an image signal processor, such as the image signal processor 620 shown in FIG. 6, and the adaptive acquisition control component for spherical images shown in FIGS. 12-14 may include the image sensor, or a portion thereof, the image signal processor, or a portion thereof, or one or more portions of the image sensor and the image signal processor.

Although not shown expressly in FIGS. 12-14, the image capture apparatus obtains an input spherical image having a spherical field of view, such as represented at 1100 in FIG. 11. Obtaining the input spherical image includes obtaining a first input image having a first hemispherical field of view, such as the first image portion 1110 shown in FIG. 11. Obtaining the input spherical image includes obtaining a second input image having a second hemispherical field of view, such as the second image portion 1120 shown in FIG. 11, such that a combination of the first hemispherical field of view and the second hemispherical field of view forms the spherical field of view, and such that a combination of the first input image and the second input image forms the input spherical image.

FIG. 12 is a block diagram of an example of an exposure control component 1200 of an adaptive acquisition control component for spherical images. The exposure control component 1200, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, as a part, or parts, of the image processing pipeline 600 shown in FIG. 6, or in another image capture apparatus. In some implementations, the exposure control component 1200 may be implemented in a digital signal processor (DSP), an application-specific integrated circuit (ASIC), or a combination of a digital signal processor and an application-specific integrated circuit. One or more aspects of the exposure control component 1200 may be implemented in hardware, software, or a combination of hardware and software.

The exposure control component 1200 includes an automatic exposure (auto-exposure) luminance determination component 1210 (AE DETERMINE LUMINANCE) and an auto-exposure sensor driver 1220 (AE DRIVE SENSOR). The exposure control component 1200 may include components other than the components shown in FIG. 12. The exposure control component 1200 may be similar to the exposure control component 800 shown in FIG. 8, except as is described herein or as is otherwise clear from context. The auto-exposure luminance determination component 1210 may be similar to the auto-exposure luminance determination component 810 shown in FIG. 8, except as is described herein or as is otherwise clear from context. The auto-exposure sensor driver 1220 may be similar to the auto-exposure sensor driver 820 shown in FIG. 8, except as is described herein or as is otherwise clear from context.

The exposure control component 1200, or a component thereof, obtains, determines, selects, generates, calculates, produces, or identifies, target adaptive acquisition control data, such as a target exposure duration value (targetExposureDuration), a target gain value (targetGain), both, or a combination thereof, such as on a per-frame basis. Obtaining the target adaptive acquisition control data by the exposure control component 1200 may be similar to obtaining target adaptive acquisition control data by the exposure control component 800 shown in FIG. 8, except as is described herein or as is otherwise clear from context. For example, the exposure control component 1200 may obtain target adaptive acquisition control data for the first, or front, image capture device, target adaptive acquisition control data for the second, or back, image capture device, or both. The target exposure duration value (targetExposureDuration), the target gain value (targetGain), both, or a combination thereof, may be used to control one or more of the image sensors of the image capture apparatus to capture a subsequent frame, or frames, to maximize the information in the captured images, or frames, as captured (e.g., RAW images).

The exposure control component 1200 may omit expressly controlling the brightness of processed images output by the image capture apparatus. The exposure control component 1200 may omit obtaining, processing, or modifying the current image, or frame.

The auto-exposure luminance determination component 1210 accesses, such as reads, such as from a memory of the image capture apparatus, receives, or otherwise obtains, adaptive acquisition control input data 1230. The adaptive acquisition control input data 1230 is similar to the adaptive acquisition control input data 830 shown in FIG. 8, except as is described herein or as is otherwise clear from context. For example, the adaptive acquisition control input data 1230 includes first, or front, representative image data (FIRST THUMBNAIL RGB or firstThumbnailRGB) corresponding to, or obtained from, a first portion of a spherical image, such as the first image portion 1110 shown in FIG. 11, second, or back, representative image data (SECOND THUMBNAIL RGB or secondThumbnailRGB) corresponding to, or obtained from, a second portion of the spherical image, such as the second image portion 1120 shown in FIG. 11, first, or front, adaptive acquisition control data used to capture the first portion of the spherical image, and second, or back, adaptive acquisition control data used to capture the second portion of the spherical image.

The auto-exposure luminance determination component 1210 obtains, determines, selects, generates, calculates, produces, or identifies, a scene luminance value, a corresponding target exposure value (targetY), or both. The auto-exposure luminance determination component 1210 is shown with a broken line boarder to indicate that the auto-exposure luminance determination component 1210 obtains, determines, selects, generates, calculates, produces, or identifies, the scene luminance value, the corresponding target exposure value, or both, periodically, such as in accordance with a determined, or defined, adaptive acquisition control sample period, or corresponding adaptive acquisition control sample rate, which is determined, or defined, in accordance with a current, active, or operative, frame rate for video capture, such as at a fraction of the frame rate, such as one third the frame rate. Obtaining the scene luminance value by the auto-exposure luminance determination component 1210 is similar to obtaining the scene luminance value by the auto-exposure luminance determination component 810 shown in FIG. 8, except as is described herein or as is otherwise clear from context. For example, the auto-exposure luminance determination component 1210 obtains the scene luminance value in accordance with the adaptive acquisition control input data 1230.

The auto-exposure sensor driver 1220 accesses, such as reads, such as from a memory of the image capture apparatus, receives, or otherwise obtains, the target exposure value (targetY). The auto-exposure sensor driver 1220 accesses, such as reads, such as from a memory of the image capture apparatus, receives, or otherwise obtains, motion data 1240, such as on a per-frame basis. In some implementations, the auto-exposure sensor driver 1220 omits obtaining and using the motion data 1240. Based on, using, or in accordance with, the target exposure value (targetY), gain-exposure duration curves, the motion data 1240, or a combination thereof, the auto-exposure sensor driver 1220 obtains, determines, selects, generates, calculates, produces, or identifies, target adaptive acquisition control data 1250, such as one or more of the parameters of the adaptive acquisition control data 660 shown in FIG. 6, for subsequent use, such as subsequent image, or frame, capture or subsequent processing of images captured in accordance therewith. The auto-exposure sensor driver 1220 includes the exposure duration value, the gain value, or both, in the target adaptive acquisition control data 1250. The auto-exposure sensor driver 1220 obtains, determines, selects, generates, calculates, produces, or identifies, the target exposure duration value (targetExposureDuration) and the target gain value (targetGain) for the target adaptive acquisition control data 1250 using the target exposure value (targetY) and the current gain-exposure duration curve.

The auto-exposure luminance determination component 1210 outputs, such as stores in a memory of the image capture apparatus, or otherwise makes available, a, such as one, scene luminance value (sceneLuminance), an, such as one, auto-exposure target exposure value (targetY), or both, for the spherical image. For example, the auto-exposure luminance determination component 1210 may send the scene luminance value (sceneLuminance), the auto-exposure target exposure value (targetY), or both, to the auto-exposure sensor driver 1220. In some implementations, the auto-exposure luminance determination component 1210 may output the adaptive acquisition control input data 1230, or a portion or portions thereof, such as to the auto-exposure sensor driver 1220.

The exposure control component 1200 outputs, such as stores in a memory of the image capture apparatus, sends, transmits, or otherwise makes accessible, target adaptive acquisition control data 1250 for the spherical image, including the target exposure duration value (targetExposureDuration), the target gain value (targetGain), both, or a combination thereof, such as on a per-frame basis. For example, the exposure control component 1200 may output the target adaptive acquisition control data 1250, or a portion thereof, to the image sensors, the tone control component shown in FIGS. 13 and 14, or both.

The tone control component, shown in FIGS. 13-14, of the adaptive acquisition control component for spherical images, shown in FIGS. 12-14, is similar to the tone control component, shown in FIGS. 9-10, of the adaptive acquisition control component, shown in FIGS. 8-10, except as is described herein or as is otherwise clear from context.

The tone control component, shown in FIGS. 13-14, of the adaptive acquisition control component, shown in FIGS. 12-14, obtains a tone control tone curve, which may be a dynamically, or adaptively, generated tone curve, for a spherical image, such as an input, or RAW spherical image, such as the current spherical image, or frame, which may be the frames most recently captured by the image sensors of the image capture apparatus, for use in processing the current spherical image, or frame, to obtain a processed, or partially processed, spherical image, or frame. The tone control component obtains a tone control black point value, which may be or include per-channel values, which may be applied to obtain the processed, or partially processed image.

FIG. 13 is a block diagram of an example of a first portion 1300 of a tone control component of an adaptive acquisition control component for spherical images. The first portion 1300 of the tone control component, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, as a part, or parts, of the image processing pipeline 600 shown in FIG. 6, or in another image capture apparatus. In some implementations, the first portion 1300 of the tone control component may be implemented in a digital signal processor (DSP), an application-specific integrated circuit (ASIC), or a combination of a digital signal processor and an application-specific integrated circuit. One or more aspects of the first portion 1300 of the tone control component may be implemented in hardware, software, or a combination of hardware and software.

As shown in FIG. 13, the first portion 1300 of the tone control component includes a target exposure component 1310 (TARGET EXPOSURE) and an aggregate gain component 1320 (AGGREGATE GAIN). The first portion 1300 of the tone control component may include components other than the components shown in FIG. 13. The first portion 1300 of the tone control component is similar to the first portion 900 of the tone control component shown in FIG. 9, except as is described herein or as is otherwise clear from context. The target exposure component 1310 is similar to the target exposure component 910 in FIG. 9, except as is described herein or as is otherwise clear from context. The aggregate gain component 1320 is similar to the aggregate gain component 920 in FIG. 9, except as is described herein or as is otherwise clear from context.

The target exposure component 1310 accesses, such as reads, such as from a memory of the image capture apparatus, receives, or otherwise obtains, target exposure input data 1330. The target exposure input data 1330 is shown with a broken line boarder to indicate that the target exposure input data 1330 is obtained periodically, such as in accordance with the adaptive acquisition control sample rate, such as on a per-third frame basis.

The target exposure input data 1330 is similar to the target exposure input data 930 shown in FIG. 9, except as is described herein or as is otherwise clear from context.

For example, the target exposure input data 1330 includes representative image data, including first, or front, representative image data (first luminance thumbnail, first representative image, or firstThumbnailY), such as a luminance thumbnail image corresponding to the first image portion 1110 shown in FIG. 11, and second, or back, representative image data (second luminance thumbnail or secondThumbnailY), such as a luminance thumbnail image corresponding to the second image portion 1120 shown in FIG. 11. Although not expressly shown in FIGS. 12-14, in some implementations, the first RGB thumbnail (firstThumbnailRGB) and the second RGB thumbnail (secondThumbnailRGB) may be obtained prior to local exposure correction and the first luminance thumbnail (firstThumbnailY) and the second luminance thumbnail (secondThumbnailY) may be obtained subsequent to local exposure correction. Local exposure correction includes correcting, or adjusting, the exposure of the first portion of the spherical image, such as the first image portion 1110 shown in FIG. 11, or the second portion of the spherical image, such as the second image portion 1120 shown in FIG. 11, such that the exposure of the first portion of the spherical image and the second portion of the spherical image are consistent. In some implementations, local exposure correction may include local exposure correction for the first portion of the spherical image and the representative adaptive acquisition control data (acquisition parameters) may correspond with the second portion of the spherical image. In some implementations, local exposure correction may include local exposure correction for the second portion of the spherical image and the representative adaptive acquisition control data (acquisition parameters) may correspond with the first portion of the spherical image.

In another example, the target exposure input data 1330 includes representative adaptive acquisition control data (acquisition parameters) for the portion of the spherical image other than the portion of the spherical image for which local exposure correction was performed.

The target exposure component 1310 obtains, determines, selects, generates, calculates, produces, or identifies, a target exposure, or target exposure value, (targetExposure). The target exposure component 1310 is shown with a broken line boarder to indicate that the target exposure component 1310 obtains, determines, selects, generates, calculates, produces, or identifies, the target exposure (targetExposure) periodically, such as in accordance with the adaptive acquisition control sample period, or the corresponding adaptive acquisition control sample rate, such as on a per third captured frames basis for video captured at thirty frames per second (30 fps). Obtaining the target exposure (targetExposure) by the target exposure component 1310 may be similar to obtaining a target exposure value by the auto-exposure luminance determination component 910 shown in FIG. 9, or a portion thereof, except as is described herein or as is otherwise clear from context.

The target exposure component 1310 shown in FIG. 13 obtains a first distortion correcting weight map for the first, or front, representative image data (firstThumbnailY) and a second distortion correcting weight map for the second, or back, representative image data (secondThumbnailY).

Obtaining the distortion correcting weight maps, or masks, may include determining whether to use a two-dimensional (2D), such as rectangular, distortion correcting weight maps, a radial, or circular, distortion correcting weight maps, or a combination of the rectangular distortion correcting weight maps and the radial distortion correcting weight maps. A distortion correcting weight map indicates a distribution of per-pixel weights, such as values in a range from zero (0) to one (1).

The radial distortion correcting weight map includes a value indicating center coordinates of a circle, corresponding to the optical center of the lens of the image capture device that captured the respective input image, and a value indicating a radius of the circle. The radial distortion correcting weight map includes at least one radial distortion correcting weight value for pixels within the circle having a corresponding radial distance from the center of the circle, which may be stored in a look up table. A respective radial distortion correcting weight value from the radial distortion correcting weight map, or look up table, indicates a respective distortion correcting weight value for one or more pixels at, or nearest, a respective radial distance from the center of the circle. For example, a first value of the lookup table indicates a radial distortion correcting weight value for the center pixel, or for pixels nearest the center in the absence of a center pixel. A sequentially maximum, or last, value of the lookup table indicates a radial distortion correcting weight value for pixels at, or nearest, the edge or border of the circle, corresponding to the radius of the circle. Radial distortion correcting weight values for pixels between the radial distances indicated in the radial distortion correcting weight map may be obtained by interpolation from the radial distortion correcting weight map in accordance with the radial distance of the respective pixel from the center of the circle. In some implementations, the radial distortion correcting weight map may include a distortion correcting weight value for pixels outside the circle, which may be a defined, unique, value, such as zero (0), or may be the sequentially maximum, or last, value of the lookup table. In some implementations, the distortion correcting weight values within the circle may be one (1). In some implementations, distortion correcting weight value within the circle may be in a range from one (1), at the center of the circle, to zero (0) at the edge of the circle.

The 2D, rectangular, distortion correcting weight map may be similar to the radial distortion correcting weight map, except that the 2D, rectangular, distortion correcting weight map has a rectangular shape and is defined in relation to the frame of the image sensor.

Obtaining the first distortion correcting weight map may include accessing, such as reading, such as from a memory of the image capture apparatus, receiving, or otherwise obtaining, a defined distortion correcting weight map, which may be a look up table, such as a table including 1024 distortion correcting weight values, and which may have a size smaller than the size of the representative images (firstThumbnailY, secondThumbnailY) indicated by the representative image data, and obtaining the first distortion correcting weight map by expanding the defined distortion correcting weight map to the size of the representative images (firstThumbnailY, secondThumbnailY) indicated by the representative image data.

Obtaining the second distortion correcting weight map is similar to obtaining the first distortion correcting weight map, except with respect to the second, or back, representative image data (secondThumbnailY). The optical center of the lens, or the location thereof relative to the image sensor, of the image capture device that captured the first input image, from which the first, or front, representative image data (firstThumbnailY) is obtained, may differ from the optical center of the lens of the image capture device that captured the second input image, from which the second, or back, representative image data (secondThumbnailY) is obtained, such that the first distortion correcting weight map differs from the second distortion correcting weight map.

The target exposure component 1310 obtains, determines, selects, generates, calculates, produces, or identifies, an aggregate weighted mean gray level, or value, (aggWeightedMeanGrayLevel) of the representative images (firstThumbnailY, secondThumbnailY) from the target exposure input data 1330 as an aggregate weighted mean value for the input spherical image, which is similar to obtaining the mean gray level (meanGrayLevel) by the target exposure component 910 shown in FIG. 9, except as is described herein or as is otherwise clear from context, which is distinct from, such as generated separately from, a mean grey value obtained by the auto-exposure luminance determination component 1210 shown in FIG. 12, which is similar to the mean grey value obtained by the auto-exposure luminance determination component 730 shown in FIG. 7, except as is described herein or as is otherwise clear from context.

To obtain the aggregate weighted mean gray level (aggWeightedMeanGrayLevel), the target exposure component 1310 obtains, determines, selects, generates, calculates, produces, or identifies, a first normalized weighted mean value. To obtain the first normalized weighted mean value, the target exposure component 1310 obtains, determines, selects, generates, calculates, produces, or identifies, first weighted pixel values, wherein a respective first weighted pixel value is a result of multiplying a corresponding respective pixel value from the first, or front, representative image data (firstThumbnailY or first luminance thumbnail image) by a spatially corresponding distortion correcting weight value from the first distortion correcting weight map. The first weighted pixel values collectively form a first weighted luminance thumbnail image.

To obtain the first normalized weighted mean value, the target exposure component 1310 obtains, determines, selects, generates, calculates, produces, or identifies, a sum of the first weighted pixel values. To obtain the first normalized weighted mean value, the target exposure component 1310 obtains, determines, selects, generates, calculates, produces, or identifies, a sum of the distortion correcting weight values from the first distortion correcting weight map. To obtain the first normalized weighted mean value, the target exposure component 1310 obtains, determines, selects, generates, calculates, produces, or identifies, the first normalized weighted mean value by normalizing the sum of the first weighted pixel values by the sum of the distortion correcting weight values from the first distortion correcting weight map.

To obtain the aggregate weighted mean gray level (aggWeightedMeanGrayLevel), the target exposure component 1310 obtains, determines, selects, generates, calculates, produces, or identifies, a second normalized weighted mean value. To obtain the second normalized weighted mean value, the target exposure component 1310 obtains, determines, selects, generates, calculates, produces, or identifies, second weighted pixel values, wherein a respective second weighted pixel value is a result of multiplying a corresponding respective pixel value from the second, or back, representative image data (secondThumbnailY or second luminance thumbnail image) by a spatially corresponding distortion correcting weight value from the second distortion correcting weight map. The second weighted pixel values collectively form a second weighted luminance thumbnail image.

To obtain the second normalized weighted mean value, the target exposure component 1310 obtains, determines, selects, generates, calculates, produces, or identifies, a sum of the second weighted pixel values. To obtain the first normalized weighted mean value, the target exposure component 1310 obtains, determines, selects, generates, calculates, produces, or identifies, a sum of the distortion correcting weight values from the second distortion correcting weight map. To obtain the second normalized weighted mean value, the target exposure component 1310 obtains, determines, selects, generates, calculates, produces, or identifies, the second normalized weighted mean value by normalizing the sum of the second weighted pixel values by the sum of the distortion correcting weight values from the second distortion correcting weight map.

To obtain the aggregate weighted mean gray level (aggWeightedMeanGrayLevel), the target exposure component 1310 obtains, determines, selects, generates, calculates, produces, or identifies, the aggregate weighted mean gray level (aggWeightedMeanGrayLevel) by combining, such as averaging, the first normalized weighted mean value and the second normalized weighted mean value. In some implementations, the target exposure component 1310 obtains, determines, selects, generates, calculates, produces, or identifies, the aggregate weighted mean gray level (aggWeightedMeanGrayLevel) by combining the first normalized weighted mean value and the second normalized weighted mean value as a weighted average, such as wherein the first normalized weighted mean value is prioritized, or highly weighted, relative to the second normalized weighted mean value.

The target exposure component 1310 obtains, determines, selects, generates, calculates, produces, or identifies, a scene luminance value (sceneLuminance) in accordance with the target exposure input data 1330. The scene luminance (sceneLuminance) is proportional to a result of dividing the aggregate weighted mean gray level (aggWeightedMeanGrayLevel) by the scene exposition value (gain*exposureDuration), which may be expressed as the following:

$$sceneLuminance \propto aggWeightedMeanGrayLevel/(gain*exposureDuration).$$

The target exposure component 1310 outputs, such as stores in a memory of the image capture apparatus, sends, transmits, or otherwise makes accessible, target exposure output data including the, such as one, target exposure (targetExposure), which may be the temporally smoothed target exposure value (targetExposureSmoothed). For example, the target exposure component 1310 may output the target exposure data to the aggregate gain component 1320.

The aggregate gain component 1320 accesses, such as reads, such as from a memory of the image capture apparatus, receives, or otherwise obtains, aggregate gain input data 1340. The aggregate gain input data 1340 is shown with a broken line boarder to indicate that the aggregate gain input data 1340 is obtained periodically, such as in accordance with the adaptive acquisition control sample rate, such as on a per-third frame basis.

The aggregate gain input data 1340 is similar to the aggregate gain input data 940 shown in FIG. 9, except as is described herein or as is otherwise clear from context. For example, the aggregate gain input data 1340 includes representative adaptive acquisition control data (acquisition parameters), representative image data, including first, or front, representative image data (firstThumbnailY), such as a luminance thumbnail image corresponding to the first image portion 1110 shown in FIG. 11, and second, or back, representative image data (secondThumbnailY), such as a luminance thumbnail image corresponding to the second image portion 1120 shown in FIG. 11, and representative histogram data, such as luma, or luminance, channel, or component, histograms, including a first, or front, representative histogram (FIRST HISTOGRAM Y or firstHistogramY), such as for the luminance thumbnail image corresponding to the first image portion 1110 shown in FIG. 11, and a second, or back, representative histogram (SECOND HISTOGRAM Y or secondHistogramY), such as for the luminance thumbnail image corresponding to the second image portion 1120 shown in FIG. 11

The aggregate gain component 1320 obtains, determines, selects, generates, calculates, produces, or identifies, an aggregate weighted mean gray level, or value, (aggWeightedMeanGrayLevel) of the representative images (firstThumbnailY, secondThumbnailY) from the target exposure input data 1330, which is similar to obtaining the aggregate weighted mean gray level (aggWeightedMeanGrayLevel) by the target exposure component 1310, except as is described herein or as is otherwise clear from context.

The aggregate gain component 1320 obtains, determines, selects, generates, calculates, produces, or identifies, a target aggregate gain, or target aggregate gain value, (targetAggregateGain) to apply to the current spherical image, or frame, to obtain the processed spherical image, or frame, having the target exposure (targetExposure), which may be the temporally smoothed target exposure value (targetExposureSmoothed). The aggregate gain component 1320 is shown with a broken line boarder to indicate that the aggregate gain component 1320 obtains, determines, selects, generates, calculates, produces, or identifies, the target aggregate gain (targetAggregateGain) periodically, such as in accordance with the adaptive acquisition control sample period, or the corresponding adaptive acquisition control sample rate, such as on a per third captured frames basis for video captured at thirty frames per second (30 fps).

The aggregate gain component 1320 obtains, such as reads or receives, the target exposure output data including the target exposure (targetExposure), which may be the temporally smoothed target exposure value (targetExposureSmoothed), or a portion thereof, output by the target exposure component 1310, such as in accordance with the adaptive acquisition control sample rate.

The aggregate gain component 1320 obtains, determines, selects, generates, calculates, produces, or identifies, the exposure of the representative frames (representativeExposure or representative exposure value), such as using the representative histogram data, such as the luma, or luminance, channel, or component, histograms (firstHistogramY, secondHistogramY), from the aggregate gain input data 1340. The exposure of the representative frames (representativeExposure) represents the exposure of the current spherical image and may differ from the exposure of the current spherical image. The exposure of the representative frames (representativeExposure) may be defined or described as the aggregate weighted mean gray level (representativeExposure=aggWeightedMeanGrayLevel).

In some implementations, the aggregate gain input data 1340 includes region of interest data, such as manually defined region of interest data, automatically determined region of interest data (ROI DATA), such as face detection region of interest data, stabilization region of interest data, or a combination thereof, which may include first region of interest data for the first, or front, representative image data (firstThumbnailY), second region of interest data for the second, or back, representative image data (second representative image or secondThumbnailY), or both. In some implementations, respective weighting data may be associated with the region of interest data, such that pixels in a region of interest are weighted more than other pixels and obtaining the exposure of the representative frames (representativeExposure) may include obtaining the exposure of the representative frames (representativeExposure) in accordance with the region of interest weighting data and the corresponding region of interest data.

To obtain the processed, or partially processed, spherical image, or frame, corresponding to the current spherical image, the aggregate gain component 1320 determines a remaining gain, or remaining digital gain, (gainRemaining) to be applied to the current spherical image, such that the aggregate gain of the processed, or partially processed, spherical image, or frame, is a sum of the sensor gain (sensorGain) and the remaining gain.

The target aggregate gain (targetAggregateGain) is a combination of the exposure duration (exposureDuration), previously output by the exposure control component 1200 shown in FIG. 12, used to capture the captured image used to obtain the representative image data, the sensor gain (sensorGain), previously output by the exposure control component 1200 shown in FIG. 12, of the representative frames as captured, and a remaining gain (gainRemaining) determined by the aggregate gain component 1320, which may be expressed as the following:

$$targetAggregateGain=exposureDuration*sensorGain*gainRemaining.$$

The aggregate gain component 1320 obtains, determines, selects, generates, calculates, produces, or identifies, the remaining gain (gainRemaining) for obtaining the processed, or partially processed, spherical image having the target exposure (targetExposure), which may be the temporally smoothed target exposure value (targetExposureSmoothed).

The aggregate gain component 1320 obtains the remaining gain (gainRemaining) adaptive to, or as a function ($f( )$) of, the target exposure (targetExposure), which may be the temporally smoothed target exposure value (targetExposureSmoothed), obtained from the target exposure component 1310 and the exposure of the representative frame (representativeExposure), which may be expressed as the following:

$$gainRemaining=f(representativeExposure,targetExposure).$$

The aggregate gain component 1320 obtains, determines, selects, generates, calculates, produces, or identifies, a temporally smoothed target aggregate gain, or temporally smoothed target aggregate gain value, (targetAggregateGainSmoothed) to compensate for, such as reduce or eliminate, differences, including differences corresponding to scene modification and differences corresponding to the respective adaptive acquisition control parameters used for capturing the respective images, by applying temporal smoothing. The aggregate gain component 1320 may use the temporally smoothed target aggregate gain value (targetAggregateGainSmoothed) as the target aggregate gain value (targetAggregateGain).

In some implementations, obtaining the exposure of the representative frame (representativeExposure) includes obtaining the exposure of the representative frames (representativeExposure or representative exposure value) using the representative images (firstThumbnailY, secondThumbnailY) and the corresponding distortion correcting weight maps, independent of the region of interest data, obtaining a region of interest luminance thumbnail (ROIThumbnailY) in accordance with the representative images (firstThumbnailY, secondThumbnailY), such as in accordance with the first representative image (firstThumbnailY), in accordance with the second representative image (secondThumbnailY), or in accordance with the first representative image (firstThumbnailY) and the second representative image (secondThumbnailY), and the corresponding region of interest data, and obtaining a region of interest ratio value (ratioExpoStatsRoi), which may be expressed as ratioExpoStatsRoi=aggWeightedMeanGrayLevel/mean (ROIThumbnailY). A target aggregate gain region of interest value (targetAggregateGainRoi) may be obtained as a product of the target aggregate gain (targetAggregateGain) and the region of interest ratio value (ratioExpoStatsRoi), which may be expressed as targetAggregateGainRoi=targetAggregateGain*ratioExpoStatsRoi.

The aggregate gain component 1320 outputs, such as stores in a memory of the image capture apparatus, sends, transmits, or otherwise makes accessible, aggregate gain output data 1350 including the target aggregate gain value (targetAggregateGain), which may be the temporally smoothed target aggregate gain (targetAggregateGainSmoothed), the target exposure (targetExposure), which may be the temporally smoothed target exposure value (targetExposureSmoothed), the region of interest ratio value (ratioExpoStatsRoi), or a combination thereof. For example, the aggregate gain component 1320 may output the aggregate gain output data including one target aggregate gain (targetAggregateGain), one target exposure (targetExposure), and one region of interest ratio value (ratioExpoStatsRoi) to the auto-exposure compensation component 1410 shown in FIG. 14. The aggregate gain component 1320 may omit obtaining, processing, or modifying the current image, or frame.

FIG. 14 is a block diagram of an example of a second portion 1400 of a tone control component of an adaptive acquisition control component for spherical images. The second portion 1400 of the tone control component, or a portion thereof, is implemented in an image capture apparatus, such as the image capture apparatus 140 shown in FIGS. 1A-1B, the image capture apparatus 200 shown in FIGS. 2A-2B, the image capture apparatus 300 shown in FIG. 3, the image capture apparatus 400 shown in FIGS. 4A-4B, as a part, or parts, of the image processing pipeline 600 shown in FIG. 6, or in another image capture apparatus. In some implementations, the second portion 1400 of the tone control component may be implemented in a digital signal processor (DSP), an application-specific integrated circuit (ASIC), or a combination of a digital signal processor and an application-specific integrated circuit. One or more aspects of the second portion 1400 of the tone control component may be implemented in hardware, software, or a combination of hardware and software.

As shown in FIG. 14, the second portion 1400 of the tone control component includes an auto-exposure compensation component 1410, a contrast control component 1420, and a tone control driver component 1430. The second portion 1400 of the tone control component may include components other than the components shown in FIG. 14. The second portion 1400 of the tone control component is similar to the second portion 1000 of the tone control component shown in FIG. 10, except as is described herein or as is otherwise clear from context. The auto-exposure compensation component 1410, is similar to the auto-exposure compensation component 1010 shown in FIG. 10, except as is described herein or as is otherwise clear from context. The contrast control component 1420, is similar to the contrast control component 1020 shown in FIG. 10, except as is described herein or as is otherwise clear from context. The tone control driver component 1430, is similar to the tone control driver component 1030 shown in FIG. 10, except as is described herein or as is otherwise clear from context.

The auto-exposure compensation component 1410 obtains, determines, selects, generates, calculates, produces, or identifies, an auto-exposure compensation tone curve, which may be expressed as an auto-exposure compensation lookup table (lutAEC), that defines or describes a per-pixel value gain to apply the current spherical image to obtain the processed, or partially processed, spherical image having the target aggregate gain value (targetAggregateGain), which may be the temporally smoothed target aggregate gain (targetAggregateGainSmoothed), corresponding to applying the remaining gain (gainRemaining). The auto-exposure compensation component 1410 is shown with a solid line border to indicate that the auto-exposure compensation component 1410 obtains the auto-exposure compensation lookup table (lutAEC) on a per-frame basis.

The auto-exposure compensation component 1410 accesses, such as reads, such as from a memory of the image capture apparatus, receives, or otherwise obtains, auto-exposure compensation input data 1440. The auto-exposure compensation input data 1440 is shown with a solid line border to indicate that the auto-exposure compensation input data 1440 is obtained on a per-frame basis. The auto-exposure compensation input data 1440 is similar to the auto-exposure compensation input data 1040 shown in FIG. 10, except as is described herein or as is otherwise clear from context.

The auto-exposure compensation component 1410 obtains, such as reads or receives, the aggregate gain output data including the target aggregate gain value (targetAggregateGain), which may be the temporally smoothed target aggregate gain (targetAggregateGainSmoothed), output by the aggregate gain component 1320 shown in FIG. 13, such as in accordance with the adaptive acquisition control sample rate.

The auto-exposure compensation component 1410 obtains, such as reads or receives, the target exposure output data, or a portion thereof, target exposure output data including the target exposure (targetExposure), which may be the temporally smoothed target exposure value (target-ExposureSmoothed), output by the target exposure component 1310 shown in FIG. 13, such as in accordance with the adaptive acquisition control sample rate.

To obtain the auto-exposure compensation lookup table (lutAEC), corresponding to the auto-exposure compensation tone curve, the auto-exposure compensation component 1410 obtains, determines, selects, generates, calculates, produces, or identifies, a compliant aggregate gain, or compliant aggregate gain value, (compliantAggregateGain) based on the target aggregate gain value (targetAggregateGain), which may be the temporally smoothed target aggregate gain (targetAggregateGainSmoothed), obtained from the aggregate gain component 1320 shown in FIG. 13, the exposure bias (EB), one or more sensor exposure constraints, or a combination thereof.

The auto-exposure compensation component 1410 obtains, determines, selects, generates, calculates, produces, or identifies, an auto-exposure compensation gain value (gainAEC) by dividing the compliant aggregate gain (compliantAggregateGain) by a product of multiplying the exposure duration (exposureDuration), previously output by the exposure control component 1200 shown in FIG. 12, used to capture the current spherical image, and the sensor gain (sensorGain), previously output by the exposure control component 1200 shown in FIG. 12, used to capture the current spherical image, which may be expressed as the following:

$$gainAEC = compliantAggregateGain / (sensorGain * exposureDuration).$$

The auto-exposure compensation component 1410 obtains, determines, selects, generates, calculates, produces, or identifies, the auto-exposure compensation lookup table (lutAEC) as a non-linear curve for applying the auto-exposure compensation gain (gainAEC), which avoids saturating bright portions of the processed image, such as using Bézier curves.

The auto-exposure compensation component 1410 outputs, such as stores in a memory of the image capture apparatus, sends, transmits, or otherwise makes accessible, auto-exposure compensation output data including the, such as one, auto-exposure compensation lookup table (lutAEC), the, such as one, auto-exposure compensation gain (gainAEC), or both. For example, the auto-exposure compensation component 1410 may output the auto-exposure compensation output data including the auto-exposure compensation lookup table (lutAEC), the auto-exposure compensation gain (gainAEC), or both, to the contrast control component 1420, the tone control driver 1430, or both.

The contrast control component 1420 determines a per gray level gain to apply to the current spherical image, or frame, to obtain the processed, or partially processed, spherical image. The contrast control component 1420 is shown with a broken line boarder to indicate that the contrast control component 1420 obtains, determines, selects, generates, calculates, produces, or identifies, the per gray level gain to apply to the current spherical image, or frame, periodically, such as in accordance with the adaptive acquisition control sample period, or the corresponding adaptive acquisition control sample rate, such as on a per third captured frames basis for video captured at thirty frames per second (30 fps).

The contrast control component 1420 accesses, such as reads, such as from a memory of the image capture apparatus, receives, or otherwise obtains, contrast control input data 1450. The contrast control input data 1450 is shown with a broken line boarder to indicate that the contrast control input data 1450 is obtained periodically, such as in accordance with the adaptive acquisition control sample rate, such as on a per-third frame basis.

The contrast control input data 1450 is similar to the contrast control input data 1050 shown in FIG. 10, except as is described herein or as is otherwise clear from context. For example, the contrast control input data 1450 includes representative image data, including first, or front, representative image data (firstThumbnailY), such as a luminance thumbnail image corresponding to the first image portion 1110 shown in FIG. 11, and second, or back, representative image data (secondThumbnailY), such as a luminance thumbnail image corresponding to the second image portion 1120 shown in FIG. 11. In another example, the contrast control input data 1450 includes representative histogram data, which includes a first luminance histogram (FIRST HISTOGRAM Y or firstHistogramY), corresponding to a first image portion of a spherical image, such as the first image portion 1110 shown in FIG. 11, a first RGB histogram (FIRST HISTOGRAM RGB), corresponding to the first image portion of the spherical image, such as the first image portion 1110 shown in FIG. 11, a second luminance histogram (SECOND HISTOGRAM Y or secondHistogramY), corresponding to a second image portion of the spherical image, such as the second image portion 1120 shown in FIG. 11, and a second RGB histogram (SECOND HISTOGRAM RGB), corresponding to the second image portion of the spherical image, such as the second image portion 1110 shown in FIG. 11. The first RGB histogram may be multiple first RGB histograms, such as on a per-channel basis from the per-channel histograms. The second RGB histogram may be multiple second RGB histograms, such as on a per-channel basis from the per-channel histograms.

In some implementations, the contrast control component 1420, or another component of the image capture apparatus, may obtain, determine, generate, calculate, or produce, a first weighted luminance histogram in accordance with the first luminance histogram (FIRST HISTOGRAM Y or firstHistogramY) and the corresponding distortion correcting weight map, a second weighted luminance histogram in accordance with the second luminance histogram (SECOND HISTOGRAM Y or secondHistogramY) and the corresponding distortion correcting weight map, a first weighted RGB histogram, or first weighted RGB histograms, in accordance with the first RGB histogram (FIRST HISTOGRAM RGB) and the corresponding distortion correcting weight map, a second weighted RGB histogram, or second weighted RGB histograms, in accordance with the second RGB histogram (SECOND HISTOGRAM RGB) and the corresponding distortion correcting weight map, or a combination thereof. In a weighted histogram a bin corresponding to a respective pixel value is incremented, in accordance with a respective pixel of the respective image having the respective pixel value, by the weight value corresponding to the respective pixel as indicated in the corresponding distortion correcting weight map.

The contrast control component 1420 obtains, determines, selects, generates, calculates, produces, or identifies, a contrast control tone curve (CCTC), or a corresponding contrast control lookup table (lutCC), a temporally smoothed contrast control lookup table (lutCCSmoothed), or both, which is similar to obtaining the contrast control lookup table (lutCC), the temporally smoothed contrast control lookup table (lutCCSmoothed), or both, by the contrast control component 1020 shown in FIG. 10, except as is described herein or as is otherwise clear from context.

The contrast control component 1420 obtains, determines, selects, generates, calculates, produces, or identifies, a contrast control black point value (ccBlackPoint), which is similar to obtaining the contrast control black point value (ccBlackPoint) by the contrast control component 1020 as shown in FIG. 10, except as is described herein or as is otherwise clear from context. For example, the contrast control component 1420 obtains the contrast control black point value (ccBlackPoint), which is similar to obtaining the global tone mapping black point, or global tone mapping black point value, (blackPoint), by the global tone mapping determination component 750 shown in FIG. 7, except as is described herein or as is otherwise clear from context. For example, the contrast control component 1420 obtains the contrast control black point value (ccBlackPoint) in accordance with the first weighted RGB histogram, or first weighted RGB histograms, and the second weighted RGB histogram, or second weighted RGB histograms.

The contrast control component 1420 obtains, determines, selects, generates, calculates, produces, or identifies, a first gradient of the first representative image data (firstThumbnailY) in accordance with the first distortion correcting weight map. For example, the gradient (gd(x)) may correspond to a filter, such as a 3×3 filter (V(x)), which may be expressed as the following:

$$gd(x) = \min y \in V(x)(y) \max y \in V(x)(y).$$

The contrast control component 1420 obtains, determines, selects, generates, calculates, produces, or identifies, a first histogram of the first gradient (first gradient histogram).

The contrast control component 1420 obtains, determines, selects, generates, calculates, produces, or identifies, a second gradient of the second representative image data (secondThumbnailY) in accordance with the second distortion correcting weight map.

The contrast control component 1420 obtains, determines, selects, generates, calculates, produces, or identifies, a second histogram of the second gradient (second gradient histogram).

The contrast control component 1420 obtains, determines, selects, generates, calculates, produces, or identifies, an aggregate gradient histogram by combining, such as adding, the first gradient histogram and the second gradient histogram.

The contrast control component 1420 obtains, determines, selects, generates, calculates, produces, or identifies, a uniformity score (uniformityScore) in accordance with the aggregate gradient histogram. For example, the uniformity score (uniformityScore) may be determined based on a standard deviation of pixel values, such as luminance values, obtained from the aggregate gradient histogram.

In some implementations, the contrast control component 1420 obtains, determines, selects, generates, calculates, produces, or identifies, a first intensity value (fIntensity) in a defined range, such as from zero (0) to one (1), in accordance with the uniformity score (uniformityScore), and in accordance with a defined tuning intensity value (tuningIntensity), which is a value in a defined range, such as from zero (0) to one (1), which may be expressed as fIntensity= (1−uniformityScore)*tuningIntensity.

In some implementations, the contrast control component 1420 obtains, determines, selects, generates, calculates, produces, or identifies, as the contrast control lookup table (lutCC), a uniformity modulated contrast control lookup table (lutCCMod) in accordance with the first intensity value (fIntensity), and in accordance with a look-up table representing, or including, the identify function (lutIdentity), which may be expressed as lutCCMod=(lutCC−lutIdentity) *uniformityScore+lutIdentity.

In some implementations, the contrast control component 1420 obtains, determines, selects, generates, calculates, produces, or identifies, as the contrast control black point value (ccBlackPoint), a uniformity modulated contrast control black point value (ccBlackPointMod) in accordance with the first intensity value (fIntensity), which may be expressed as ccBlackPointMod=ccBlackPoint*fIntensity.

The contrast control component 1420 outputs, such as stores in a memory of the image capture apparatus, sends, transmits, or otherwise makes accessible, contrast control output data including the, such as one, contrast control black point value (ccBlackPoint), the, such as one, contrast control lookup table (lutCC), which may be the temporally smoothed contrast control lookup table (lutCCSmoothed), or both. For example, the contrast control component 1420 may output the contrast control output data including the contrast control black point value (ccBlackPoint), the contrast control lookup table (lutCC), which may be the temporally smoothed contrast control lookup table (lutCCSmoothed), or both to the tone control driver 1430.

The tone control driver 1430 obtains the tone control tone curve, the tone control black point value, or both. The tone control driver 1430 is shown with a solid line border to indicate that the tone control driver 1430 obtains the tone control tone curve, the tone control black point value, or both, on a per-frame basis.

The tone control driver 1430 accesses, such as reads, such as from a memory of the image capture apparatus, receives, or otherwise obtains, tone control driver input data 1460. The tone control driver input data 1460 includes the adaptive acquisition control parameters used to capture the current image, such as the current exposition data. The tone control driver input data 1460 is shown with a solid line border to indicate that the tone control driver input data 1460 is obtained on a per-frame basis. The tone control driver input data 1460 is similar to the tone control driver input data 1060 shown in FIG. 10, except as is described herein or as is otherwise clear from context.

The tone control driver 1430 obtains, determines, selects, generates, calculates, produces, or identifies, the tone control tone curve, or the corresponding tone control lookup table (lutTC), adaptive to, or as a function of ($f($ )) of, such as by combining or merging, the auto-exposure compensation lookup table (lutAEC) and the contrast control lookup table (lutCC), which may be the temporally smoothed contrast control lookup table (lutCCSmoothed), and in accordance with the input luminance (x), where (x) is a value of an index of the tone control lookup table (lutTC), which may be expressed as the following:

$$lutTC(x) = f(lutCC, lutAEC)(x)$$
$$= lutAEC(x) * lutCC(lutAEC(x)).$$

The tone control driver 1430 may obtain a tone control black point, or tone control black point value, (tcBlackPoint). To obtain the tone control black point (tcBlackPoint), the tone control driver 1430 may obtain a temporally smoothed tone control black point value (tcBlackPointSmoothed) as the tone control black point, or tone control black point value, (tcBlackPoint).

The tone control driver 1430 outputs, such as stores in a memory of the image capture apparatus, sends, transmits, or otherwise makes accessible, tone control driver output data 1470. The tone control driver output data 1470 includes the, such as one, tone control lookup table (lutTC), the, such as one, tone control black point value (tcBlackPoint), or both. The tone control driver output data 1470 is shown with a solid line border to indicate that the tone control driver output data 1470 is output on a per-frame basis.

Although not expressly shown in FIG. 14, a processed, or partially processed, spherical image, or frame, may be obtained, generated, calculated, produced, or determined, by applying the tone control driver output data 1470, such as the tone control lookup table (lutTC), the tone control black point value, or both, to the current, input, or source, spherical image, or frame, such as by another component of the image capture apparatus.

The methods and techniques of tone mapping for spherical images described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or the image capture apparatus 500 shown in FIG. 5. The methods and techniques of tone mapping for spherical images described herein, or aspects thereof, may be implemented by an image capture device, such as the image capture device 104 shown in FIGS. 1A-1B, one or more of the image capture devices 204, 206 shown in FIGS. 2A-2B, one or more of the image capture devices 304, 306 shown in FIG. 3, the image capture device 404 shown in FIGS. 4A-4B, or an image capture device of the image capture apparatus 500 shown in FIG. 5. The methods and techniques of tone mapping for spherical images described herein, or aspects thereof, may be implemented by an image processing pipeline, or one or more components thereof, such as the image processing pipeline 600 shown in FIG. 6.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

obtaining an input spherical image having a spherical field of view, wherein obtaining the input spherical image includes:

obtaining a first input image having a first hemispherical field of view; and obtaining a second input image having a second hemispherical field of view, such that a combination of the first hemispherical field of view and the second hemispherical field of view forms the spherical field of view;

obtaining a processed spherical image from the input spherical image, wherein obtaining the processed spherical image includes:

obtaining a first luminance thumbnail image for the first input image;

obtaining a second luminance thumbnail image for the second input image;

obtaining a first distortion correcting weight map for the first input image;

obtaining a second distortion correcting weight map for the second input image;

obtaining, as an aggregate weighted mean value for the input spherical image, an aggregate of a first normalized weighted mean value for the first luminance thumbnail image and a second normalized weighted mean value for the second luminance thumbnail image; and obtaining at least one of a target exposure value, a target aggregate gain value, or a region of interest ratio value in accordance with the aggregate weighted mean value;

obtaining the processed spherical image from the input spherical image in accordance with at least one of the target exposure value, the target aggregate gain value, or the region of interest ratio value; and outputting the processed spherical image.

2. The method of claim 1, wherein obtaining the aggregate weighted mean value includes:

obtaining, as the first normalized weighted mean value, a sum of first weighted pixel values, wherein a first weighted pixel value from the first weighted pixel values is a result of multiplying a pixel value from the first luminance thumbnail image by a respective spatially corresponding distortion correcting weight value from the first distortion correcting weight map, normalized by a sum of the distortion correcting weight values from the first distortion correcting weight map;

obtaining, as the second normalized weighted mean value, a sum of second weighted pixel values, wherein a second weighted pixel value from the second weighted pixel values is a result of multiplying a pixel value from the second luminance thumbnail image by a respective spatially corresponding distortion correcting weight value from the second distortion correcting weight map, normalized by a sum of the distortion correcting weight values from the second distortion correcting weight map; and obtaining, as the aggregate weighted mean value, an average of the first normalized weighted mean value and the second normalized weighted mean value.

3. The method of claim 1, wherein obtaining the target exposure value includes:

obtaining a scene luminance value for the input spherical image in accordance with a result of dividing the aggregate weighted mean value by a result of multiplying a target gain value for the input spherical image by a target exposure duration value for the input spherical image; and obtaining the target exposure value in accordance with the scene luminance value.

4. The method of claim 1, wherein obtaining the target aggregate gain value includes:

obtaining, as the target aggregate gain value, a product of multiplying an exposure duration value used to capture the input spherical image, a sensor gain value of the input spherical image as captured, and a remaining gain for the input spherical image.

5. The method of claim 4, wherein obtaining the target aggregate gain value includes:

obtaining the remaining gain in accordance with the target exposure value and the aggregate weighted mean value.

6. The method of claim 1, wherein obtaining the region of interest ratio value includes:

obtaining, as the region of interest ratio value, a result of dividing the aggregate weighted mean value by a mean value of a region of interest luminance thumbnail.

7. The method of claim 6, wherein obtaining the region of interest ratio value includes:

obtaining the region of interest luminance thumbnail in accordance with region of interest data and at least one of the first luminance thumbnail image or the second luminance thumbnail image.

8. The method of claim 1, wherein obtaining the processed spherical image in accordance with the region of interest ratio value includes:

obtaining, as a target aggregate gain region of interest value, a product of the target aggregate gain value and the region of interest ratio value;

obtaining a temporally smoothed target aggregate gain in accordance with the target aggregate gain region of interest value; and using the temporally smoothed target aggregate gain as the target aggregate gain value.

9. An image capture apparatus comprising:

an image sensor; and an image processing pipeline configured to:

obtain an input spherical image having a spherical field of view, wherein to obtain the input spherical image the image processing pipeline is configured to:

obtain a first input image having a first hemispherical field of view; and obtain a second input image having a second hemispherical field of view, such that a combination of the first hemispherical field of view and the second hemispherical field of view forms the spherical field of view;

obtain a processed spherical image from the input spherical image, wherein to obtain the processed spherical image the image processing pipeline is configured to:

obtain a first luminance thumbnail image for the first input image;

obtain a second luminance thumbnail image for the second input image;

obtain a first distortion correcting weight map for the first input image;

obtain a second distortion correcting weight map for the second input image;

obtain, as an aggregate weighted mean value for the input spherical image, an aggregate of a first normalized weighted mean value for the first luminance thumbnail image and a second normalized weighted mean value for the second luminance thumbnail image; and obtain at least one of a target exposure value, a target aggregate gain value, or a region of interest ratio value in accordance with the aggregate weighted mean value;

obtain the processed spherical image from the input spherical image in accordance with at least one of the target exposure value, the target aggregate gain value, or the region of interest ratio value; and output the processed spherical image.

10. The image capture apparatus of claim 9, wherein, to obtain the aggregate weighted mean value, the image processing pipeline is configured to:

obtain, as the first normalized weighted mean value, a sum of first weighted pixel values, wherein a first weighted pixel value from the first weighted pixel values is a result of multiplication of a pixel value from the first luminance thumbnail image by a respective spatially corresponding distortion correcting weight value from the first distortion correcting weight map, normalized by a sum of the distortion correcting weight values from the first distortion correcting weight map;

obtain, as the second normalized weighted mean value, a sum of second weighted pixel values, wherein a second weighted pixel value from the second weighted pixel values is a result of multiplication of a pixel value from the second luminance thumbnail image by a respective spatially corresponding distortion correcting weight value from the second distortion correcting weight map, normalized by a sum of the distortion correcting weight values from the second distortion correcting weight map; and obtain, as the aggregate weighted mean value, an average of the first normalized weighted mean value and the second normalized weighted mean value.

11. The image capture apparatus of claim 9, wherein, to obtain the target exposure value, a target exposure component of the image processing pipeline is configured to:

obtain a scene luminance value for the input spherical image in accordance with a result of division of the aggregate weighted mean value by a result of multiplication of a target gain value for the input spherical image by a target exposure duration value for the input spherical image; and obtain the target exposure value in accordance with the scene luminance value.

12. The image capture apparatus of claim 9, wherein, to obtain the target aggregate gain value, an aggregate gain component of the image processing pipeline is configured to:

obtain, as the target aggregate gain value, a product of multiplication of an exposure duration value used to capture the input spherical image, a sensor gain value of the input spherical image as captured, and a remaining gain for the input spherical image.

13. The image capture apparatus of claim 12, wherein, to obtain the target aggregate gain value, the aggregate gain component of the image processing pipeline is configured to:

obtain the remaining gain in accordance with the target exposure value and the aggregate weighted mean value.

14. The image capture apparatus of claim 9, wherein, to obtain the region of interest ratio value, an aggregate gain component of the image processing pipeline is configured to:

obtain, as the region of interest ratio value, a result of division of the aggregate weighted mean value by a mean value of a region of interest luminance thumbnail.

15. The image capture apparatus of claim 14, wherein, to obtain the region of interest ratio value, the aggregate gain component of the image processing pipeline is configured to:

obtain the region of interest luminance thumbnail in accordance with region of interest data and at least one of the first luminance thumbnail image or the second luminance thumbnail image.

16. The image capture apparatus of claim 9, wherein, to obtain the processed spherical image in accordance with the region of interest ratio value, an aggregate gain component of the image processing pipeline is configured to:

obtain, as a target aggregate gain region of interest value, a product of the target aggregate gain value and the region of interest ratio value;

obtain a temporally smoothed target aggregate gain in accordance with the target aggregate gain region of interest value; and use the temporally smoothed target aggregate gain as the target aggregate gain value.

17. A method comprising:

obtaining an input spherical image having a spherical field of view, wherein obtaining the input spherical image includes:

obtaining a first input image having a first hemispherical field of view; and obtaining a second input image having a second hemispherical field of view, such that a combination of the first hemispherical field of view and the second hemispherical field of view forms the spherical field of view;

obtaining a processed spherical image from the input spherical image, wherein obtaining the processed spherical image includes:

obtaining a first luminance thumbnail image for the first input image;

obtaining a second luminance thumbnail image for the second input image;

obtaining a first distortion correcting weight map for the first input image;

obtaining a second distortion correcting weight map for the second input image;

obtaining, as an aggregate gradient histogram for the input spherical image, a sum of a first gradient histogram for the first luminance thumbnail image generated in accordance with the first distortion correcting weight map and a second gradient histogram for the second luminance thumbnail image generated in accordance with the second distortion correcting weight map;

obtaining a uniformity score for the input spherical image in accordance with the aggregate gradient histogram; and obtaining the processed spherical image from the input spherical image in accordance with at the uniformity score; and outputting the processed spherical image.

18. The method of claim 17, wherein obtaining the processed spherical image includes:

obtaining the first gradient histogram by:

obtaining a first gradient of the first luminance thumbnail image in accordance with the first distortion correcting weight map; and obtaining, as the first gradient histogram, a histogram of the first gradient; and obtaining the second gradient histogram by:

obtaining a second gradient of the second luminance thumbnail image in accordance with the second distortion correcting weight map; and obtaining, as the second gradient histogram, a histogram of the second gradient.

19. The method of claim 17, wherein obtaining the processed spherical image includes:

obtaining a first weighted RGB histogram for the first input image;

obtaining a second weighted RGB histogram for the second input image; and obtaining a contrast control black point value for the processed spherical image in accordance with the first weighted RGB histogram and the second weighted RGB histogram.

20. The method of claim 19, wherein:

obtaining the first weighted RGB histogram includes:

accessing a first RGB histogram for the first input image; and obtaining the first weighted RGB histogram in accordance with the first RGB histogram and the first distortion correcting weight map; and obtaining the second weighted RGB histogram includes:

accessing a second RGB histogram for the second input image; and obtaining the second weighted RGB histogram in accordance with the second RGB histogram and the second distortion correcting weight map.

\* \* \* \* \*